United States Patent
Ingel et al.

(10) Patent No.: US 12,380,736 B2
(45) Date of Patent: Aug. 5, 2025

(54) GENERATING AND OPERATING PERSONALIZED ARTIFICIAL ENTITIES

(71) Applicants: Ben Avi Ingel, Binyamina (IL); Ron Zass, Kiryat Tivon (IL)

(72) Inventors: Ben Avi Ingel, Binyamina (IL); Ron Zass, Kiryat Tivon (IL)

( * ) Notice: Subject to any disclaimer, the term of this patent is extended or adjusted under 35 U.S.C. 154(b) by 0 days.

(21) Appl. No.: 18/813,903

(22) Filed: Aug. 23, 2024

(65) Prior Publication Data
US 2025/0006182 A1    Jan. 2, 2025

Related U.S. Application Data

(60) Provisional application No. 63/685,978, filed on Aug. 22, 2024, provisional application No. 63/685,988,
(Continued)

(51) Int. Cl.
| | |
|---|---|
| *G06V 40/20* | (2022.01) |
| *B25J 9/00* | (2006.01) |
| *B25J 11/00* | (2006.01) |
| *G06F 40/279* | (2020.01) |
| *G06F 40/35* | (2020.01) |

(Continued)

(52) U.S. Cl.
CPC ........... *G06V 40/20* (2022.01); *B25J 9/0003* (2013.01); *B25J 11/0015* (2013.01); *G06F 40/279* (2020.01); *G06F 40/35* (2020.01); *G06V 40/174* (2022.01); *G10L 13/02* (2013.01); *G10L 15/063* (2013.01); *G10L 15/07* (2013.01);
(Continued)

(58) Field of Classification Search
CPC ....... G10L 15/07; G10L 15/063; G10L 15/22; G10L 15/00; G10L 15/20; G10L 13/02; G10L 15/1807; G10L 25/51; G10L 13/033; G10L 25/63; G06V 40/20; G06V 40/174; B25J 9/0003; B25J 11/0015; B25J 11/0005; G06F 40/279; G06F 40/35; G06F 40/30; H04N 21/85
See application file for complete search history.

(56) References Cited

U.S. PATENT DOCUMENTS

| | | |
|---|---|---|
| 4,305,131 A | 12/1981 | Best |
| 6,077,085 A | 6/2000 | Parry |

(Continued)

FOREIGN PATENT DOCUMENTS

| | | |
|---|---|---|
| CN | 102422639 A | 4/2012 |
| EP | 1928189 A1 | 6/2008 |
| WO | 2017088136 A1 | 6/2017 |

OTHER PUBLICATIONS

K. Nurgaliyev et al.; "Improved Multi-user Interaction in a Smart Environment through a Preference-Based Conflict Resolution Virtual Assistant," Nov. 23, 2017 International Conference on Intelligent Environments (IE), 2017, pp. 100-107. (Year: 2017).

*Primary Examiner* — Michael Colucci

(57) ABSTRACT

Systems, methods and non-transitory computer readable media for generating and operating artificial entities are provided. Some disclosed embodiments may involve receiving information related to a source individual; generating an artificial entity associated with the source individual based on the received information; receiving data reflecting an interaction with the artificial entity; and determining a manner for the artificial entity to respond to the interaction based on the collected information.

110 Claims, 32 Drawing Sheets

Related U.S. Application Data filed on Aug. 22, 2024, provisional application No. 63/549,534, filed on Feb. 4, 2024, provisional application No. 63/535,234, filed on Aug. 29, 2023.

(51) Int. Cl.
    *G06V 40/16* (2022.01)
    *G10L 13/02* (2013.01)
    *G10L 15/06* (2013.01)
    *G10L 15/07* (2013.01)
    *G10L 15/18* (2013.01)
    *G10L 15/22* (2006.01)
    *G10L 25/51* (2013.01)
    *H04N 21/85* (2011.01)

(52) U.S. Cl.
    CPC .......... *G10L 15/1807* (2013.01); *G10L 15/22* (2013.01); *G10L 25/51* (2013.01); *H04N 21/85* (2013.01)

(56) References Cited

U.S. PATENT DOCUMENTS

| | | |
|---|---|---|
| 6,778,252 B2 | 8/2004 | Moulton et al. |
| 8,140,322 B2 | 3/2012 | Simonsen et al. |
| 9,280,973 B1 | 3/2016 | Soyannwo et al. |
| 9,747,282 B1 | 8/2017 | Baker et al. |
| 9,864,933 B1 | 1/2018 | Cosic |
| 9,908,046 B2 * | 3/2018 | Dawson ................ A63F 13/88 |
| 10,360,716 B1 | 7/2019 | van der Meulen et al. |
| 10,423,999 B1 | 9/2019 | Doctor |
| 10,433,052 B2 | 10/2019 | Zass et al. |
| 10,467,792 B1 | 11/2019 | Roche |
| 10,516,938 B2 | 12/2019 | Zass |
| 10,607,134 B1 | 3/2020 | Cosic |
| 10,827,024 B1 | 11/2020 | Schissel et al. |
| 11,003,748 B2 * | 5/2021 | Oliker ................... G06F 21/316 |
| 11,024,194 B1 | 6/2021 | Beigman Klebanov |
| 11,107,141 B1 * | 8/2021 | Nagarajappa ...... G06Q 30/0617 |
| 11,140,459 B2 | 10/2021 | Ingel |
| 11,159,597 B2 | 10/2021 | Ingel |
| 11,195,542 B2 | 12/2021 | Zass |
| 11,202,131 B2 | 12/2021 | Zass |
| 11,232,645 B1 | 1/2022 | Roche et al. |
| 11,244,385 B1 | 2/2022 | Fraser |
| 11,520,079 B2 | 12/2022 | Zass |
| 11,641,384 B1 * | 5/2023 | Lee ..................... H04L 65/1104 |
| | | 709/204 |
| 11,837,249 B2 | 12/2023 | Zass |
| 11,966,688 B1 | 4/2024 | Ehrlich |
| 12,010,399 B2 | 6/2024 | Ingel et al. |
| 2002/0087317 A1 | 7/2002 | Lee et al. |
| 2002/0161578 A1 | 10/2002 | Saindon et al. |
| 2002/0161579 A1 | 10/2002 | Saindon et al. |
| 2004/0068410 A1 | 4/2004 | Mohamed et al. |
| 2004/0172257 A1 | 9/2004 | Liqin et al. |
| 2004/0186712 A1 | 9/2004 | Coles et al. |
| 2005/0255431 A1 | 11/2005 | Baker |
| 2005/0272013 A1 | 12/2005 | Knight |
| 2006/0285654 A1 | 12/2006 | Nesvadba et al. |
| 2007/0124166 A1 | 5/2007 | Van Luchene |
| 2007/0130529 A1 | 6/2007 | Shrubsole |
| 2007/0208569 A1 | 9/2007 | Subramanian et al. |
| 2007/0220575 A1 | 9/2007 | Cooper et al. |
| 2008/0015968 A1 | 1/2008 | Van Luchene |
| 2008/0195386 A1 | 8/2008 | Proidl |
| 2008/0295130 A1 | 11/2008 | Worthen |
| 2009/0037179 A1 | 2/2009 | Liu et al. |
| 2009/0175596 A1 | 7/2009 | Hirai |
| 2010/0082326 A1 | 4/2010 | Bangalore |
| 2010/0100907 A1 | 4/2010 | Chang |
| 2010/0238179 A1 | 9/2010 | Kelly |
| 2011/0064388 A1 | 3/2011 | Brown et al. |
| 2011/0076992 A1 | 3/2011 | Chou |
| 2012/0054619 A1 | 3/2012 | Spooner et al. |
| 2013/0038737 A1 | 2/2013 | Yehezkel et al. |
| 2013/0110513 A1 | 5/2013 | Jhunja et al. |
| 2013/0188862 A1 | 7/2013 | Lievens |
| 2014/0142918 A1 | 5/2014 | Dotterer et al. |
| 2014/0164507 A1 | 6/2014 | Tesch et al. |
| 2014/0303958 A1 | 10/2014 | Lee et al. |
| 2014/0358518 A1 | 12/2014 | Wu et al. |
| 2015/0092007 A1 | 4/2015 | Koborita et al. |
| 2015/0356967 A1 | 10/2015 | Byron et al. |
| 2015/0319518 A1 | 11/2015 | Wilson |
| 2016/0005436 A1 | 1/2016 | Axen et al. |
| 2016/0021334 A1 | 1/2016 | Rossano et al. |
| 2016/0042766 A1 | 2/2016 | Kummer |
| 2016/0049146 A1 | 2/2016 | Chang |
| 2016/0132578 A1 | 5/2016 | Allen |
| 2016/0254795 A1 | 9/2016 | Ballard |
| 2016/0328391 A1 | 11/2016 | Choi |
| 2016/0365087 A1 | 12/2016 | Freud |
| 2017/0004820 A1 | 1/2017 | Lv et al. |
| 2017/0011745 A1 | 1/2017 | Navaratnam |
| 2017/0075877 A1 | 3/2017 | Lepeltier |
| 2017/0076749 A1 | 3/2017 | Kanevsky |
| 2017/0255616 A1 | 9/2017 | Yun et al. |
| 2017/0300831 A1 * | 10/2017 | Gelfenbeyn .......... H04L 51/214 |
| 2018/0067991 A1 * | 3/2018 | Agarwal ............. G06F 16/2455 |
| 2018/0143809 A1 | 5/2018 | Zang et al. |
| 2018/0174577 A1 | 6/2018 | Jothilingam et al. |
| 2018/0174595 A1 | 6/2018 | Dirac et al. |
| 2018/0240458 A1 | 8/2018 | Zass |
| 2018/0253992 A1 | 9/2018 | Koul et al. |
| 2018/0260448 A1 | 9/2018 | Osotio et al. |
| 2018/0322875 A1 | 11/2018 | Adachi |
| 2018/0357215 A1 | 12/2018 | Austin et al. |
| 2018/0374461 A1 | 12/2018 | Serletic |
| 2019/0065478 A1 | 2/2019 | Tsujikawa et al. |
| 2019/0114302 A1 | 4/2019 | Bequet |
| 2019/0156222 A1 * | 5/2019 | Emma ..................... G06F 16/22 |
| 2019/0164533 A1 | 5/2019 | Lawrenson et al. |
| 2019/0166176 A1 | 5/2019 | Jain et al. |
| 2019/0171845 A1 * | 6/2019 | Dotan-Cohen ......... H04L 51/02 |
| 2019/0250891 A1 | 8/2019 | Kumar et al. |
| 2019/0317739 A1 | 10/2019 | Turek et al. |
| 2019/0354592 A1 | 11/2019 | Musham et al. |
| 2020/0005796 A1 | 1/2020 | Ziv et al. |
| 2020/0007946 A1 | 1/2020 | Olkha |
| 2020/0042601 A1 | 2/2020 | Doggett |
| 2020/0043112 A1 | 2/2020 | Brinkley, II |
| 2020/0051566 A1 | 2/2020 | Shin |
| 2020/0058289 A1 | 2/2020 | Gabryjelski et al. |
| 2020/0066304 A1 | 2/2020 | Chen |
| 2020/0105245 A1 | 4/2020 | Gupta |
| 2020/0111474 A1 | 4/2020 | Kumar et al. |
| 2020/0143813 A1 | 5/2020 | Nakagawa |
| 2020/0150981 A1 | 5/2020 | Westberg et al. |
| 2020/0159862 A1 | 5/2020 | Kleiner et al. |
| 2020/0174776 A1 | 6/2020 | Vinod-et al. |
| 2020/0221176 A1 | 7/2020 | Hwang et al. |
| 2020/0296510 A1 | 9/2020 | Li et al. |
| 2020/0311120 A1 | 10/2020 | Zhao et al. |
| 2021/0019373 A1 | 1/2021 | Freitag |
| 2021/0027770 A1 * | 1/2021 | Olabiyi ................... G06N 3/045 |
| 2021/0042110 A1 | 2/2021 | Basyrov et al. |
| 2021/0063363 A1 | 3/2021 | Kaminski et al. |
| 2021/0081101 A1 | 3/2021 | Speare et al. |
| 2021/0097976 A1 | 4/2021 | Chicote et al. |
| 2021/0264369 A1 | 5/2021 | Zass |
| 2021/0279822 A1 | 5/2021 | Bellaish |
| 2021/0182468 A1 | 6/2021 | Co et al. |
| 2021/0192824 A1 | 6/2021 | Chen |
| 2021/0287150 A1 | 6/2021 | Zass |
| 2021/0224319 A1 | 7/2021 | Ingel |
| 2021/0225365 A1 | 7/2021 | Sinha et al. |
| 2021/0232759 A1 | 7/2021 | Schick et al. |
| 2021/0271815 A1 | 9/2021 | Li et al. |
| 2021/0303318 A1 | 9/2021 | Raghavan |
| 2021/0397418 A1 | 12/2021 | Nikumb et al. |
| 2021/0400101 A1 | 12/2021 | Ingel |
| 2022/0070550 A1 | 3/2022 | Ingel |

(56) References Cited

U.S. PATENT DOCUMENTS

| | | |
|---|---|---|
| 2022/0255885 A1* | 8/2022 | Aharoni .................. G10L 15/22 |
| 2022/0309364 A1* | 9/2022 | Perry ...................... A63F 13/56 |
| 2022/0309552 A1* | 9/2022 | Lancewicki ....... G06Q 30/0202 |
| 2022/0382524 A1 | 12/2022 | Ansari et al. |
| 2023/0048149 A1 | 2/2023 | Zass |
| 2023/0049015 A1 | 2/2023 | Zass |
| 2023/0052442 A1 | 2/2023 | Zass |
| 2023/0057835 A1 | 2/2023 | Zass |
| 2023/0069088 A1 | 3/2023 | Zass |
| 2023/0095089 A1 | 3/2023 | Kaliyaperumal et al. |
| 2023/0115185 A1 | 4/2023 | Huang et al. |
| 2023/0247019 A1* | 8/2023 | Kshirsagar ............ H04L 63/102 |
| | | 726/4 |
| 2023/0252224 A1 | 8/2023 | Tran |
| 2023/0409298 A1 | 12/2023 | Ciminelli et al. |
| 2023/0418459 A1 | 12/2023 | Ciminelli et al. |
| 2023/0418571 A1 | 12/2023 | Ciminelli et al. |
| 2023/0418572 A1 | 12/2023 | Ciminelli et al. |
| 2023/0418632 A1 | 12/2023 | Ciminelli et al. |
| 2023/0418633 A1 | 12/2023 | Ciminelli et al. |
| 2024/0055014 A1 | 2/2024 | Zass |
| 2024/0086051 A1 | 3/2024 | Ciminelli et al. |
| 2024/0163232 A1* | 5/2024 | Jayaraman .............. H04L 51/52 |
| 2024/0212223 A1* | 6/2024 | Palamadai ............ H04L 51/046 |
| 2024/0220521 A1 | 7/2024 | Ehrlich |
| 2024/0220712 A1 | 7/2024 | Zass |
| 2024/0220714 A1 | 7/2024 | Ehrlich |
| 2024/0256583 A1 | 8/2024 | Zass |
| 2024/0256767 A1 | 8/2024 | Zass |
| 2024/0265191 A1 | 8/2024 | Zass |
| 2024/0265197 A1 | 8/2024 | Zass |
| 2024/0273305 A1 | 8/2024 | Zass |
| 2024/0276072 A1 | 8/2024 | Ingel et al. |

* cited by examiner

GENERATING AND OPERATING PERSONALIZED ARTIFICIAL ENTITIES

CROSS-REFERENCE TO RELATED APPLICATIONS

This application claims the benefit of priority of U.S. Provisional Patent Application No. 63/535,234 (filed on Aug. 29, 2023), U.S. Provisional Patent Application No. 63/549,534 (filed on Feb. 4, 2024), U.S. Provisional Patent Application No. 63/685,978 (filed on Aug. 22, 2024), and U.S. Provisional Patent Application No. 63/685,988 (filed on Aug. 22, 2024), the disclosures of which are incorporated herein by reference in their entirety.

BACKGROUND OF THE INVENTION

Technological Field

Some disclosed embodiments generally relate to systems and methods for generating and operating artificial entities.

Background Information

In today's world, artificial entities based on the innovative Generative Pre-trained Transformer (GPT) architecture and other innovative natural language processing (NLP) models respond to users' questions using generic databases and their conversation records. Yet, the relentless march of technology has shattered the boundaries of possibility, making the dream of personalized artificial entities a feasible solution.

Personalized artificial entities can harness the power of deep-learning algorithms to meticulously process an individual's data, be it text, audio, photos, or videos. By doing so, the personalized artificial entities can mirror or adjust to the unique cognitive traits, preferences, and unique manner of interactions of their source individuals. This provides the personalized artificial entities with an uncanny ability to offer functionalities with unprecedented authenticity and engagement with the source individuals and other individuals.

This groundbreaking technology will revolutionize how humans interact in digital environments, ushering in a new era of innovative ways for communication, productivity, entertainment, and social engagement.

SUMMARY OF THE INVENTION

Systems, methods and non-transitory computer readable media for generating and operating artificial entities are provided. Some disclosed embodiments may involve receiving information related to a source individual; generating an artificial entity associated with the source individual based on the received information; receiving data reflecting an interaction with the artificial entity; and determining a manner for the artificial entity to respond to the interaction based on the collected information.

The foregoing general description and the following detailed description are exemplary and explanatory only and are not restrictive of the claims.

BRIEF DESCRIPTION OF DRAWINGS

The accompanying drawings, which are incorporated in and constitute a part of this disclosure, illustrate various disclosed embodiments. In the drawings.

DETAILED DESCRIPTION OF THE INVENTION

Figure 1:
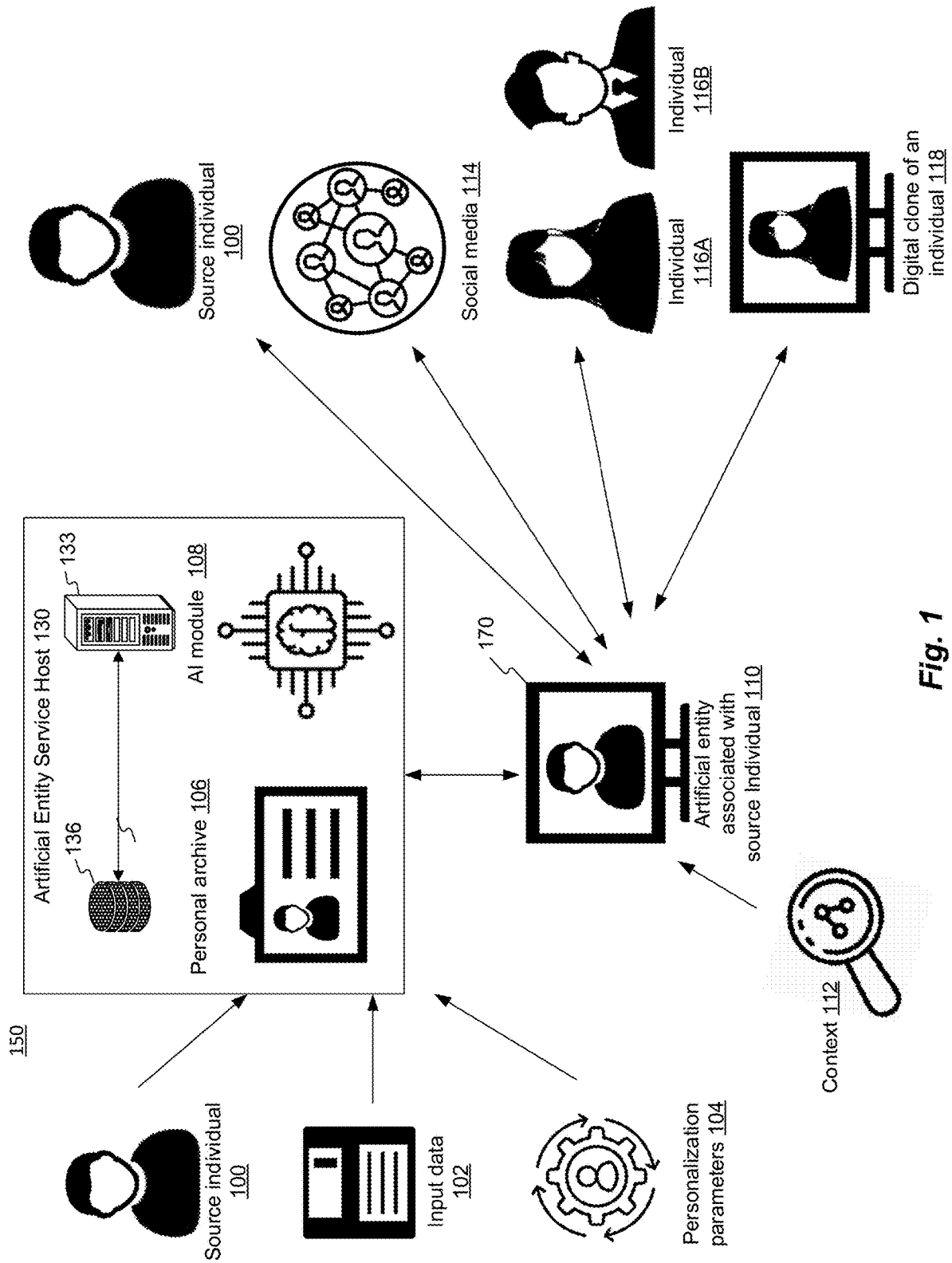
FIG. 1 is a block diagram illustrating a system that enables generation of artificial entities, consistent with some embodiments of the present disclosure.

Exemplary embodiments are described with reference to the accompanying drawings. The Figures are not necessarily drawn to scale. While examples and features of disclosed principles are described herein, modifications, adaptations, and other implementations are possible without departing from the spirit and scope of the disclosed embodiments. Also, the words "comprising," "having," "containing," "including," and other similar forms are intended to be equivalent in meaning and be open ended in that an item or items following any one of these words is not meant to be an exhaustive listing of such item or items, or meant to be limited to only the listed item or items. It should also be noted that, as used herein and in the appended claims, the singular forms "a," "an," and "the" include plural references unless the context clearly dictates otherwise. Moreover, the relational terms herein such as "first" and "second" are used only to differentiate an entity or operation from another entity or operation, and do not require or imply any actual relationship or sequence between these entities or operations.

As used herein, unless specifically stated otherwise, the term "or" encompasses all possible combinations, except where infeasible. For example, if it is stated that a component can include A or B, then, unless specifically stated otherwise or infeasible, the component can include A or B, or A and B. As a second example, if it is stated that a component can include at least one of A, B, or C, then, unless specifically stated otherwise or infeasible, the component can include A, B, or C, or A and B, or A and C, or B and C, or A, B, and C.

This disclosure employs open-ended permissive language, indicating for example, that some embodiments "may" employ, involve, or include specific features. The use of the term "may," and other open-ended terminology is intended to indicate that although not every embodiment may employ the specific disclosed feature, at least one embodiment employs the specific disclosed feature.

In the following description, various working examples are provided for illustrative purposes. However, is to be understood the present disclosure may be practiced without one or more of these details. Reference will now be made in detail to non-limiting examples of this disclosure, examples of which are illustrated in the accompanying drawings. The examples are described below by referring to the drawings, wherein like reference numerals refer to like elements. When similar reference numerals are shown, corresponding description(s) are not repeated, and the interested reader is referred to the previously discussed Figure(s) for a description of the like element(s).

Various embodiments are described herein with reference to a system, method, device, or computer-readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via, for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer-readable medium containing instructions that, when executed by at least one processor, cause the at least one processor to perform operations for executing a web accessibility method. Non-transitory computer-readable media may include any medium capable of storing data in any memory in a way that may be read by any computing device with a processor to carry out methods or any other instructions stored in the memory. The non-transitory computer-readable medium may be implemented as hardware, firmware, software, or any combination thereof. Moreover, the software may preferably be implemented as an application program tangibly embodied on a program storage unit or computer-readable medium consisting of parts, or of certain devices or a combination of devices. The application program may be uploaded to, and executed by, a machine having any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program or any combination thereof which may be executed by a CPU, whether or not such a computer or processor is explicitly described. In addition, various other peripheral units may be connected to the computer platform, such as an additional data storage unit and a printing unit. Furthermore, a non-transitory computer-readable medium may be any computer-readable medium except for a transitory propagating signal.

Some disclosed embodiments may involve "at least one processor," which may include any physical device or group of devices having electric circuitry that performs a logic operation on an input or on inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The term memory as used in this context and other contexts may include a Random Access Memory (RAM), a Read-Only Memory (ROM), a hard disk, an optical disk, a magnetic medium, a flash memory, other permanent, fixed, or volatile memory, or any other mechanism capable of storing instructions. Memory may include one or more separate storage devices collocated or disbursed, capable of storing data structures, instructions, or any other data. Memory may further include a memory portion containing instructions for the processor to execute. The memory may also be used as a working scratch pad for the processors or as a temporary storage In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively and may be co-located or located remotely from each other. The processors may be coupled electrically, magnetically, optically, acoustically, mechanically or by other means that permit them to interact.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers; for example, a data structure may be owned or operated by the same or different entities. Thus, the term "data structure," as used herein in the singular, is inclusive of plural data structures.

Some embodiments disclosed herein may involve a network. A network may include any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

In connection with some embodiments, machine learning/artificial intelligence models may be trained using training examples. The models may employ learning algorithms. Some non-limiting examples of such learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Reference is now made to FIG. 1, which shows an example of a system 150 for enabling source individuals 100 to generate and operate personalized artificial entities 110. System 150 may be computer-based and may include at least some computer system components, desktop computers, workstations, tablets, handheld computing devices, memory devices, and internal networks connecting the components. System 150 may include or be connected to various network computing resources (e.g., servers, routers, switches, network connections, storage devices, etc.) for supporting services provided by system 150. For example, system 150 may include or be connected to an artificial entity service host 130 over a communications network that facilitates communications and data exchange between different system components and the different entities associated with system 150.

Figure 3A:
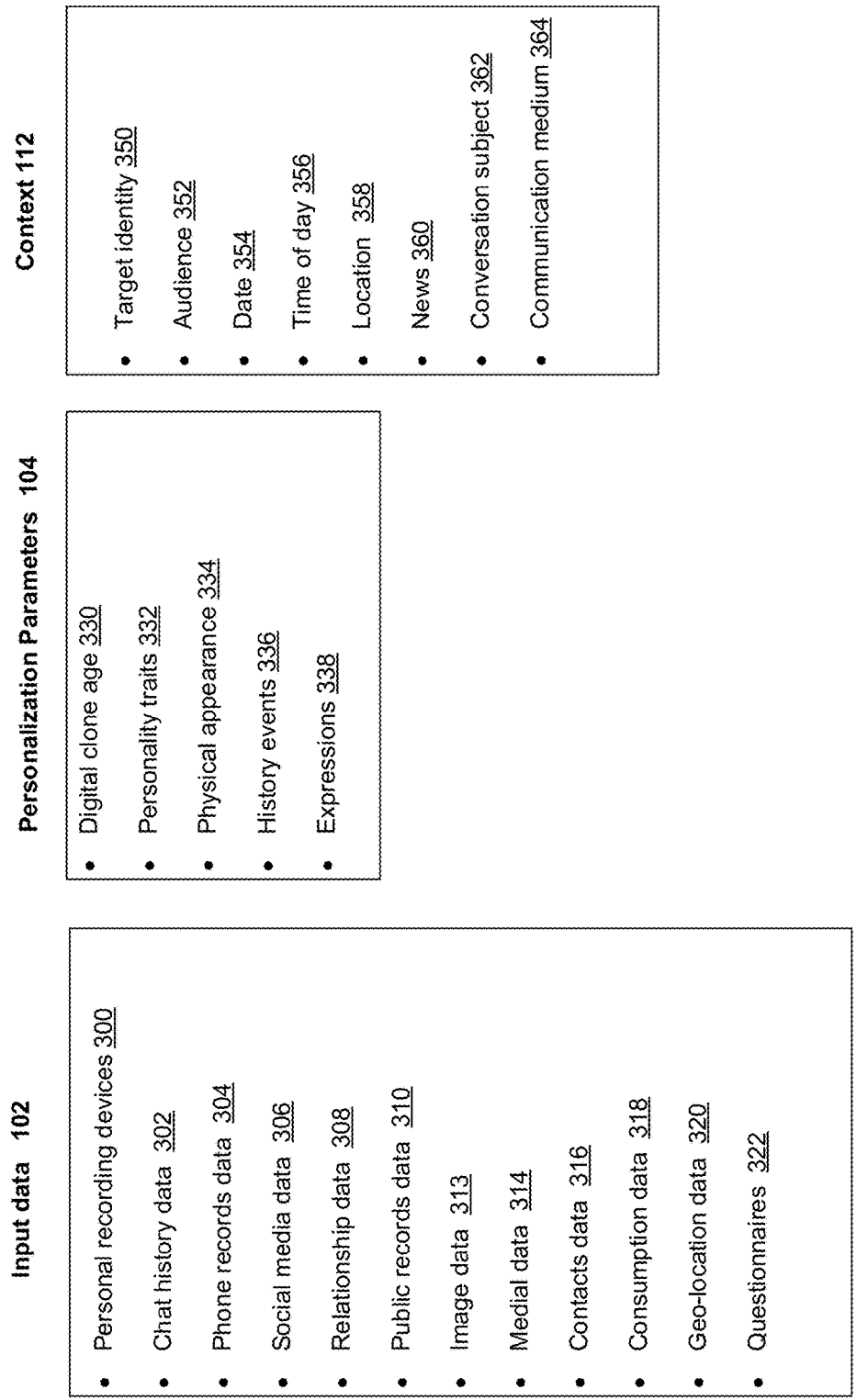
FIG. 3A is a diagram illustrating examples of input data of the system of FIG. 1, the consistent with some embodiments of the present disclosure.

The artificial entity service host 130 may receive input data 102 from source individual 100 or from individuals associated with the source individual. Input data refers to a wide array of information and content collected, recorded, or generated from various sources, often digitally, for analysis, processing, or other purposes. Consistent with embodiments of the present disclosure, the received information included in input data 102 can provide insights into different aspects of an individual's life, behavior, and interactions. FIG. 3A provides examples of the information received as part of input data 102. As shown, the received information may originate from personal recording devices 300 (e.g., audio or video recordings made using devices such as smartphones, cameras, or voice recorders) that capture personal conversations, thoughts, and experiences, providing a direct window into a person's daily life. The received information may also include chat history data 302 (e.g., text-based conversations from messaging platforms or chat applications) that offer insights into communication patterns, relationships, and interactions. Additionally, the received information may include phone records data 304 (e.g., call logs, text messages, and other communication records) that provide information about the frequency and duration of interactions with contacts. Social media data 306 (e.g., content posted, shared, and interactions on social media platforms) may also be included, offering insights into an individual's online presence, interests, and social connections. Relationship data 308 (e.g., information about individuals' connections with others, such as family, friends, and professional contacts) can offer insights into the nature and strength of these relationships. Public records data 310 (e.g., information available in official records, such as birth certificates, marriage records, and legal documents) may be included to help establish a person's legal and life milestones. Image data 313 (e.g., images captured through cameras or smartphones) provides visual records of events, places, and people in an individual's life, adding a visual dimension to the personal archive of the source individual. Medical data 314 (e.g., health-related records, such as medical history, diagnoses, prescriptions, and test results) can be used to understand the source individual's health journey. Furthermore, the received information may include contacts data 316 (e.g., information about people in an individual's address book, including names, phone numbers, and email addresses) that provide insights into the social and professional network of the source individual. Consumption data 318 (e.g., records of transactions indicative of the individual's spending habits and purchasing behaviors) can reveal preferences and interests. Geo-location data 320 (e.g., data indicating an individual's physical movements and locations over time, often collected through GPS-enabled devices) may provide insights into travel patterns and routines. Finally, the received information may include answers to questionnaires 322 (e.g., responses to surveys or questionnaires), which can cover various topics and be used to gather insights into the opinions, preferences, and attitudes of the source individual.

The artificial entity service host 130 may also receive personalization parameters 104 from source individual 100 or from individuals associated with the source individual. Personalization parameters refer to specific characteristics, attributes, or settings that can be customized to tailor an experience or representation to an individual's preferences, needs, or identity. These parameters are utilized to create a more personalized and engaging experience for users in various contexts, such as virtual environments, digital platforms, storytelling, and more. By reflecting an individual's unique qualities, these parameters enhance the overall user experience. FIG. 3A provides examples of personalization parameters 104. One example is the digital clone age 330, where users can choose the age of their artificial entity. This personalization parameter allows user to adjust the age of their artificial entity, influencing their appearance, behavior, and interactions within other individuals. For instance, a younger artificial entity might be more energetic and curious, while an older artificial entity could appear wiser and more reserved. Another example is personality traits 332, which allows users (e.g., source individual 100) to personalize an artificial entity (such as a virtual assistant or an entity with whom the source individual wishes to establish a romantic relationship) with specific traits. Users might select whether they want the artificial entity to be humorous, professional, empathetic, or a combination of traits, ensuring that interactions align with the user's preferred conversational style. Physical appearance 334 is another personalization parameter that users can select in order to personalize their artificial entity. Users can adjust attributes such as height, body type, facial features, and clothing choices, allowing them to create artificial entities that closely match their own preferences or desired identities. History events 336 is a personalization parameter that allows users to select specific historical events they are interested in learning about. The artificial entity will be educated about the specific historical events from the point of view of the source individual. Finally, expressions 338 is another personalization parameter that enables users to customize the expressions and animations of their artificial entity during, for example, video calls or chats.

As shown in FIG. 1, artificial entity service host 130 may be associated with a server 133 coupled to one or more physical or virtual storage devices such as a data structure 136. In some embodiments, server 133 may include or otherwise associated with an AI module 108. AI module 108—designed to generate text, images, and video as well as create an artificial entity (e.g., a digital clone) associated with a source individual—is a sophisticated computational system that leverages artificial intelligence techniques to mimic human-like creativity and replication. This module combines natural language processing (NLP) and computer vision technologies to generate textual content, images, and even digital representations of individuals with a high degree of realism. In one embodiment, AI module 108 is capable of generating text for artificial entity 110. For example, AI module 108 employs NLP models to generate coherent and contextually relevant textual content. It can create articles, stories, conversations, product descriptions, and more based on prompts or guidelines provided. In one embodiment, AI module 108 may utilize generative adversarial networks (GANs) or similar techniques, in order to generate images that match certain criteria. This can include generating artistic renditions, product visuals, scenes, or even abstract images. In one embodiment, AI module 108 is capable of generating artificial entity 110. To do so, AI module 108 first gathers extensive information about the source individual (e.g., input data 102). In one example, AI module 108 may employ deep learning and computer vision techniques to understand facial features, expressions, body language, and voice characteristics of the source individual. In some embodiments, AI module 108 may analyzing voice recordings of the source individual to be synthesize speech for the artificial entity in the voice of the source individual (e.g., the synthesized voice may have the same intonation, pitch, and speaking style). In other embodiments, AI module 108 may reconstruct a 3D model of the source individual's face, capturing unique features, proportions, and expressions. In other embodiments, AI module 108 may learn from the person's behavior in videos to replicate their gestures, movements, and body language. In some embodiments, the generated artificial entity may be an interactive representation of the source individual, capable of engaging in conversations, displaying emotions, and mimicking their visual and auditory attributes.

Data associated with artificial entity 110 (e.g., input data 102) may be stored in data structure 136 and used to form personal archive 106. Data structure 136 may utilize a volatile or non-volatile, magnetic, semiconductor, tape, optical, removable, non-removable, other type of storage device or tangible or non-transitory computer-readable medium, or any medium or mechanism for storing information related to artificial entity 110. Data structure 136 may be part of server 133 or separate from server 133. When data structure 136 is not part of server 133, server 133 may exchange data with data structure 136 via a communication link. Data structure 136 may include one or more memory devices that store data and instructions used to perform one or more features of the disclosed embodiments. In one embodiment, data structure 136 may include any of a plurality of suitable data structures, ranging from small data structures hosted on a workstation to large data structures distributed among data centers. Data structure 136 may also include any combination of one or more data structures controlled by memory controller devices (e.g., servers) or software.

Examples of received information that may be stored in a personal archive 106 include digital versions of the following: correspondence (e.g., personal letters, postcards, emails, and other forms of written communication that reflect relationships, experiences, and emotions), image data (e.g., pictures and videos capturing moments from various stages of life, such as family gatherings, vacations, achievements, and everyday activities), journals and diaries (e.g., written accounts of personal thoughts, feelings, and experiences that provide a deeper understanding of the inner world of the source individual), certificates (e.g., academic diplomas, certificates of achievement, and awards received for accomplishments in various fields), audio recordings (e.g., voice recordings, music playlists, and other audio files that hold sentimental or meaningful value), documents (e.g., personal documents such as birth certificates, passports, legal agreements, and other paperwork that document important life events), social media content (e.g., captured posts, photos, and interactions from social media platforms, family history records (e.g., genealogical records, family trees, and documents tracing the history of the individual's ancestors and relatives), career materials (work-related documents such as resumes, portfolios, and work samples that showcase professional achievements), personal projects (e.g., creative works, such as writings, art, music compositions, and other projects that reflect personal interests and talents), medical records (e.g., health-related documents and records that provide a comprehensive overview of the individual's medical history), food related memos (e.g., favorite recipes, cooking tips, and memories associated with food).

According to embodiments of the present disclosure, communications network may be any type of network (including infrastructure) that supports exchanges of information, and/or facilitates the exchange of information between the components of system 150. For example, communications network may be the Internet, the world-wideweb (WWW), a private data network, a virtual private network using a public network, a Wi-Fi network, a local area network (LAN), a wide area network (WAN), a metro area network (MAN), and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE® (BLE), Wi-Fi, near field communications (NFC), or other suitable communication methods that provide a medium for exchanging data and/or information between separate entities.

According to embodiments of the present disclosure, artificial entity 110 may be displayed on computing device 170. The computing device may include processing circuitry communicatively connected to a network interface and to a memory, wherein the memory contains instructions that, when executed by the processing circuitry, configure the computing device to execute a method. Computing devices referenced herein may include all possible types of devices capable of exchanging data in a communications network such as the Internet. In some examples, the communication device may include a smartphone, a tablet, a smartwatch, a personal digital assistant, a desktop computer, a laptop computer, an IoT device, a dedicated terminal, and any other device that enables display of digital content conveyed via the communications network. In some cases, the computing device may include or be connected to a display device such as an LED display, a touchscreen display, an augmented reality (AR) device, or a virtual reality (VR) device.

Artificial entity 110 may communicate with one or more entities. For example, artificial entity 110 may communicate with source individual 100 (e.g., for tuning and improving the artificial entity), with social media 114 (e.g., for reacting with posts and content behalf of the source individual), with individual 116 (e.g., to provide advice according to the source individual point of view); and/or with artificial entity of target individual 118 (e.g., to make planes of an events based on the preferences of each individual). The components and arrangements of system 150 shown in FIG. 1 are intended to be exemplary only and are not intended to limit the disclosed embodiments, as the system components used to implement the disclosed processes and features may vary.

When communicating with one or more entities listed above, the artificial entity service host 130 may obtain context 112 of the conversation or interaction and, based on the obtained context, determine the response of the artificial entity 110. Context 112 refers to the relevant information and parameters that influence how AI module 108 generates a response. It helps AI module 108 understand the specific situation or setting in which a response is being generated, allowing it to tailor its output accordingly. FIG. 3A lists examples of various contextual factors that may help AI module 108 understand the specific situation. One example is target identity 350, which relates to knowing who the recipient of the response is and helps personalize the response of the artificial entity to match the recipient's preferences, knowledge level, and communication style. For instance, the artificial entity might provide a more technical explanation to a researcher compared to a simplified version for a general audience. Another example is audience 352, which relates to the intended audience (in addition to the reference individual who asked the question). For example, the artificial entity might use different tones and language levels, such as formal language for a business audience and informal language for a casual group of friends. Another example is date 355, which involves incorporating the current date as context into the answer generated by the artificial entity. For instance, if the date is close to a major holiday, the artificial entity might tailor its response to include holiday-related greetings or information. Time of day 356 is another example, where the artificial entity incorporates the time of day into its response. For example, the entity may offer a cheerful "Good morning!" in the morning, a productive "Good afternoon!" around midday, or a relaxed "Good evening!" in the evening. Location 358 involves incorporating the geographic location of the reference individual as context in the answer. For example, if the user is in a particular city, the artificial entity may recall places the source individual has visited. News 360 includes recent news events as context for the response. For instance, if there's breaking news about a scientific discovery, the artificial entity could incorporate that information into its responses when discussing related topics. Conversation subject 362 involves incorporating the ongoing topic of conversation into the response. For example, if the discussion is about space exploration, the artificial entity's responses would be tailored to that subject, drawing from relevant knowledge and terminology. Finally, communication medium 364 relates to incorporating the platform or medium through which communication is taking place as context. For example, if the reference individual is speaking over the phone, the artificial entity's responses may be shorter and more concise than if the individual is communicating via a personal computer or in virtual environment.

Figure 2:
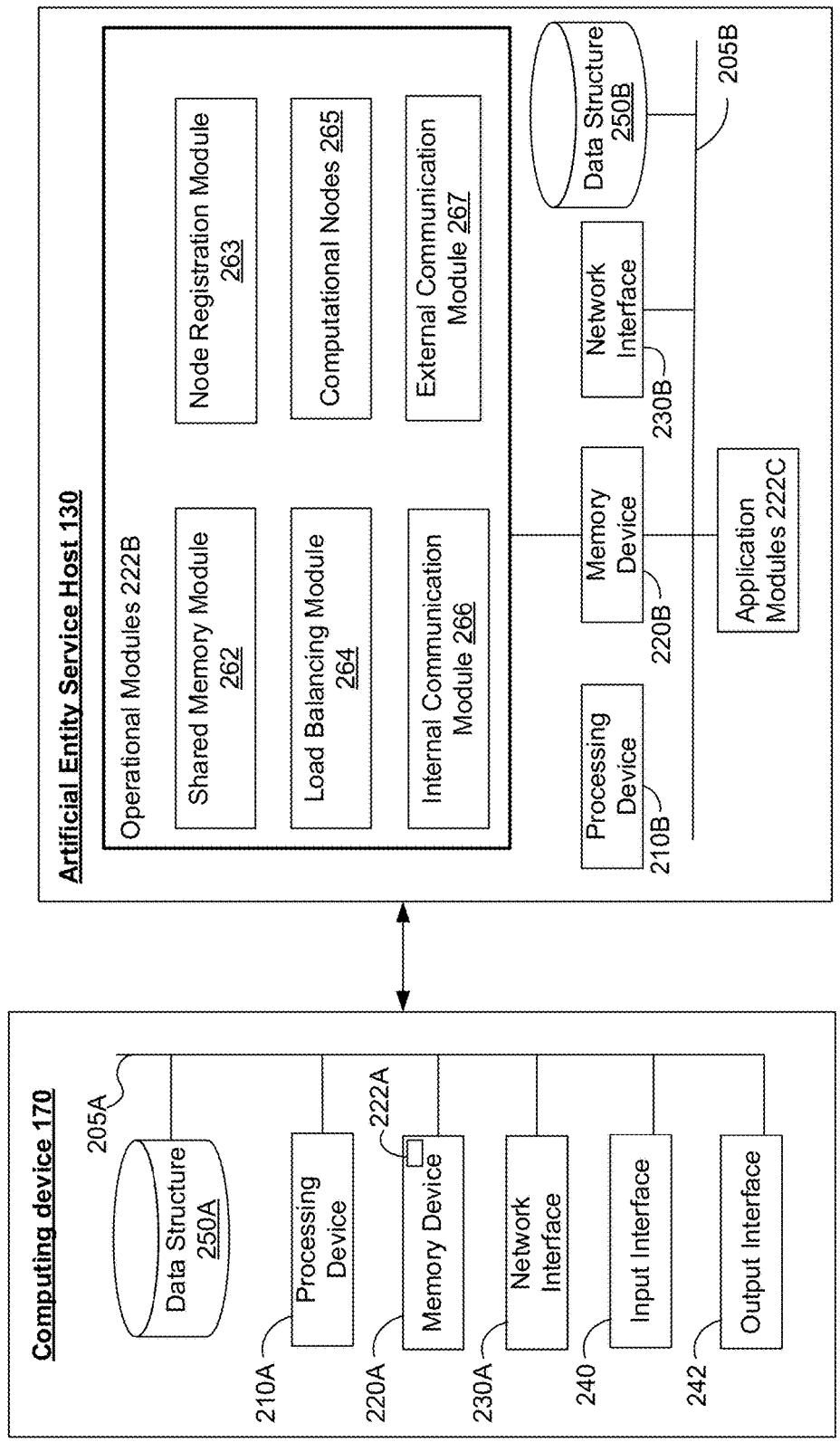
FIG. 2 is a block diagram of an exemplary computing device and exemplary server, consistent with some embodiments of the present disclosure.

FIG. 2 is a block diagram of an exemplary computing device 170 and artificial entity service host 130 that are used for generating and operating artificial entities consistent with some embodiments. Computing device 170 may include a bus 205A (or other communication mechanism) interconnecting subsystems and components for transferring information within computing device 170. For example, bus 205A may interconnect a processing device 210A, a memory device 220A including a memory portion 222A, a network interface 230A, an input interface 240, and a data structure 250A. Artificial entity service host 130 may include a bus 205B (or other communication mechanism) interconnecting subsystems and components for transferring information within artificial entity service host 130. For example, bus 205B may interconnect a processing device 210B, a memory device 220B including a memory portion 222B and application modules 222C, a network interface 230B, and a data structure 250B.

In some embodiments, a processing device 210 (e.g., processing device 210A and processing device 210B) may include at least one processor configured to execute computer programs, applications, methods, processes, or other software to perform embodiments described in the present disclosure. A processing device may be at least one processor, as defined earlier, which may, for example, include a microprocessor such as one manufactured by Intel™. For example, the processing device may include a single core or multiple core processors executing parallel processes simultaneously. In one example, the processing device may be a single core processor configured with virtual processing technologies. The processing device may implement virtual machine technologies or other technologies to provide the ability to execute, control, run, manipulate, store, etc., multiple software processes, applications, programs, etc. In another example, the processing device may include a multiple-core processor arrangement (e.g., dual, quad core, etc.) configured to provide parallel processing functionalities to allow a device associated with the processing device to execute multiple processes simultaneously. It is appreciated that other types of processor arrangements could be implemented to provide the capabilities disclosed herein.

In some embodiments, a memory device 220 (e.g., memory device 220A and memory device 220B) may include memory as describe previously. A memory portion 222 that may contain instructions that when executed by processing device 210, perform one or more of the methods described in more detail herein. A memory device 220 may be further used as a working scratch pad for processing device 210, a temporary storage, and others, as the case may be. Memory device 220 may be a volatile memory such as, but not limited to, random access memory (RAM), or non-volatile memory (NVM), such as, but not limited to, flash memory. Processing device 210 and/or memory device 220 may also include machine-readable media for storing software. The term "software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, a network interface 230 (e.g., network interface 230A and network interface 230B) may be used for providing connectivity between the different components of system 150. Network interface 230 may provide two-way data communications to a network, such as communications network. In one embodiment, network interface 230 may include an Integrated Services Digital Network (ISDN) card, cellular modem, satellite modem, or a modem to provide a data communication connection over the Internet. As another example, network interface 230 may include a Wireless Local Area Network (WLAN) card. In another embodiment, network interface 230 may include an Ethernet port connected to radio frequency receivers and transmitters and/or optical (e.g., infrared) receivers and transmitters. The specific design and implementation of network interface 230 may depend on the communications network or networks over which computing device 170 is intended to operate. For example, in some embodiments, computing device 170 may include network interface 230 designed to operate over a GSM network, a GPRS network, an EDGE network, a Wi-Fi or WiMAX network, and a Bluetooth network. In any such implementation, network interface 230 may be configured to send and receive electrical, electromagnetic, or optical signals that carry digital data streams or digital signals representing various types of information. In some embodiments, an input interface 240 may be used by computing device 170 to receive input from a variety of input devices, for example, a keyboard, a mouse, a touch pad, a touch screen, one or more buttons, a joystick, a microphone, an image sensor, and any other device configured to detect physical or virtual input. The received input may be in the form of at least one of: text, sounds, speech, hand gestures, body gestures, tactile information, and any other type of physically or virtually input generated by the user. Consistent with one embodiment, input interface 240 may be an integrated circuit that may act as a bridge between processing device 210 and any of the input devices listed above.

In some embodiments, a data structure 250 (e.g., data structure 250A and data structure 250B) may be used for the purpose of storing single data type column-oriented data structures, data elements associated with the data structures, or any other data structures. The terms data structure and database, consistent with the present disclosure, may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, entity-relationship model, a graph, a hypergraph, a matrix, a tensor, and so forth. The data in the data structure may be stored in contiguous or non-contiguous memory. Moreover, a data structure does not require information to be co-located. In some examples, the data stored in data structure 250 may include an accessibility profile associated with one or more website users. While illustrated in FIG. 2 as a single device, it is to be understood that data structure 250A or data structure 250B may include multiple devices either collocated or distributed.

In addition, as illustrated in FIG. 2, memory portion 222B may contain software modules to execute processes consistent with the present disclosure. In particular, memory device 220B may include a shared memory module 262, a node registration module 263, a load balancing module 264, one or more computational nodes 265, an internal communication module 266, an external communication module 267, and a database access module (not shown). Modules 262-267 may contain software instructions for execution by at least one processor (e.g., processing device 210B) associated with server 133. Shared memory module 262, node registration module 263, load balancing module 264, computational node 265, and external communication module 267 may cooperate to perform various operations consistent with the present disclosure.

Shared memory module 262 may allow information sharing between artificial entity service host 130 and other components of system 150. In some embodiments, shared memory module 262 may be configured to enable processing device to access, retrieve, and store data. For example, using shared memory module 262, processing device 210B may perform at least one of: executing software programs stored on memory device 220B, data structure 250A, or data structure 250B; storing information in memory device 220B, data structure 250A, or data structure 250B; or retrieving information from memory device 220B, data structure 250A, or data structure 250B.

Node registration module 263 may be configured to track the availability of one or more computational nodes 265. In some examples, node registration module 263 may be implemented as: a software program, such as a software program executed by one or more computational nodes 265, a hardware solution, or a combined software and hardware solution. In some implementations, node registration module 263 may communicate with one or more computational nodes 265, for example, using internal communication module 266. In some examples, one or more computational nodes 265 may notify node registration module 263 of their status, for example, by sending messages: at startup, at shutdown, at constant intervals, at selected times, in response to queries received from node registration module 263, or at any other determined times. In some examples, node registration module 263 may query about the status of one or more computational nodes 265, for example, by sending messages: at startup, at constant intervals, at selected times, or at any other determined times.

Load balancing module 264 may be configured to divide the workload among one or more computational nodes 265. In some examples, load balancing module 264 may be implemented as: a software program, such as a software program executed by one or more of the computational nodes 265, a hardware solution, or a combined software and hardware solution. In some implementations, load balancing module 264 may interact with node registration module 263 in order to obtain information regarding the availability of one or more computational nodes 265. In some implementations, load balancing module 264 may communicate with one or more computational nodes 265, for example, using internal communication module 266. In some examples, one or more computational nodes 265 may notify load balancing module 264 of their status, for example, by sending messages: at startup, at shutdown, at constant intervals, at selected times, in response to queries received from load balancing module 264, or at any other determined times. In some examples, load balancing module 264 may query about the status of one or more computational nodes 265, for example, by sending messages: at startup, at constant intervals, at pre-selected times, or at any other determined times.

Internal communication module 266 may be configured to receive and/or to transmit information from one or more components of remote server 133. For example, control signals and/or synchronization signals may be sent and/or received through internal communication module 266. In one embodiment, input information for computer programs, output information of computer programs, and/or intermediate information of computer programs may be sent and/or received through internal communication module 266. In another embodiment, information received though internal communication module 266 may be stored in memory device 220B, in data structure 250B, or other memory device in system 150. For example, information retrieved from data structure 212A may be transmitted using internal communication module 266. In another example, input data may be received using internal communication module 266 and stored in data structure 212B.

External communication module 267 may be configured to receive and/or to transmit information from one or more components of system 150. For example, control signals may be sent and/or received through external communication module 267. In one embodiment, information received through external communication module 267 may be stored in memory device 220B, in data structures 250A and 250B, and on any memory device in the system 150. In another embodiment, information retrieved from data structure 250B may be transmitted using external communication module 267 to computing device 170.

Aspects of this disclosure may provide a technical solution to the challenging technical problem of providing accessible experiences to web users with disabilities. The technical solution may be implemented in hardware, in software (including in one or more signal processing and/or application specific integrated circuits), in firmware, or in any combination thereof, executable by one or more processors, alone, or in various combinations with each other. Specifically, disclosed embodiments include methods, systems, devices, and computer-readable media. For ease of discussion, system 150 is described above, however, a personal skilled in the art would recognize that the disclosed details may equally apply to methods, devices, and computer-readable media. Specifically, some aspects of disclosed embodiments may be implemented as operations or program codes in a non-transitory computer-readable medium. The operations or program codes can be executed by at least one processor. Non-transitory computer-readable media, as described herein, may be implemented as any combination of hardware, firmware, software, or any medium capable of storing data that is readable by any computing device with a processor for performing methods or operations represented by the stored data. In the broadest sense, the example methods are not limited to particular physical or electronic instrumentalities, but rather may be accomplished using many differing instrumentalities. In some embodiments, the disclosed methods may be implemented by processing device 210 of computing device 170, server 133, and/or server 133. In other embodiments, the non-transitory computer-readable medium may be implemented as part the memory portion 222 of memory device 220 that may contain the instructions to be executed by processing device 210. The instructions may cause processing device 210 corresponding to the at least one processor to perform operations consistent with the disclosed embodiments.

Figure 3B:
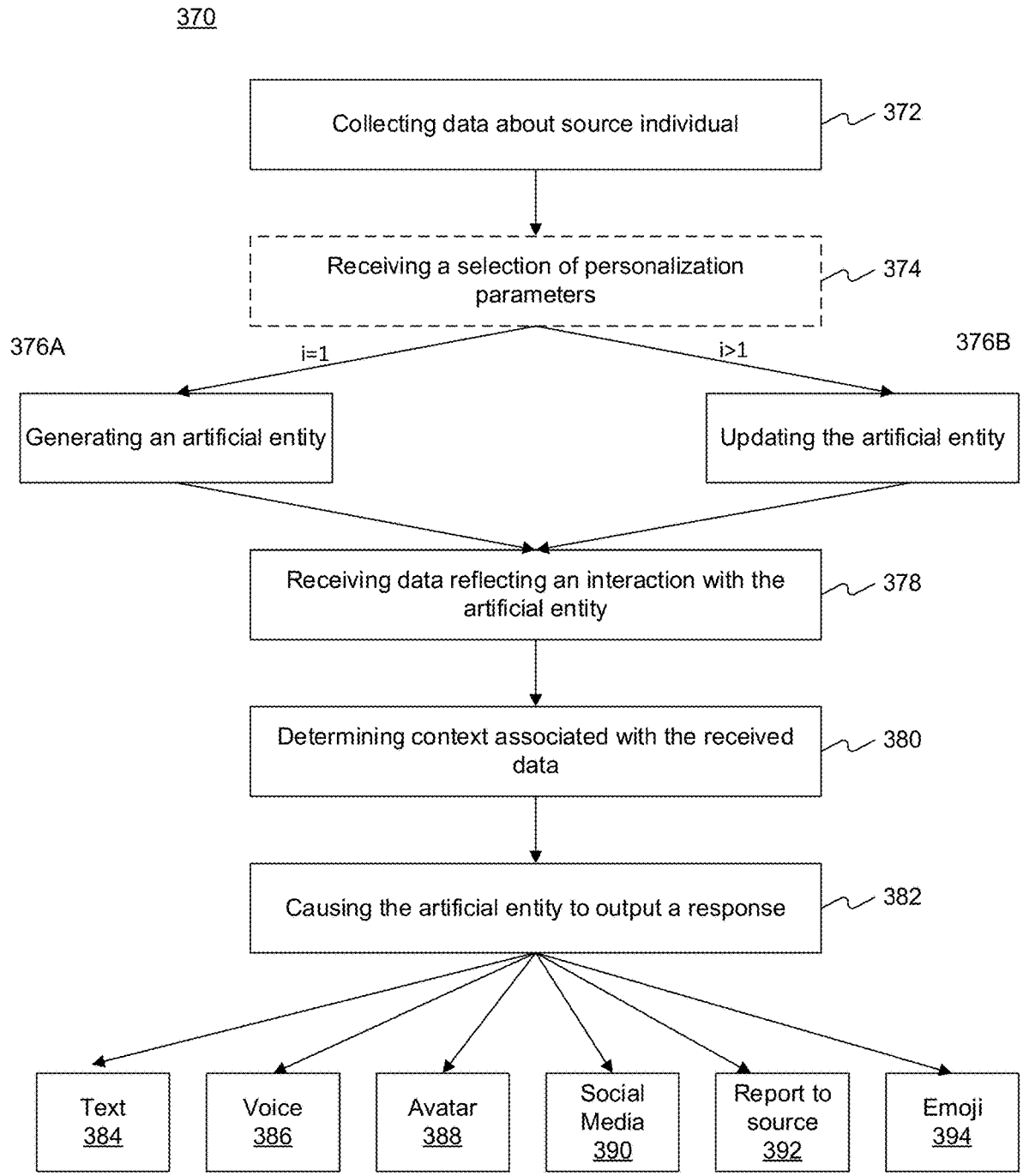
FIG. 3B is a flowchart of an example process for generating and operating artificial entities, consistent with some embodiments of the present disclosure.

FIG. 3B is a flowchart of an exemplary process 370 for generating and operating artificial entities, according to some embodiments of the present disclosure. In some embodiments, the process may be executed by different components of system 150. For example, some steps of process 370 may be implemented by a processing device within artificial entity service host 130 and/or a processing device within computing device 170. For purposes of illustration, in the following description, reference is made to certain components of system 150. It will be appreciated, however, that other implementations are possible and that any combination of components or devices may be utilized to implement the steps of the exemplary process. It will also be readily appreciated that the illustrated process can be altered to modify the order of steps, delete steps, or further include additional steps, such as steps directed to optional embodiments.

Process 370 begins when the processing device 210 collects data about the source individual 100 (step 372), such as input data 102. After collecting the data, the processing device 210 may receive a selection of personalization parameters (optional step 374). This selection enables better customization of the artificial entity. If this is the first time, the processing device 210 generates the artificial entity 110 (step 376A) based on the collected data and the received personalization parameters. If it is not the first time, the processing device 210 updates the artificial entity 110 (step 376B) using the collected data and the received personalization parameters. Thereafter, the processing device 210 may receive data reflecting an interaction with the artificial entity (step 378). Examples of the received data include text input: providing a prompt or a question is one of the simplest triggers, prompting the artificial entity to generate a response based on the text input it receives. Keywords and phrases: the artificial entity can be programmed to respond when specific keywords or phrases are detected in the input, making responses more relevant to the context provided by the user. User commands: explicit commands like "tell me," "explain," or "define" can trigger the artificial entity to generate informative responses, indicating that the user is seeking specific information. Questions: asking a question, especially one that ends with a question mark, often prompts the artificial entity to provide an answer, engaging it in a conversational mode. Direct address: addressing the artificial entity directly, like starting a sentence with "hello," signals the artificial entity to pay attention and respond to the user's input. Emotional context: emotional keywords or phrases like "happy," "sad," "excited," etc., prompt the artificial entity to generate responses that match the emotional tone. Contextual prompts: referring to previous parts of the conversation or using context to trigger a response creates a coherent and contextually relevant conversation. Specific topics: mentioning a specific topic, field, or subject triggers the artificial entity to provide information or engage in a conversation related to that topic. User intent: analyzing the user's intent based on the input triggers tailored responses. For instance, if the artificial entity detects that the user is looking for recommendations, it generates suggestions. Multi-turn conversation: engaging in a back-and-forth conversation prompts the artificial entity to continue generating responses in a conversational manner. Structured queries: inputting structured queries, such as database-like commands, triggers the artificial entity to retrieve specific information based on the query. Sentiment analysis: the artificial entity detects the sentiment of the user's input and generates responses that match the emotional tone detected. Language style: if the user employs a specific language style (e.g., formal, informal, technical), the artificial entity adjusts its responses accordingly. Time and date references: mentioning specific times, dates, or time-related queries triggers responses related to scheduling, events, or historical information. Requests for assistance: if the user seeks help, advice, or assistance, the artificial entity generates responses to fulfill these requests.

Upon receiving data reflecting an interaction with the artificial entity, process 370 may continue when processing device 210 determine context associated with the received data (step 380). For example, context 112 may be determined from the received data. Thereafter, processing device 210 may cause artificial entity 110 to output a response (step 382). Example types of response may include text 384, voice 386, avatar reaction 388, social media 390, reports to source individual 392, emoji 394.

The following detailed description provides a comprehensive explanation of a system and method for creating and managing an artificial entity associated with an individual. In one example, the artificial entity may be a digital clone, which is a replicated version of a person's digital data and characteristics, which can represent a person that is alive or deceased. The digital clone is capable of learning behavior patterns, fields of interest, relationships, speech attributes, and other characteristics of the source individual from various data sources and using this information to generate text, update its profile, and interact with users in a manner that mimics the source individual.

In one aspect of the disclosure, methods, systems, and software are provided for using artificial entities as representative of source individuals in their absence. The operations include receiving information associated with the source individual, generating an artificial entity to act as a surrogate for the source individual, receiving a query from a reference individual addressed to the artificial entity, anticipating how the source individual would answer the query, and causing the artificial entity to output a response to the query using the anticipated manner. The system can anticipate the manner based on an analysis of the received information, including speech patterns, audio or video recordings, and context associated with the query.

The system can also determine a timeline of the source individual, access a legacy letter created by the source individual, receive feedback from relatives of a deceased source individual, and update settings of the artificial entity based on the feedback. Additionally, the system can determine a replicated persona of the source individual, analyze a reaction of the reference individual to the response to the query, and update the artificial entity based on the reaction and associated closeness weights for the reference individual. The system can be used to provide responses to queries when the source individual is away, deceased, or otherwise unavailable.

Figure 4A:
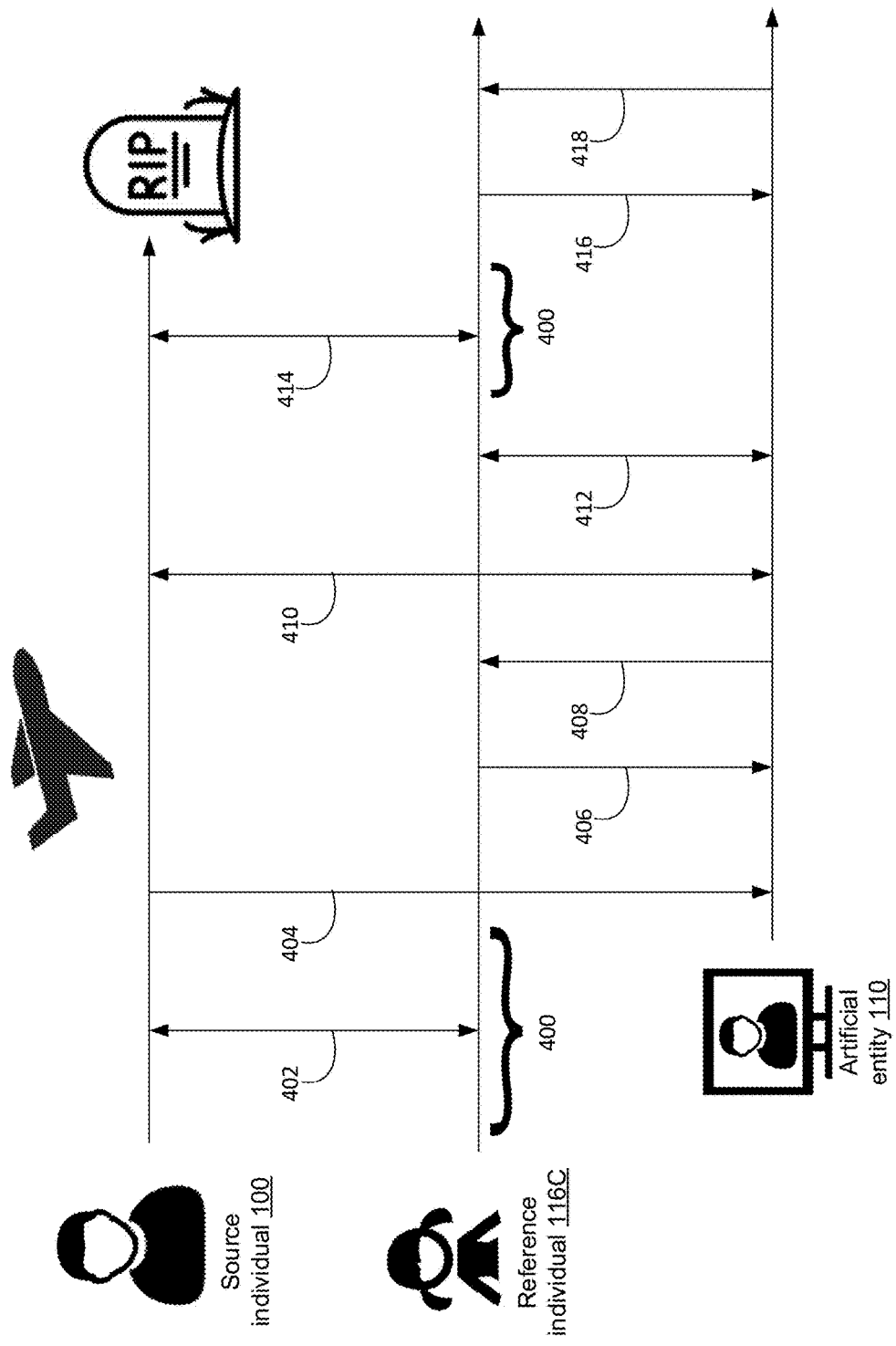
FIG. 4A is an illustration of a first use case for using an artificial entity, consistent with some embodiments of the present disclosure.

Some embodiments of the disclosure include "receiving information associated with a source individual." The term "receiving" refers to the process of obtaining, collecting, or acquiring data from an external source or system. This term encompasses a wide range of methods, such as receiving through digital communication channels, direct data input, or sensor readings. For example, in the context of this claim, receiving might involve collecting data from various sensors, online interactions, or personal devices to gather comprehensive information about the source individual. In addition, the term "information" refers to data, details, or knowledge communicated or received concerning a particular subject or individual. Information can be structured or unstructured and may include text, images, audio, video, or metadata. For instance, the information associated with a source individual may include their personal preferences, historical behaviors, communication patterns, or even biometric data. Moreover, the term "associated with a source individual" refers to the specific linkage or relevance of the information to a particular person or entity. This association means that the data pertains directly to the individual's actions, preferences, or characteristics. For example, this could involve collecting information on interactions the individual has with others, their activity on social media, or their responses to various stimuli. As illustrated in FIG. 4, the system may receive information 400 may include details on interactions 402 and 414 between source individual 100 and reference individual 116C.

Some embodiments of the disclosure include "generating an artificial entity for acting as a surrogate to the source individual based on the received information." The term "generating" refers to the process of creating, forming, or producing something new, often involving the use of technology or algorithms. In this context, generating might involve developing a virtual representation or avatar using machine learning algorithms or other computational methods to simulate the source individual's characteristics. In addition, the term "artificial entity" refers to a construct, model, or digital representation that mimics certain aspects of a human or another entity. This can include avatars, chatbots, virtual assistants, or more complex simulations capable of performing tasks or interacting with others. For example, the artificial entity might be programmed to replicate the speech patterns, decision-making processes, and preferences of the source individual. Moreover, the term "acting as a surrogate to the source individual" refers to the role of the artificial entity in representing or standing in for the actual person. This involves performing tasks, communicating, or making decisions on behalf of the source individual when they are unavailable or incapacitated. For example, the surrogate could answer questions, manage schedules, or even interact with others in a social or professional setting. As illustrated in FIG. 4, the artificial entity 110 may act as a surrogate when source individual 100 is away/unavailable or deceased.

Some embodiments of the disclosure include "receiving a query from a reference individual, the query is addressed to the artificial entity that acts as the surrogate of the source individual." The term "receiving" has been defined above. In addition, the term "query" refers to a question, request for information, or command directed at a system or individual to elicit a response or perform a task. Queries can be expressed in various forms, such as natural language, commands, or pre-defined inputs. For example, a query could involve asking for the source individual's opinion, seeking specific information, or requesting an action to be taken. Moreover, the term "from a reference individual" refers to the origin or source of the query, indicating that the request comes from a person or entity other than the artificial entity or the source individual. This individual is usually someone who has a relationship or connection with the source individual, such as a friend, family member, or colleague. For example, a reference individual might ask the artificial entity about the source individual's availability, preferences, or past actions. As illustrated in FIG. 4, artificial entity 110 may receive a query 406 from reference individual 116C when the source individual 100 is away and may receive a query 416 from reference individual 116C when the source individual 100 is deceased.

Some embodiments of the disclosure include "anticipating a manner in which the source individual would answer the received query." The term "anticipating" refers to the process of predicting, forecasting, or expecting a future event or response based on available data or patterns. This can involve using algorithms, historical data, or heuristic methods to make educated guesses about future actions. For example, anticipating in this context might involve analyzing the source individual's past responses to similar queries or using psychological models to predict likely reactions. In addition, the term "manner" refers to the way, style, or method in which something is done or expressed. This includes the tone, phrasing, and overall approach used in communication or behavior. For instance, the manner in which the source individual would answer could encompass their typical language use, emotional tone, or formal versus informal communication style. Moreover, the term "would answer the received query" refers to the hypothetical response that the source individual might provide if they were available to respond. This involves considering not only the content of the answer but also the way it is conveyed. For example, the system might predict a detailed explanation, a concise reply, or even a humorous comment, depending on the source individual's typical behavior. For example, the system would anticipate the manner based on an analysis of received information 400.

Some embodiments of the disclosure include "causing the artificial entity to output a response to the query using the anticipated manner." The term "causing" refers to the act of making something happen or bringing about a particular result through action or influence. In this context, causing involves the system's initiation of the response process, ensuring that the artificial entity delivers the anticipated reply. For example, this could involve activating the artificial entity's communication module to send a message, speak a response, or perform an action. In addition, the term "output" refers to the process of producing, delivering, or displaying information or a result from a system. Outputs can take various forms, such as visual displays, auditory signals, or written messages. For example, the artificial entity might output a response through a text message, an email, or a verbal statement via a digital assistant. Moreover, the term "response to the query using the anticipated manner" refers to the specific reply generated by the artificial entity that aligns with the predicted style and content expected from the source individual. This means that the response should not only address the content of the query but also mirror the way the source individual would typically communicate. For instance, the response could be crafted to be polite, direct, humorous, or detailed, depending on the anticipated manner. As illustrated in FIG. 4, a response 408 may be provided to reference individual 116C when the source individual 100 is away, and a response 418 may be provided to reference individual 116C when the source individual 100 is deceased.

Some embodiments of the disclosure include "the artificial entity acts as a surrogate to a deceased source individual and the received information includes details on the passing of the source individual." The term "deceased source individual" refers to a person who has passed away, where the artificial entity continues to interact with others as a representation of that person. The details on the passing might include significant dates, such as the date of death, or the cause of death, which are essential for the artificial entity to accurately simulate or refer to events that occurred during the individual's lifetime. For instance, the artificial entity may provide contextually appropriate responses regarding the individual's life or respond to queries about memorial arrangements. As illustrated in FIG. 4, received information 400 may include the date of passing and the cause of passing.

Some embodiments of the disclosure include "the response to the query includes at least one detail on the passing of the source individual." In this claim, the artificial entity is capable of providing responses that incorporate specific details about the passing of the individual. This may be used for providing closure or answering sensitive questions from those close to the deceased. For example, the response might include information about the circumstances of the individual's death, funeral arrangements, or the individual's final wishes. As illustrated in FIG. 4, response 418 may include at least one detail on the passing of source individual 100.

Some embodiments of the disclosure include "determining a timeline of the source individual based on the received information, and anticipating the manner in which the source individual would answer the received query based on the determined timeline." The term "timeline" refers to a chronological sequence of events or actions that provides context to the source individual's life or activities. This timeline helps the artificial entity understand the context and history of the source individual, thereby enabling more accurate responses to queries. For example, if a query relates to an event that occurred during a specific period in the individual's life, the artificial entity can provide a response that reflects the source individual's mindset or opinions from that time.

Related embodiments may include "accessing a legacy letter that the source individual created and generating the artificial entity based on the legacy letter." The term "legacy letter" refers to a document created by the source individual that outlines their wishes, thoughts, or guidance for the future, often intended to be read after their passing. This letter can include personal reflections, instructions for loved ones, or guidance on how to manage certain situations. For instance, the legacy letter might detail how the artificial entity should handle specific queries, maintain the individual's values, or manage interpersonal relationships. As illustrated in FIG. 4, the legacy letter may be part of the setting up process 404 in which source individual 100 defines how artificial entity 110 would operate in general and in times he or she is unavailable.

Related embodiments may involve "receiving feedback from relatives of the deceased source individual on the operations of the artificial entity and updating settings of the artificial entity based on the feedback." The term "feedback" refers to the responses, comments, or evaluations provided by relatives or close contacts regarding the performance or behavior of the artificial entity. This feedback is crucial for fine-tuning the artificial entity to better reflect the source individual's personality and preferences. For example, relatives might provide insights into the appropriateness of responses, suggest changes to communication style, or identify areas where the artificial entity could be improved to better honor the deceased's memory.

Some embodiments of the disclosure include "the artificial entity acts as a surrogate to an alive source individual and the received information includes feedback from the source individual to previous interactions of the artificial entity." The term "surrogate for an alive source individual" refers to an artificial entity representing a living person, acting on their behalf when they are unavailable or prefer not to engage directly. This setup allows the source individual to manage and oversee interactions indirectly. Feedback from the source individual might include evaluations of the entity's responses, corrections, or adjustments to ensure alignment with the source individual's actual preferences and intentions. For example, the artificial entity might report on interactions, and the source individual could then refine its responses based on these reports. As illustrated in FIG. 4, interactions 410 may include reporting to source individual 100 about the response 408 that artificial entity 110 provided to reference individual 116C and feedback from source individual 100 on whether response 408 was appropriate.

Some embodiments of the disclosure include "reporting to the source individual about the interaction with the reference individual." The term "reporting" refers to the process of conveying information about past events or interactions. In this context, it involves the artificial entity providing a summary or detailed account of its interactions with reference individuals to the source individual. This allows the source individual to review and possibly adjust the entity's responses and behavior. For example, the report could include the nature of the queries, the responses given, and the reference individual's reactions, enabling the source individual to ensure that the artificial entity accurately represents them.

Some embodiments of the disclosure include "receiving feedback from the source individual on the operations of the artificial entity and updating settings of the artificial entity based on the feedback." The term "updating settings" refers to the process of modifying or adjusting the Configuration or operational parameters of the artificial entity based on input or feedback. This can involve changes in how the entity communicates, its decision-making processes, or its personality traits. For example, if the source individual feels that the artificial entity's responses were too formal, they might instruct it to adopt a more casual tone in future interactions. As illustrated in FIG. 4, in response to interactions 410, the system may update the settings of artificial entity 110, so it will be more kind to reference individual 116C.

Some embodiments of the disclosure include "the received information reflects speech patterns of the source individual, and anticipating the manner in which the source individual would answer the received query includes determining presentation for the response based on the speech patterns of the source individual." The term "speech patterns" refers to the distinctive manner in which a person speaks, including their tone, pitch, rhythm, vocabulary, and pronunciation. These patterns can be critical for the artificial entity to mimic the source individual's voice accurately. For example, if the source individual typically uses specific jargon, colloquialisms, or phrases, the artificial entity would incorporate these into its responses to maintain consistency and authenticity.

Some embodiments of the disclosure include "the received information includes an audio recording of the source individual, generating the artificial includes determining a voice of the source individual, and causing the artificial entity to output the response includes using a synthesized voice that mimics the voice of the source individual." The term "synthesized voice" refers to a digitally created voice that replicates the sound, tone, and speech patterns of a human voice. This is achieved through voice synthesis technology, which uses recordings and algorithms to produce realistic speech. For example, the artificial entity might use this synthesized voice to deliver messages or responses, ensuring that communication remains consistent with the source individual's vocal characteristics, even in their absence.

Some embodiments of the disclosure include "the received information includes a video recording of the source individual, generating the artificial includes determining a body language of the source individual, and causing the artificial entity to output the response includes using an avatar that mimics the body language of the source individual." The term "body language" refers to the non-verbal cues and movements that a person uses to communicate, including gestures, posture, facial expressions, and eye movements. This aspect of communication is crucial for creating a realistic and relatable avatar. For example, an avatar mimicking the source individual's body language could be used in video calls, virtual meetings, or other interactive scenarios, providing a more immersive and authentic experience.

Some embodiments of the disclosure include "determining context associated with the query and anticipating the manner in which the source individual would answer the received query based on the context." The term "context" refers to the circumstances or background information surrounding a particular event or interaction that influences its meaning or outcome. This includes factors like the relationship between the parties involved, the timing of the interaction, or the specific nature of the query. For example, understanding whether a query is formal or informal, personal or professional, can significantly influence the anticipated response.

In related embodiments, "the context includes an identity of the reference individual, and the operations include determining a level of intimacy between the source individual and the reference individual based on the received information, and anticipating the manner in which the source individual would answer the received query based on the determined level of intimacy." The term "level of intimacy" refers to the closeness or familiarity between individuals, often influencing communication style and content. This can range from formal acquaintanceships to close personal relationships. For instance, the artificial entity might provide more candid, detailed, or emotionally nuanced responses to close friends or family members compared to more distant acquaintances.

In related embodiments, "the context includes a topic of query of the reference individual, and the operations include determining a level of understanding that the source individual had on the topic based on the received information, and anticipating the manner in which the source individual would answer the received query based on the determined level of understanding." The term "level of understanding" refers to the depth of knowledge or expertise that the source individual possesses on a specific topic. This can affect how the artificial entity frames its responses, choosing between simplified explanations or detailed, technical discussions. For example, if the topic involves a specialized area where the source individual was an expert, the artificial entity might provide in-depth responses that reflect this expertise.

Some embodiments of the disclosure include "making a determination whether answering the query would reveal a private detail of the source individual and anticipating the manner in which the source individual would answer the received query based on the determination." The term "private detail" refers to sensitive or confidential information that the source individual might not want to be disclosed publicly. This could include personal opinions, health information, or confidential business details. The artificial entity may assess whether a query might lead to the revelation of such details and either provide a guarded response or decline to answer, based on the anticipated wishes of the source individual.

Some embodiments of the disclosure include "determining a replicated persona of the source individual and using the replicated persona to anticipate the manner in which the source individual would answer the received query." The term "replicated persona" refers to a constructed representation of the source individual's personality, preferences, and behaviors. This persona is created using collected data and is used by the artificial entity to simulate how the source individual would likely respond in various situations. For example, the replicated persona might include preferences for communication style, typical emotional responses, and decision-making patterns, all of which guide the artificial entity's interactions.

Some embodiments of the disclosure include "the received information reflects knowledge of the source individual, and anticipating the manner in which the source individual would answer the received query includes determining content for the response based on the knowledge of the source individual." The term "knowledge" refers to the information, skills, and expertise that the source individual possesses. This knowledge may be used by the artificial entity to provide informed and accurate responses to queries. For instance, if the source individual was knowledgeable about a particular subject, the artificial entity might use this knowledge to provide detailed and contextually appropriate responses, reflecting the individual's level of expertise.

Some embodiments of the disclosure include "analyzing a reaction of the reference individual to the response to the query and updating the artificial entity based on the reaction." The term "reaction" refers to the response or feedback provided by the reference individual following an interaction with the artificial entity. Analyzing this reaction can provide valuable insights into how well the artificial entity is performing and whether adjustments are necessary. For example, positive reactions might indicate that the entity is accurately representing the source individual, while negative reactions could suggest areas for improvement, such as tone, content, or emotional sensitivity.

Some embodiments of the disclosure include "associating closeness weights for reference individuals based on their relationships with the source individual, and updating the artificial entity based on the reaction of the reference individual to the response to query and an associated closeness weight for the reference individual." The term "closeness weights" refers to numerical or categorical values assigned to reference individuals based on the perceived closeness or importance of their relationship with the source individual. These weights help prioritize and customize interactions. For example, feedback from close family members might carry more weight in updating the artificial entity's settings than feedback from acquaintances, ensuring that the entity's behavior aligns more closely with the wishes of those who knew the source individual best.

Figure 4B:
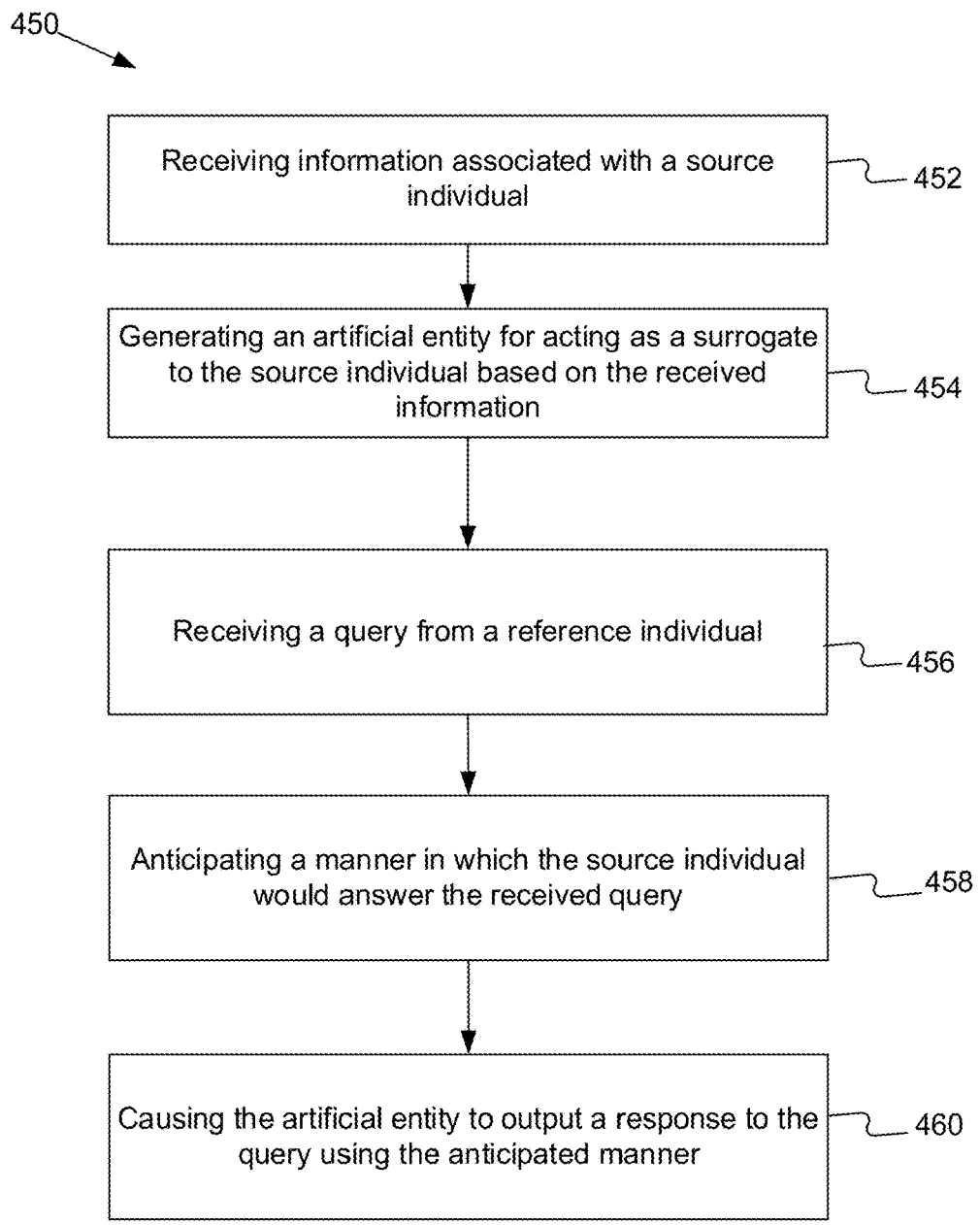
FIG. 4B is a flowchart of an example process associated with the first use case, consistent with some embodiments of the present disclosure.

FIG. 4B illustrates a flowchart of an exemplary process 450 for using artificial entities as representative of source individuals in their absence, consistent with embodiments of the present disclosure. In some disclosed embodiments, process 450 may be performed by at least one processor (e.g., processing device 210) to perform operations or functions described herein. In some disclosed embodiments, some aspects of process 450 may be implemented as software (e.g., program codes or instructions) that are stored in a memory (e.g., memory device 220) or a non-transitory computer-readable medium. In some disclosed embodiments, some aspects of process 450 may be implemented as hardware (e.g., a specific-purpose circuit). In some disclosed embodiments, process 450 may be implemented as a combination of software and hardware.

Referring to FIG. 4B, the flow chart of process 450 begins with step 452, which involves receiving information associated with a source individual. This information may include various data points such as the individual's voice recordings, historical interactions, emotional expressions, or preferences. In some cases, the system may gather this information passively through everyday interactions or actively through surveys or questionnaires. Thereafter, in step 454, the system generates an artificial entity for acting as a surrogate to the source individual based on the received information. This artificial entity may be a digital avatar, a virtual assistant, or a robotic interface designed to interact with users in a natural and engaging manner. The generation process includes programming the artificial entity with specific behavioral cues, enabling it to accurately mimic the source individual's style and responses. Step 456 involves receiving a query from a reference individual, where the query is addressed to the artificial entity acting as the surrogate of the source individual. This query can be in the form of text, audio, or video, and it is directed towards eliciting a response from the artificial entity that represents the source individual's perspective. In step 458, the system anticipates a manner in which the source individual would answer the received query. This anticipation process may involve analyzing the context of the query, the source individual's known preferences, past responses, and personality traits. The system uses this information to determine how the source individual would likely respond to the specific query, ensuring that the response aligns with their character and style. Finally, step 460 involves causing the artificial entity to output a response to the query using the anticipated manner. This step entails the actual execution of the response by the artificial entity, which may include spoken words, gestures, or other forms of communication. The response is designed to be natural and contextually appropriate, aiming to provide a seamless and engaging interaction for the reference individual.

In one aspect of the disclosure, methods, systems, and software are provided for enabling artificial entities to participate in digital activities on behalf of source individuals are described. These artificial entities are generated based on received information about the source individual and can engage in activities such as online meetings, classes, games, and customer service calls. The system determines how the artificial entity should respond to utterances during these activities, which can be based on various factors such as the identity of the speaker, the relationship between the source individual and other participants, the task assigned, and behavior patterns or preferences of the source individual. The artificial entities can also be tasked with retrieving information, scheduling appointments, and making travel reservations.

Additionally, the system can notify participants that the artificial entity represents the source individual and can provide summaries of the activities to the source individual afterward. The artificial entities' responses are tailored to the specific context of the digital activity, whether it be a professional meeting, an educational setting, or an entertainment platform, such as an online game. This embodiment allows for a versatile and personalized interaction experience, enhancing the efficiency and effectiveness of digital presence on behalf of source individuals.

Some embodiments of the disclosure include "receiving information associated with the source individual." The term "receiving" refers to the act of acquiring, obtaining, or gathering data or input. This process may involve capturing data through various means such as sensors, online forms, or direct communication. For example, in the context of this claim, receiving information could involve collecting details like preferences, schedules, or past interactions of the source individual. In addition, the term "information" refers to data or details that convey knowledge about something or someone. This can include a wide range of data types such as personal identifiers, preferences, activity logs, or communication history. For instance, the information received may include a source individual's name, email address, or preferences for online interactions. Moreover, the term "associated with the source individual" refers to the connection or relation of the information to the person for whom the artificial entity is created. This relationship may involve any relevant personal data that could influence the behavior of the artificial entity. For example, information associated with the source individual could include their professional role, social relationships, or specific instructions for interactions. As illustrated in FIG. 4, source individual 100 may be associated with information 500 that may include any detail that may be used to create a personal archive 106. Information 500 may be received by the system to generate artificial entity 110.

Some embodiments of the disclosure include "generating an artificial entity associated with the source individual based on the received information." The term "generating" refers to the process of creating, producing, or forming something. In this context, it involves the creation of a digital or virtual representation based on certain criteria or data. For example, generating an artificial entity could include programming a software avatar that mimics the speech patterns and decision-making behaviors of the source individual. The term "artificial entity" was defined above. Moreover, the term "based on the received information" refers to the method or criteria used for creating the artificial entity, which relies on the previously gathered data. This relationship ensures that the artificial entity reflects the preferences, identity, and behavioral patterns of the source individual. For instance, an artificial entity could be generated with a specific personality or knowledge base that mirrors the source individual's professional expertise or personal style. As illustrated in FIG. 4, artificial entity 110 may be created using received information 500.

Some embodiments of the disclosure include "receiving a request from the source individual to deploy the artificial entity in a digital activity that can involve one or more human participants." The term "receiving" has been defined above. In addition, the term "request" refers to an appeal, solicitation, or instruction initiated by the source individual. This may include various forms such as a command, invitation, or directive aimed at engaging the artificial entity in a specific action or event. For example, a request may involve scheduling the artificial entity to attend a meeting or engage in a customer service interaction. Moreover, the term "to deploy the artificial entity in a digital activity that can involve one or more human participants" refers to the action of making the artificial entity active or functional within a digital setting where it interacts with humans. This may include environments such as online meetings, chat rooms, or collaborative projects. For instance, the digital activity could be a video conference, an online class, or a social media interaction, where the artificial entity participates on behalf of the source individual. As illustrated in FIG. 4, request 502 may be an invitation for a digital activity 504, such as a video conference that includes a number of human participants 506.

Some embodiments of the disclosure include "receiving data reflecting an utterance articulated during the digital activity." The term "receiving" has been defined above. In addition, the term "data" refers to information, especially facts or Figures, that can be analyzed or used in decision-making. This may encompass audio recordings, text transcripts, or real-time speech data captured during a digital interaction. For instance, data reflecting an utterance may include a live transcription of spoken words during an online meeting or chat. Moreover, the term "reflecting an utterance articulated during the digital activity" refers to the representation or depiction of spoken words or statements made by participants. This can include capturing the content, tone, and context of what is said. For example, an utterance might be a question asked by a participant, a statement made during a discussion, or feedback provided in a collaborative setting. As illustrated in FIG. 4, utterance 508 may include a question asked by a human participant named Bill. In other cases, utterance 508 may be received by another artificial entity during the digital activity.

Some embodiments of the disclosure include "determining a manner for the artificial entity to respond to the utterance." The term "determining" refers to ascertaining, establishing, or arriving at an outcome by some process. This could involve analyzing data, applying algorithms, or using decision-making frameworks to decide how to act or respond. For example, determining a manner may include deciding whether the artificial entity should respond with a detailed explanation, a brief acknowledgment, or a counter-question. The term "manner" refers to the method, style, or approach used in responding. This can involve choosing the tone, content, and format of the response. For example, the manner could vary from formal to casual, depending on the context of the digital activity or the nature of the utterance. Moreover, the term "to respond to the utterance" refers to the act of addressing, replying to, or engaging with the statement or question made by another participant. This can include verbal responses, text messages, or even non-verbal cues like emojis or reaction icons in a digital environment. As illustrated in FIG. 4, the AI module 108 may be used to determine the manner in which the artificial entity responds to the utterance.

Some embodiments of the disclosure include "causing the artificial entity to participate in the digital activity on behalf of the source individual and to respond to the utterance using the determined manner." The term "causing" refers to the action of making something happen or bringing about an effect. This involves triggering or initiating a sequence of actions or responses by the artificial entity. For example, causing the artificial entity to participate may involve activating the entity to join a conversation or perform a task during a digital interaction. The term "artificial entity" was defined above. Moreover, the term "to participate in the digital activity on behalf of the source individual" refers to the engagement of the artificial entity in an event, interaction, or task where it acts as a representative or proxy for the source individual. This can include attending meetings, answering questions, or providing information. For instance, the artificial entity could be programmed to deliver a presentation, respond to queries, or perform administrative tasks. As illustrated in FIG. 4, the artificial entity 110 may generate a response 510 to address utterance 508 based on the determined manner.

Some embodiments of the disclosure include "receiving an invitation for the digital activity, analyzing the invitation to identify a link for the digital activity, and enabling the artificial entity to participate in the digital activity using the link." The term "invitation" refers to a request or solicitation for someone to join or participate in an event or activity. This can include digital invitations sent via email, messaging platforms, or calendar applications. For example, an invitation may contain details such as the time, date, and nature of the activity, along with a hyperlink to join the event. In one implementation, analyzing the invitation may involve parsing the content to extract relevant information, such as the link, which the artificial entity uses to access the activity. This process may also include verifying the authenticity of the invitation to prevent unauthorized access. As illustrated in FIG. 4, request 502 may include a link to a video conference.

Some embodiments of the disclosure include "identifying that the utterance was articulated by a human participant, and the manner to respond to the utterance is determined based on the identification that the utterance was articulated by the human participant." The term "identifying" refers to the process of recognizing or determining the nature of something or someone. This can involve using various methods such as speech recognition, context analysis, or user authentication to ascertain the identity of a participant in a digital activity. For example, identifying a human participant may involve distinguishing their voice or analyzing metadata from their digital signature. In this context, the response manner may vary depending on the participant's role, relationship with the source individual, or previous interactions. As illustrated in FIG. 4, in some cases, the manner to respond to the utterance is determined based on the identity of the individual, the role or position of the human participant, or the relationship between the source individual and the human participant.

Some embodiments of the disclosure include "identifying that the utterance was articulated by another artificial entity, and the manner to respond to the utterance is determined based on the identification that the utterance was articulated by another artificial entity." The term "another artificial entity" refers to an additional digital or virtual agent involved in the digital activity. This can include AI-driven bots, virtual assistants, or other automated systems designed to interact in a human-like manner. For example, another artificial entity may be programmed to assist with customer service, provide information, or facilitate communication in a virtual meeting. The manner of response may be adjusted based on the characteristics or programming of the other artificial entity, including its level of sophistication, purpose, or the specific instructions it operates under. As illustrated in FIG. 4, the response manner may be influenced by the identity of the individual associated with the other artificial entity, the role or position of that individual, or the relationship between the source individual and the individual associated with the other artificial entity.

Some embodiments of the disclosure include "the request from the source individual to deploy the artificial entity in the digital activity identifies a task for the artificial entity to complete in the digital activity, and determining the manner for the artificial entity to respond to the utterance is based on the identified task." The term "task" refers to a specific piece of work or activity assigned to be completed. This can range from simple actions, such as answering questions, to more complex processes, like analyzing data or coordinating schedules. For example, the task identified in the request may include delivering a presentation, participating in a discussion, or gathering information. The manner of response may be tailored to effectively accomplish the task, ensuring that the artificial entity fulfills its role in the digital activity. In some cases, the task may be detailed, specifying particular actions or responses required during the activity.

Some embodiments of the disclosure include "the task includes at least one of: retrieving information on a specific topic, scheduling an appointment for the source individual, or making a travel reservation for the source individual." The term "retrieving information" refers to the process of searching for, accessing, and gathering data or details on a particular subject. This may involve using databases, internet searches, or specialized knowledge repositories. For example, the artificial entity might retrieve data about market trends, legal regulations, or technical specifications based on the source individual's needs. Additionally, the task of scheduling an appointment may include coordinating with multiple participants, checking availability, and confirming the details of the meeting. Making a travel reservation may involve selecting travel options, booking tickets, and arranging accommodations. These tasks require the artificial entity to interact with various systems and interfaces to complete the required actions.

Some embodiments of the disclosure include "the request from the source individual is associated with multiple assignments corresponding to a plurality of digital activities, and operations further include providing to the source individual a report that summarizes the outcome of the multiple assignments." The term "assignments" refers to specific duties, tasks, or responsibilities given to the artificial entity to carry out. These assignments may span various activities, such as attending different meetings, conducting research, or managing communications. For example, the artificial entity might be tasked with gathering insights from several webinars, negotiating with vendors, or providing customer support. The report provided to the source individual summarizes these activities, detailing what was accomplished, any key points or decisions made, and potential follow-up actions. This report helps the source individual stay informed and make decisions based on the artificial entity's actions.

Some embodiments of the disclosure include "providing a notice to participants of the digital activity that the artificial entity represents the source individual during this digital activity." The term "notice" refers to an official or formal communication that informs participants about a specific fact or situation. This notice may be delivered through various channels, such as emails, messages within the digital platform, or announcements at the start of the activity. For example, the notice might clarify that the artificial entity is acting on behalf of the source individual, ensuring transparency and setting appropriate expectations for interactions. This helps participants understand that they are interacting with an AI representative rather than the source individual directly, which may influence the nature of their engagement.

Some embodiments of the disclosure include "the digital activity is an online meeting." The term "online meeting" refers to a virtual gathering conducted over the internet where participants can interact in real-time. This may include video conferencing, voice calls, or text-based communication, often facilitated by software platforms like Zoom, Microsoft Teams, or Google Meet. For example, an online meeting may be held for business discussions, educational purposes, or social gatherings. The artificial entity's participation in such meetings can include attending on behalf of the source individual, taking notes, contributing to discussions, or making presentations. The role and behavior of the artificial entity in these meetings may be tailored to reflect the source individual's preferences and style of communication.

Some embodiments of the disclosure include "analyzing the received information to determine behavior patterns of the source individual, and determining the manner for the artificial entity to respond to the utterance based on the behavior patterns of the source individual." The term "behavior patterns" refers to the typical ways in which a person acts or responds in various situations. This may include preferred communication styles, decision-making processes, or common reactions to specific scenarios. For example, analyzing behavior patterns could involve reviewing past interactions, emails, or meeting notes to understand how the source individual typically handles questions, conflicts, or decision-making situations. The artificial entity uses this analysis to mimic the source individual's behavior, providing responses that are consistent with their usual approach, thus maintaining a seamless representation in the digital activity.

Some embodiments of the disclosure include "providing the source individual a summary of content presented in the online meeting and what the artificial entity said during the online meeting." The term "summary" refers to a condensed version of content that highlights the main points and key information. This summary may include topics discussed, decisions made, and any important messages conveyed by the artificial entity. For example, the summary could detail agenda items, action points, and significant interactions, providing the source individual with a comprehensive overview of the meeting. This allows the source individual to stay informed and follow up on relevant matters, even if they were not present for the meeting.

Some embodiments of the disclosure include "the digital activity is an online class." The term "online class" refers to a structured educational session conducted over the internet, typically involving a teacher or instructor and students. This can include live lectures, interactive discussions, and access to digital resources such as slides, readings, and assignments. For example, an online class may cover various subjects, from academic courses to professional training. The artificial entity may participate in the class on behalf of the source individual, asking questions, engaging in discussions, or taking notes. This participation can help the source individual manage their educational commitments and ensure they stay up-to-date with the course material.

Some embodiments of the disclosure include "analyzing the received information to determine a level of understanding of the source individual, and determining the manner for the artificial entity to respond to the utterance based on the level of understanding of the source individual." The term "level of understanding" refers to the depth of knowledge or comprehension a person has regarding a particular subject. This can range from basic awareness to expert proficiency. For example, the artificial entity may assess the source individual's familiarity with a topic to tailor responses that are appropriate and helpful. This could involve providing simplified explanations, offering additional resources, or engaging in more advanced discussions, depending on the source individual's expertise and learning needs.

Some embodiments of the disclosure include "providing the source individual a summary of content presented in the online class based on the level of understanding of the source individual." The term "content" refers to the material presented during the online class, including lectures, discussions, and visual aids. The summary provided to the source individual may be customized to match their level of understanding, ensuring that the information is accessible and relevant. For example, the summary might include key concepts, critical points from discussions, and suggestions for further study or clarification. This approach helps the source individual effectively absorb and apply the knowledge gained from the class.

Some embodiments of the disclosure include "the digital activity is an online game and the utterance articulated is spoken by one of the players in the online game." The term "online game" refers to a digital game played over the internet, involving multiple players who may compete or collaborate. This can include a wide range of game genres, such as strategy, role-playing, or action games. For example, players may interact through voice chat, text messages, or in-game actions, discussing strategies, making decisions, or socializing. The artificial entity can participate in these games on behalf of the source individual, engaging with other players and responding to their communications. The utterances articulated by players may involve coordinating actions, issuing commands, or providing feedback.

Some embodiments of the disclosure include "analyzing the received information to determine a skill level of the source individual for playing the online game, and determining the manner for the artificial entity to respond to the utterance based on the skill level of the source individual." The term "skill level" refers to the degree of proficiency or expertise a person has in performing a specific task or activity. This can range from novice to expert levels. For example, in the context of an online game, the artificial entity may assess the source individual's gameplay history, achievements, and style to understand their skill level. The manner of response to other players may be adjusted accordingly, ensuring that the artificial entity's actions are aligned with the source individual's capabilities, such as choosing appropriate strategies or engaging in a level of play that matches their skills.

Some embodiments of the disclosure include "providing the source individual a summary on how the artificial entity played the online game." In this context, the summary may detail the artificial entity's performance, including key actions taken, strategies employed, and interactions with other players. For example, the summary might highlight significant achievements, challenges faced, and decisions made during the game. This information can help the source individual understand the outcomes of the game and learn from the artificial entity's gameplay, potentially improving their skills for future gaming sessions.

Some embodiments of the disclosure include "the digital activity is a call with customer service." The term "call with customer service" refers to a telephone or online conversation with a company's support team, typically aimed at resolving issues, answering questions, or providing assistance. For example, these calls may involve troubleshooting technical problems, handling billing inquiries, or addressing customer complaints. The artificial entity can participate in these calls on behalf of the source individual, acting as an intermediary to communicate with the customer service representative. This can streamline the process and ensure that the source individual's concerns are addressed efficiently and accurately.

Some embodiments of the disclosure include "analyzing the received information to determine preferences of the source individual, and determining the manner for the artificial entity to respond to the utterance based on the preferences of the source individual." The term "preferences" refers to the source individual's specific likes, dislikes, or inclinations regarding certain options or actions. This may include preferred communication styles, desired outcomes, or particular approaches to problem-solving. For example, the artificial entity may consider whether the source individual prefers detailed explanations or concise responses, values a formal tone, or appreciates a more casual approach. These preferences can influence how the artificial entity interacts with the customer service representative, ensuring the conversation aligns with the source individual's expectations.

Some embodiments of the disclosure include "providing the source individual a summary of the call with customer service." In this context, the summary may include details about the issues discussed, resolutions offered, and any follow-up actions required. For example, the summary might note key points from the conversation, such as the steps taken to resolve a technical issue, changes made to an account, or instructions for returning a product. This ensures that the source individual is fully informed about the outcomes of the call and can take any necessary actions based on the information provided by the customer service representative.

Figure 5A:
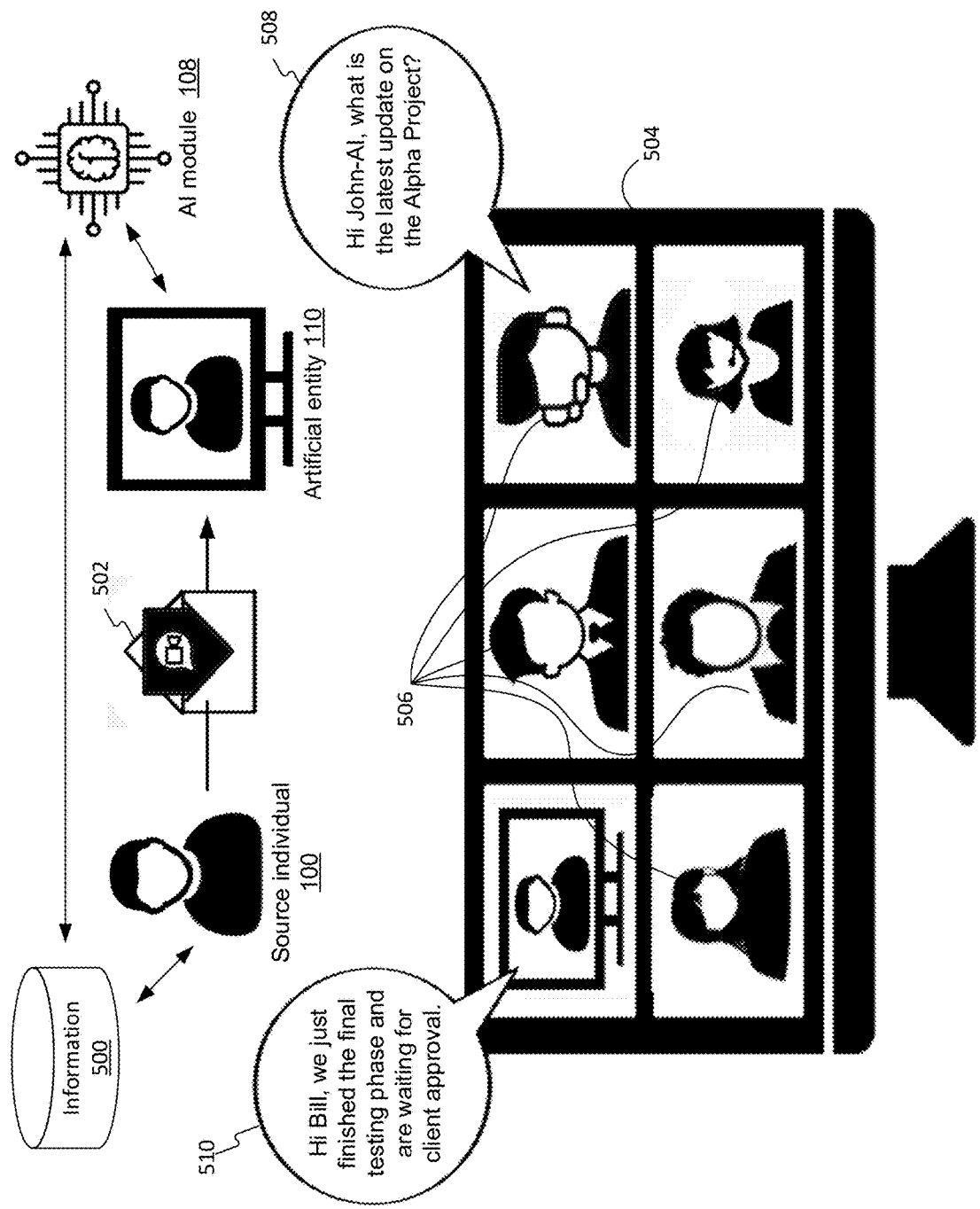
FIG. 5A is an illustration of a second use case for using an artificial entity, consistent with some embodiments of the present disclosure.
Figure 5B:
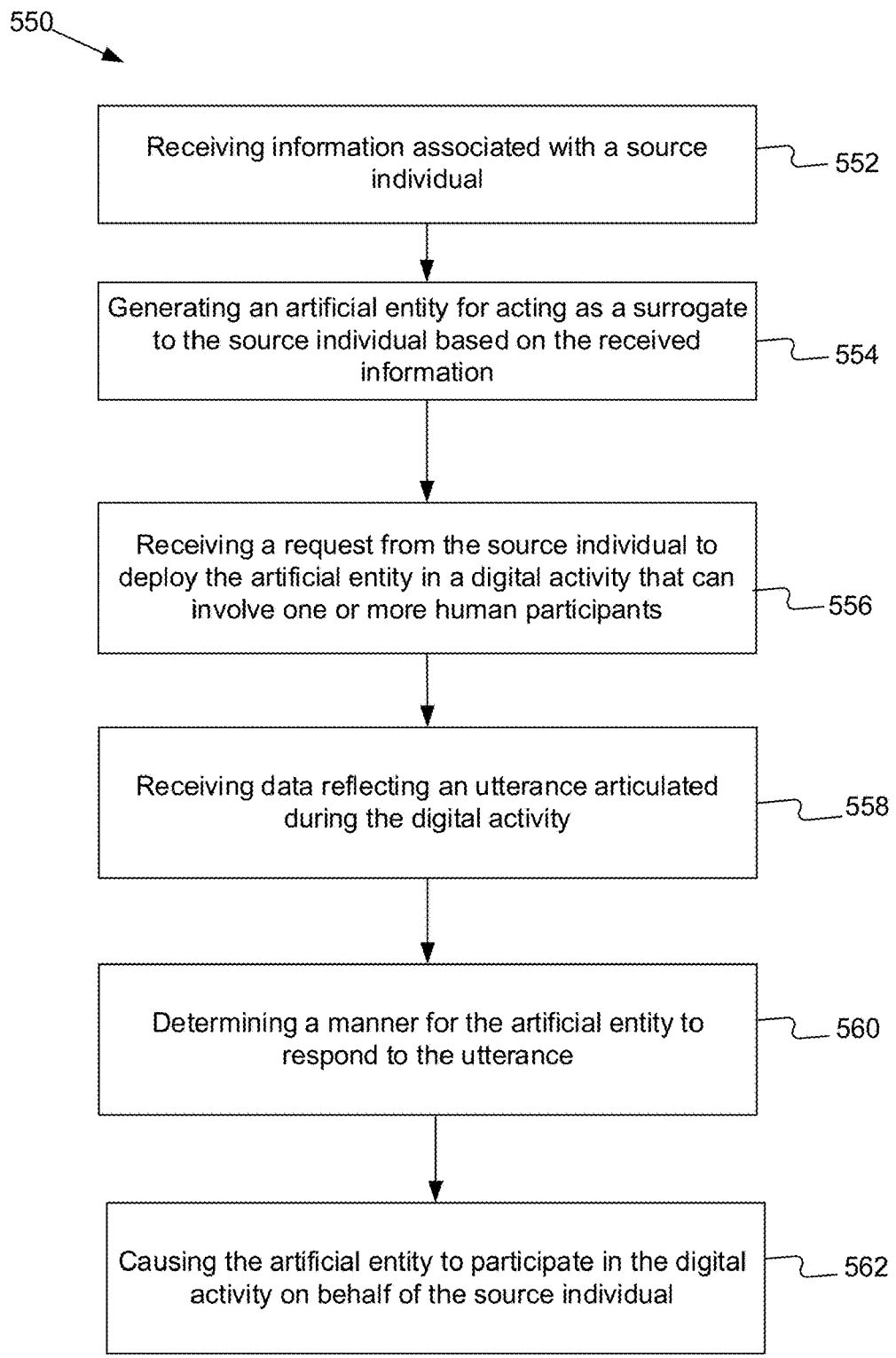
FIG. 5B is a flowchart of an example process associated with the second use case, consistent with some embodiments of the present disclosure.

FIG. 5B illustrates a flowchart of an exemplary process 550 for using artificial entities as representative of source individuals in their absence, consistent with embodiments of the present disclosure. In some disclosed embodiments, process 550 may be performed by at least one processor (e.g., processing device 210) to perform operations or functions described herein. In some disclosed embodiments, some aspects of process 550 may be implemented as software (e.g., program codes or instructions) that are stored in a memory (e.g., memory device 220) or a non-transitory computer-readable medium. In some disclosed embodiments, some aspects of process 550 may be implemented as hardware (e.g., a specific-purpose circuit). In some disclosed embodiments, process 550 may be implemented as a combination of software and hardware.

Referring to FIG. 5B, the flow chart of process 550 begins with step 552, which involves receiving information associated with a source individual. This information may include data points such as the individual's voice recordings, historical interactions, emotional expressions, or preferences, as described elsewhere in the disclosure. The system may gather this information passively through everyday interactions or actively through surveys or questionnaires. In step 554, an artificial entity associated with the source individual is generated based on the received information. This artificial entity could be a digital avatar, a virtual assistant, or a robotic interface designed to interact with users in a natural and engaging manner. The generation process includes programming the artificial entity with characteristics and behaviors derived from the source individual's data. Step 556 involves receiving a request from the source individual to deploy the artificial entity in a digital activity that can involve one or more human participants. This request specifies the nature of the digital activity, which could range from online meetings and social interactions to customer service calls and online gaming. In step 558, the system receives data reflecting an utterance articulated during the digital activity. This data can include audio, text, or other forms of communication that capture the interaction between the artificial entity and the participants. The analysis of this data is crucial for understanding the context and tone of the interaction. In step 560, a manner for the artificial entity to respond to the utterance is determined, followed by causing the artificial entity to participate in the digital activity on behalf of the source individual and to respond to the utterance using the determined manner. This step ensures that the artificial entity's responses are appropriate and consistent with the source individual's style, enhancing the engagement and authenticity of the interaction. In step 562 the system may cause the artificial entity to participate in the digital activity on behalf of the source individual and to respond to the utterance using the determined manner.

In one aspect of the disclosure, methods, systems, and software are provided for utilizing artificial entities as artificial assistants. Embodiments related to this aspect may involve receiving information indicative of relationships between a source individual and a plurality of individuals, analyzing the received information to determine a record of the source individual, receiving a selection of a personality trait for an artificial assistant, generating an artificial entity that would function as the artificial assistant for the source individual, receiving an assignment of a task for the artificial entity, and causing the artificial entity to complete the task according to the selected personality trait and the determined record of the source individual. The operations may further include determining a profile for the artificial entity based on the record of the source individual and the selected personality trait, receiving feedback from the source individual or the at least one individual on the manner in which the artificial entity interacted with them, and updating the profile of the artificial entity based on the feedback.

Other embodiments may involve determining a manner for completing a task associated with the target individual based on a relationship between the source individual and the target individual, accounting for interactions occurred in past tasks when determining a specific manner for completing an outstanding task, and providing a report for the source individual that includes at least one detail on the interaction with the at least one individual. Additionally, the operations may include receiving data on a schedule of the source individual, identifying at least one optional task that will require the artificial entity to independently interact with one or more individuals, and offering the source individual to complete the at least one optional task.

Some embodiments of the disclosure include "utilizing artificial entities as artificial assistants". The term "utilizing artificial entities as artificial assistants" refers to the process of using computer-generated entities to assist individuals in completing tasks that require interaction with other individuals. This may involve creating an artificial entity with a specific personality trait, assigning a task to the artificial entity, and allowing it to independently interact with a target individual to complete the task. For example, in the context of a customer service application, an artificial entity may be created to assist customers with their inquiries. The personality trait selected by the source individual may be friendly or professional, depending on the nature of the business. The task assigned to the artificial entity may be to provide information about a product or service, and the interaction with the target individual may involve answering questions or addressing concerns. In another example, the artificial entity may be created to assist a user with scheduling appointments. The personality trait selected by the source individual may be organized or efficient, and the task assigned to the artificial entity may be to schedule a meeting with a target individual. The interaction with the target individual may involve coordinating schedules and confirming availability. Overall, the term "utilizing artificial entities as artificial assistants" encompasses a wide range of applications where computer-generated entities are used to assist individuals in completing tasks that require interaction with other individuals.

Figure 6A:
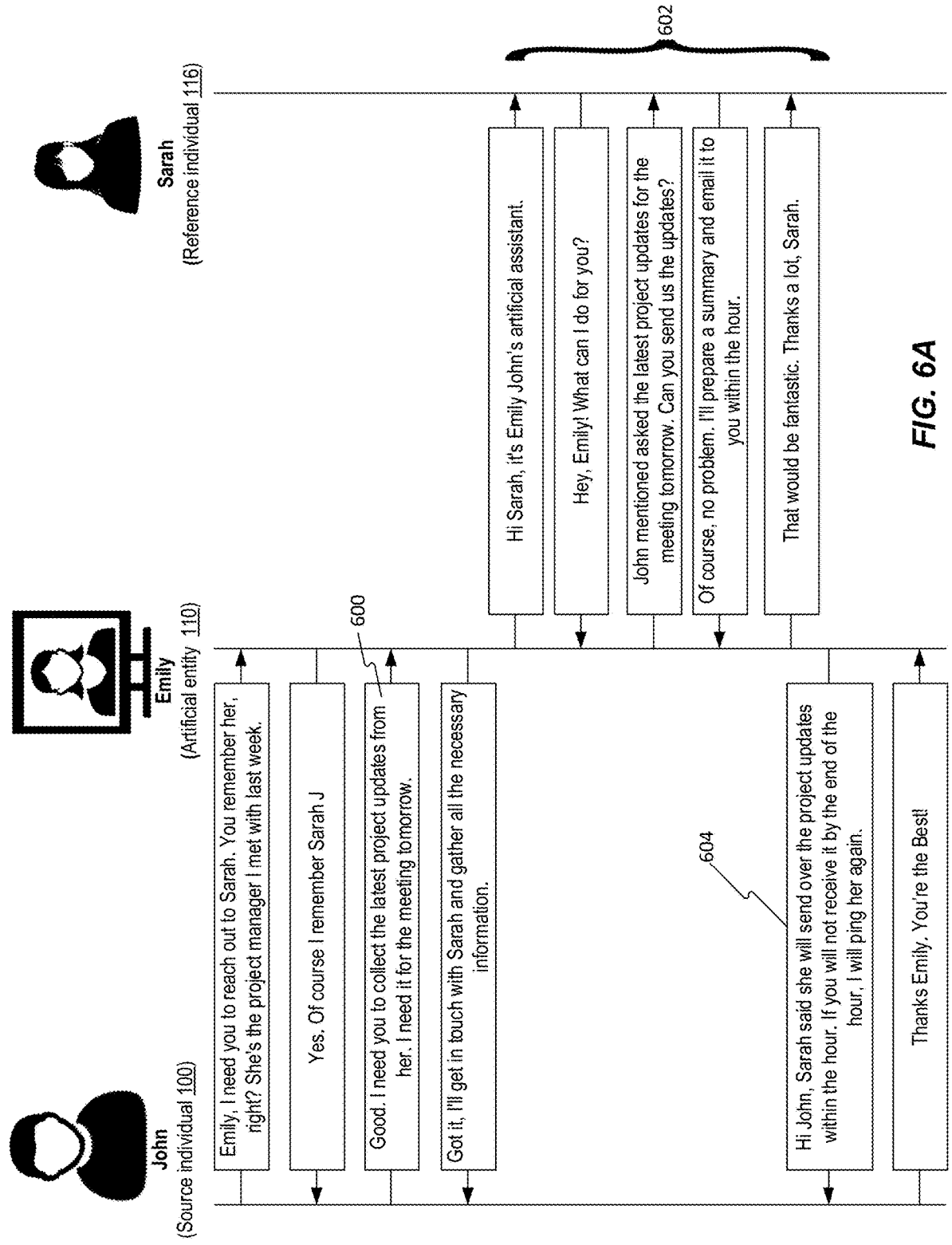
FIG. 6A is an illustration of a third use case for using an artificial entity, consistent with some embodiments of the present disclosure.

Some embodiments of the disclosure include "receiving information indicative of a plurality of relationships between a source individual and a plurality of individuals." The term "receiving" refers to the process of accepting or obtaining data from an external source. This can encompass actions such as downloading, collecting, or otherwise acquiring information via various communication methods like emails, databases, or direct user inputs. For example, a system may receive data from a social media platform indicating the connections a user has with other individuals. In addition, the term "information" refers to any data or knowledge communicated or received concerning particular facts or circumstances. This may include structured data like names, addresses, relationship types, or unstructured data like text messages and emails. For example, information may be a dataset indicating who the source individual interacts with frequently or sporadically. Moreover, the term "relationships between a source individual and a plurality of individuals" refers to the various types of connections or associations that a person has with multiple other people. These relationships may include professional collaborations, personal friendships, family ties, or any other social connections. The received information may indicate the connections or associations between the source individual and multiple individuals. This information may include the nature of the relationship, the frequency of interaction, the duration of the relationship, and any other relevant details. Examples of the "plurality of relationships between a source individual and a plurality of individuals" may include social media connections, email contacts, phone contacts, and any other form of communication or interaction between the source individual and other individuals. The information may be obtained from various sources, such as social media platforms, email accounts, phone records, and other relevant sources. For example, a source individual like John may have relationships with colleagues, friends, and family members documented in the received information. With reference to FIG. 6A, the received information may be indicative of a relationship with source individual 100 (John) with reference individual 116 (Sarah).

Some embodiments of the disclosure include "analyzing the received information to determine a record of the source individual." The term "analyzing" refers to examining data methodically and in detail, typically for purposes of explanation and interpretation. This can involve processes like data mining, statistical analysis, or applying machine learning algorithms to understand patterns or relationships within the data. For example, a system may analyze social media interactions to identify the strength and nature of relationships between the source individual and others. The analyzing step may also involve identifying any potential conflicts or issues that may arise during the interaction between the artificial entity and a reference individual, based on past interactions or other contextual factors. In some cases, the term "analyzing" may also refer to the process of validating or verifying the received information, to ensure that it is accurate and reliable. This may involve cross-referencing the information with other sources or conducting additional research to fill in any gaps or inconsistencies. The term "a record of the source individual" refers to a documented or stored set of data that describes the characteristics, behaviors, or relationships of the source individual. This may include their interaction history, preferences, or any other relevant details that help build a comprehensive profile. For example, a record may indicate that John frequently collaborates with Sarah on projects and communicates regularly with her. As illustrated in FIG. 6A, the record may indicate that John works with Sarah.

Some embodiments of the disclosure include "receiving from the source individual a selection of a personality trait for an artificial assistant." The term "receiving" was defined above. In addition, the term "selection" refers to the process of choosing or picking something from a set of options. This can involve making a decision based on preferences, requirements, or other criteria. For example, John may select "politeness" from a list of available personality traits for the artificial assistant. Moreover, the term "personality trait for an artificial assistant" refers to a specific characteristic or quality attributed to the artificial entity designed to assist the user. These traits may influence how the assistant interacts with others and performs tasks. For example, personality traits may include adaptability, clarity, politeness, resourcefulness, enthusiasm, confidentiality, and efficiency. The personality trait may be selected based on the source individual's preferences or needs. In other embodiments, the personality trait may be randomly assigned or selected from a predetermined list of traits. In some embodiments, the personality trait may affect the way the artificial entity interacts with the target individual. For instance, if the personality trait is friendly, the artificial entity may use a more casual tone or approach when interacting with an individual. As illustrated in FIG. 6A, the selection may include feedback from the source individual on the past actions.

Some embodiments of the disclosure include "generating an artificial entity that would function as the artificial assistant for the source individual." The term "generating" refers to the creation or production of something new through various processes or methods. This can involve programming, configuring, or otherwise setting up an artificial entity to perform specific tasks. For example, a system may generate a digital assistant using algorithms and data tailored to the user's preferences and requirements. The term "artificial entity" refers to a non-human agent created to simulate human activities or interactions, often powered by artificial intelligence. This can include digital assistants, chatbots, or virtual agents designed to perform specific functions. For example, an artificial entity like Emily may be created to assist John with his tasks. Moreover, the term "function as the artificial assistant" refers to the role the artificial entity takes on to support or aid the source individual. This may include performing tasks, providing information, or interacting with other individuals on behalf of the user. For example, the artificial assistant may schedule meetings, send messages, or manage other administrative tasks for John. As illustrated in FIG. 6A, artificial entity 110 (Emily) may be generated as John's artificial assistant.

Some embodiments of the disclosure include "receiving from the source individual an assignment of a task for the artificial entity, wherein completing the task requires the artificial entity to independently interact with at least one of the plurality of individuals." The term "receiving" was defined above. In addition, the term "assignment of a task" refers to the allocation or designation of a specific duty or job to be completed. This can involve giving instructions, setting objectives, or outlining responsibilities. For example, John may assign Emily the task of scheduling a meeting with Sarah. Moreover, the term "interact with at least one of the plurality of individuals" refers to the process of communicating or engaging with one or more people from the group previously identified. This may include various forms of interaction such as conversations, messages, or collaborative activities. For example, Emily may need to send an email or message to Sarah to complete the assigned task. As illustrated in FIG. 6A, the assignment may be part of a conversation between John and Emily. Specifically, message 600 may be considered as an assignment of a task.

Some embodiments of the disclosure include "causing the artificial entity to complete the task according to the selected personality trait and the determined record of the source individual." The term "causing" refers to the action of making something happen or ensuring that a specific result is achieved. This can involve triggering processes, initiating actions, or guiding activities to completion. For example, the system may activate Emily to start performing the assigned task. The term "artificial entity" was defined above. The term "selected personality trait" was defined above. Moreover, the term "determined record of the source individual" refers to the specific data or profile that has been created based on the analysis of the received information about the user. This record helps tailor the actions and interactions of the artificial entity to suit the user's preferences and context. For example, the record may detail John's work patterns, preferred communication styles, and key relationships to ensure Emily's actions align with his needs. As illustrated in FIG. 6A, Emily may trigger a communication session (602) with Sarah, that may be considered as completing the task.

Some embodiments of the disclosure include "generating the artificial entity includes determining a profile for the artificial entity based on the record of the source individual and the selected personality trait." The term "determining" refers to ascertaining, establishing, or arriving at an outcome by some process. This can involve analyzing data, applying algorithms, or consulting predefined criteria to decide on a course of action. For example, determining a profile may include setting communication styles, preferred interaction methods, and task management preferences tailored to the user's needs. Additionally, creating a detailed profile involves understanding nuances in the source individual's behavior and relationships, ensuring the artificial assistant is highly personalized. For example, the system may create a profile for Emily that aligns with John's professional and personal interaction styles.

Some embodiments of the disclosure include "receiving feedback from the source individual on a first manner in which the artificial entity interacted with the at least one individual; and updating the profile of the artificial entity based on the feedback such that the artificial entity will complete future tasks that involve independently interacting with individuals in a second manner." The term "feedback" refers to information provided regarding reactions or responses to a specific action or task. This may include comments, ratings, or any form of evaluation. For example, John may provide feedback that Emily was too formal in her interactions. Updating the profile based on this feedback ensures that the artificial assistant adapts to preferred interaction styles over time, enhancing its effectiveness and user satisfaction. For example, John's feedback on Emily's initial interaction with Sarah can lead to adjustments in how Emily communicates in future tasks.

Some embodiments of the disclosure include "the second manner is more formal than the first manner." The term "manner" refers to a way in which a task is completed or an interaction is conducted. This encompasses the tone, style, and approach taken. For example, a formal manner may involve using professional language, maintaining a certain level of decorum, and adhering to etiquette. This is particularly relevant in professional settings where maintaining formality can be crucial for communication. In one implementation, Emily may switch to a more formal tone when interacting with business associates of John, reflecting the need for professionalism in such interactions. For example, the second manner may involve using titles and formal greetings in communications.

Some embodiments of the disclosure include "the second manner is more casual than the first manner." The term "casual" refers to a relaxed, informal approach to interactions and tasks. This may include using colloquial language, a friendly tone, and a more personable style. For example, in social or less formal professional settings, a casual manner can help build rapport and ease communication. If John prefers Emily to be less formal with certain individuals, such as friends or close colleagues, the artificial assistant will adjust its interaction style accordingly. For example, Emily may adopt a casual tone when sending messages to John's close friends, making the communication more relatable and friendly.

Some embodiments of the disclosure include "receiving feedback from the at least one individual on a first manner in which the artificial entity interacted with the at least one individual; and updating the profile of the artificial entity based on the feedback such that the artificial entity will complete future tasks that involve independently interacting with another one of the plurality of individuals in a second manner." The term "feedback" was defined above. Additionally, the term "another one of the plurality of individuals" refers to different individuals within the group of people the source individual interacts with. This means that feedback from one person can influence how the artificial assistant interacts with others. For example, if Sarah provides feedback that Emily's communication was too brief, this information can help adjust Emily's future interactions with other colleagues to be more detailed and comprehensive. For example, Sarah's feedback can lead to changes in how Emily manages communications with other team members.

Some embodiments of the disclosure include "prior to updating the profile of the artificial entity based on the feedback from the at least one individual, confirming with the source individual whether the source individual prefers that the artificial entity will complete future tasks in the second manner." The term "confirming" refers to the process of verifying or ensuring the accuracy or preference of a particular action or decision. This may involve asking for validation or approval from the source individual. For example, before Emily changes her interaction style based on feedback from Sarah, the system would check with John to ensure he agrees with the proposed adjustments. This step ensures that the changes align with the source individual's overall preferences and goals. For example, John's confirmation can help fine-tune Emily's behavior, ensuring it remains aligned with his expectations.

Some embodiments of the disclosure include "determining a first manner for completing a first task associated with the target individual based on a relationship between the source individual and the target individual." The term "relationship" refers to the connection or association between two individuals, which can influence how interactions and tasks are managed. This includes professional, personal, and casual relationships. For example, the system may determine that John's relationship with Sarah is professional, requiring Emily to adopt a formal communication style for task completion. Understanding these relationships is crucial for tailoring interactions appropriately. For example, Emily's interactions with Sarah would reflect the professional nature of their relationship, ensuring the communication is appropriate and effective.

Some embodiments of the disclosure include "upon completion of the first task receiving an assignment of a second task associated with the target individual; and determining a second manner for completing the second task based on reactions of the at least one individual while interacting the artificial entity during completion of the first task." The term "reactions" refers to responses or feedback provided by individuals during or after an interaction. This can include verbal feedback, behavioral cues, or other forms of communication. For example, if Sarah reacts positively to a more detailed report from Emily, the system may adopt this approach for future tasks. This dynamic adjustment helps ensure that interactions remain effective and well-received. For example, Sarah's positive reaction to Emily's detailed communication could lead to similar detailed interactions in subsequent tasks.

Some embodiments of the disclosure include "the assignment is for a recurring task and the operations further include accounting for interactions occurred in past tasks when determining a specific manner for completing an outstanding task." The term "recurring task" refers to a task that occurs regularly or repeatedly over a period. This may include routine activities, scheduled meetings, or periodic updates. For example, Emily may manage John's weekly status reports, considering past interactions to refine the process continually. This ensures consistency and improvement over time, making the artificial assistant more efficient and responsive to the source individual's needs. For example, Emily's handling of John's recurring tasks would reflect learned behaviors from past interactions, ensuring ongoing improvement.

Some embodiments of the disclosure include "upon receiving from the source individual the assignment of the task, determining that additional instructions from the source individual regarding an upcoming interaction with the at least one individual are needed in order to successfully complete the task, and asking for more details from the source individual for completing the task." The term "additional instructions" refers to further guidance or details provided to clarify or enhance the execution of a task. This can involve specifics about the task's context, desired outcomes, or any other relevant information. For example, if John assigns Emily a task to coordinate a meeting, Emily might ask for preferred dates, times, and specific agenda items. This ensures that the task is completed accurately and according to the source individual's preferences. For example, Emily may seek additional details from John to enhance the quality and precision of the task completion.

Some embodiments of the disclosure include "in response to a trigger, providing a report for the source individual that includes at least one detail on the interaction with the at least one individual." The term "trigger" refers to an event or condition that initiates a specific action or response. This can include task completion, specific interactions, or time-based events. For example, completing a task might trigger Emily to generate a report detailing the interactions and outcomes. Providing such reports helps keep the source individual informed and allows for ongoing assessment of the artificial assistant's performance. For example, message 604 may be considered as a report triggered by task completion. Some embodiments of the disclosure include "the trigger includes a determination that the task was completed." The term "determination" refers to the process of establishing or concluding something based on evidence or criteria. This involves verifying that all aspects of a task have been successfully executed. For example, once Emily confirms that a meeting was scheduled and attended, this triggers the creation of a completion report. This process ensures that the source individual is promptly informed of task statuses. For example, the system's determination that a task was completed would trigger a subsequent report to John. Some embodiments of the disclosure include "the trigger includes an identification of an event that happened during completion of the task." The term "identification" refers to the recognition or acknowledgment of a specific event or occurrence. This may involve detecting actions, interactions, or any significant developments. For example, if a critical issue arises during a meeting coordinated by Emily, this event will trigger a detailed report to John. Identifying such events ensures that important occurrences are promptly communicated to the source individual. For example, any significant event identified during task completion would be included in the triggered report. Some embodiments of the disclosure include "the trigger includes receipt of a request from the source individual." The term "request" refers to a formal or informal solicitation for information, action, or service. This can involve asking for updates, clarifications, or specific reports. For example, John might request a summary of all tasks Emily has managed over the past week. Such requests ensure that the artificial assistant remains responsive to the source individual's needs and preferences. For example, John's request for information would trigger the generation of a relevant report by Emily. Some embodiments of the disclosure include "the report includes at least one of: a recording of the interaction, summary of the interaction, or description of an outcome of the task." The term "report" refers to a document or communication that provides detailed information about a specific subject or event. This may include recordings, summaries, and descriptions to offer a comprehensive view of the interactions and outcomes. For example, Emily's report to John may include a recorded meeting, a summarized discussion, and the decisions made. Such reports help the source individual stay informed and make data-driven decisions.

Some embodiments of the disclosure include "receiving data on a schedule of the source individual, based on the received data, identifying at least one optional task that will require the artificial entity to independently interact with one or more individuals; and offering the source individual to complete the at least one optional task." The term "schedule" refers to a planned series of events or tasks, often organized by time. This includes meetings, deadlines, and routine activities. For example, Emily may analyze John's calendar to identify potential gaps where additional tasks could be managed. Offering optional tasks ensures efficient use of time and resources, enhancing productivity. For example, Emily's analysis of John's schedule could lead to suggestions for optional tasks to fill available time slots.

Some embodiments of the disclosure include "identifying the at least one optional task is based on the received data and the selected personality trait of the artificial assistant." The term "optional task" refers to a non-mandatory activity that can be undertaken to utilize available time or resources effectively. This can include follow-up meetings, additional research, or proactive outreach. For example, Emily might suggest additional networking opportunities for John based on his schedule and preferences. Identifying these tasks based on personality traits ensures alignment with the source individual's style and priorities. For example, Emily's suggestions for optional tasks would be tailored to John's preferred work style and objectives.

Some embodiments of the disclosure include "completing the task requires the artificial entity to participate in a digital activity on behalf of the source individual; and the operations further include, during the digital activity, receiving data reflecting an utterance articulated during the digital activity; and determining a manner for the artificial entity to respond to the utterance based on the selected personality trait of the artificial assistant." The term "digital activity" refers to any task or interaction conducted through digital means, such as online meetings, email exchanges, or social media interactions. This encompasses a wide range of activities where digital communication tools are used. For example, Emily may participate in a video conference on John's behalf and respond to spoken queries. Determining how to respond based on personality traits ensures that the artificial assistant's interactions remain consistent and appropriate. For example, Emily's participation in digital activities would reflect John's preferred communication style.

Some embodiments of the disclosure include "receiving from the source individual assignment of a plurality of tasks for the artificial entity, causing the artificial entity to prioritize completions of the plurality of tasks based on the record of the source individual." The term "prioritize" refers to arranging or dealing with tasks in order of importance or urgency. This involves deciding which tasks should be addressed first based on various criteria. For example, Emily may prioritize John's urgent project deadlines over routine check-ins based on his record. This prioritization ensures that critical tasks are addressed promptly, optimizing the source individual's productivity. For example, Emily's task management would be aligned with John's priorities and schedules, ensuring efficient task completion.

Figure 6B:
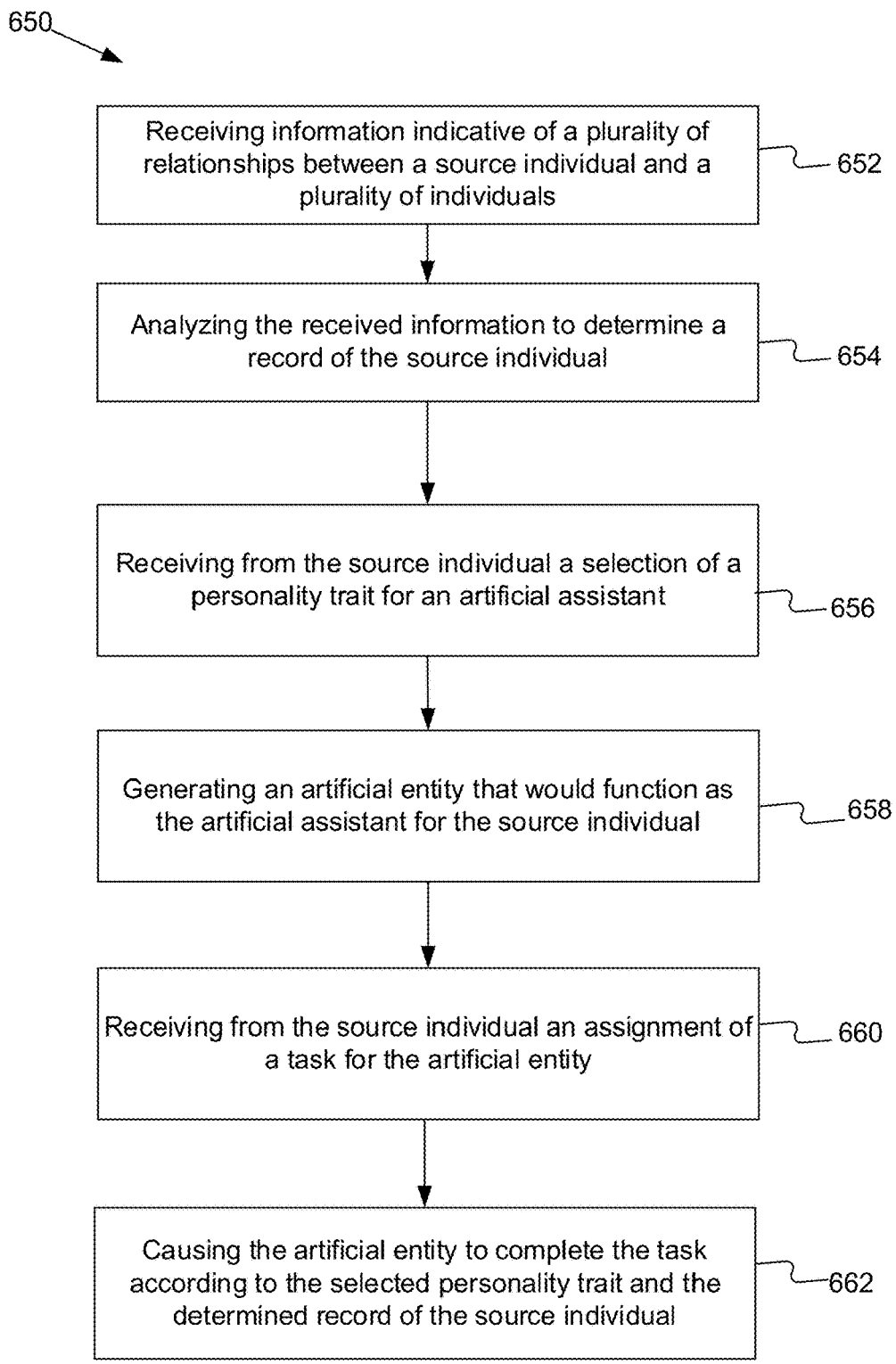
FIG. 6B is a flowchart of an example process associated with the third use case, consistent with some embodiments of the present disclosure.

FIG. 6B illustrates a flowchart of an exemplary process 650 for operating artificial entities, consistent with embodiments of the present disclosure. In some disclosed embodiments, process 650 may be performed by at least one processor (e.g., processing device 210) to perform operations or functions described herein. In some disclosed embodiments, some aspects of process 650 may be implemented as software (e.g., program codes or instructions) that are stored in a memory (e.g., memory device 220) or a non-transitory computer-readable medium. In some disclosed embodiments, some aspects of process 650 may be implemented as hardware (e.g., a specific-purpose circuit). In some disclosed embodiments, process 650 may be implemented as a combination of software and hardware.

Referring to FIG. 6B, the flow chart of process 650 begins with step 652, which involves receiving information indicative of a plurality of relationships between a source individual and a plurality of individuals. This information may include various data points such as social connections, frequency of interactions, communication patterns, and preferences, as described elsewhere in the disclosure. In some cases, the system may gather this information passively through everyday interactions or actively through surveys or questionnaires. In step 654, the received information is analyzed to determine a record of the source individual. This analysis may involve using machine learning algorithms to recognize patterns in the relationships and interactions, such as identifying key individuals in the source individual's network or understanding the context of their communications. For example, the system might use social network analysis to map out the source individual's connections and interactions over time. Understanding these relationships is crucial for the subsequent personalization of the artificial entity's responses. Step 656 involves receiving from the source individual a selection of a personality trait for an artificial assistant. This personality trait could be characteristics such as being friendly, formal, humorous, or empathetic, which will influence how the artificial assistant interacts with others. The selection process may include presenting the source individual with various trait options and examples of how those traits might manifest in interactions. For example, the source individual might choose a personality trait that emphasizes professionalism for workplace interactions. Step 658 involves generating an artificial entity that would function as the artificial assistant for the source individual. This artificial entity may be a digital avatar, a virtual assistant, or a robotic interface designed to interact with users in a natural and engaging manner. In this context, generating the artificial entity includes programming it with the selected personality trait and other behavioral cues, enabling it to accurately reflect the source individual's preferences and style. The generation process may involve creating a detailed profile for the artificial assistant, including voice, appearance, and mannerisms. Step 660 involves receiving from the source individual an assignment of a task for the artificial entity, wherein completing the task requires the artificial entity to independently interact with at least one of the plurality of individuals. This task could range from scheduling meetings and managing emails to more complex interactions such as negotiating agreements or providing customer service. The assignment process ensures that the artificial assistant is equipped with the necessary information and context to complete the task effectively. Step 662 involves causing the artificial entity to complete the task according to the selected personality trait and the determined record of the source individual. This step entails the actual execution of the task by the artificial entity, ensuring that it performs the assigned duties in a manner consistent with the source individual's preferences and the personality trait. For example, if the selected personality trait emphasizes friendliness, the artificial assistant might use a warm and approachable tone in its communications. The goal is to create a seamless and effective interaction that aligns with the source individual's expectations and enhances the overall experience.

In one aspect of the disclosure, methods, systems, and software are provided for operating artificial entities in online games. Embodiments of this aspect may include using game logic to manage an online game with at least one non-player character and at least one player character controllable by a source individual. Information reflective of the manner in which the source individual plays the online game is determined during a first time period, and an artificial entity is generated based on this information. The artificial entity then controls the player character during a second time period, with the manner of play based on the source individual's play during the first time period. The operations may also include notifying other players when an artificial entity is controlling a player character, causing the artificial entity to communicate with other players on behalf of the source individual, and determining a profile for the source individual based on relationships with other individuals.

Further embodiments of this aspect includes determining the source individual's preferred moves and level of skill in the online game, as well as interactions with other player characters controllable by a reference individual. The artificial entity may be triggered by the source individual or by another individual with permission, and may have a determined personality based on the source individual's record. The operations may also include managing new interactions with non-player characters, notifying the source individual of events during the second time period, and enabling the source individual to play the game during a third time period with achievements accomplished by the artificial entity available. The artificial entity may also control other player characters in another online game during a third time period, and may be controlled during the second time period according to instructions received from the source individual.

Figure 7A:
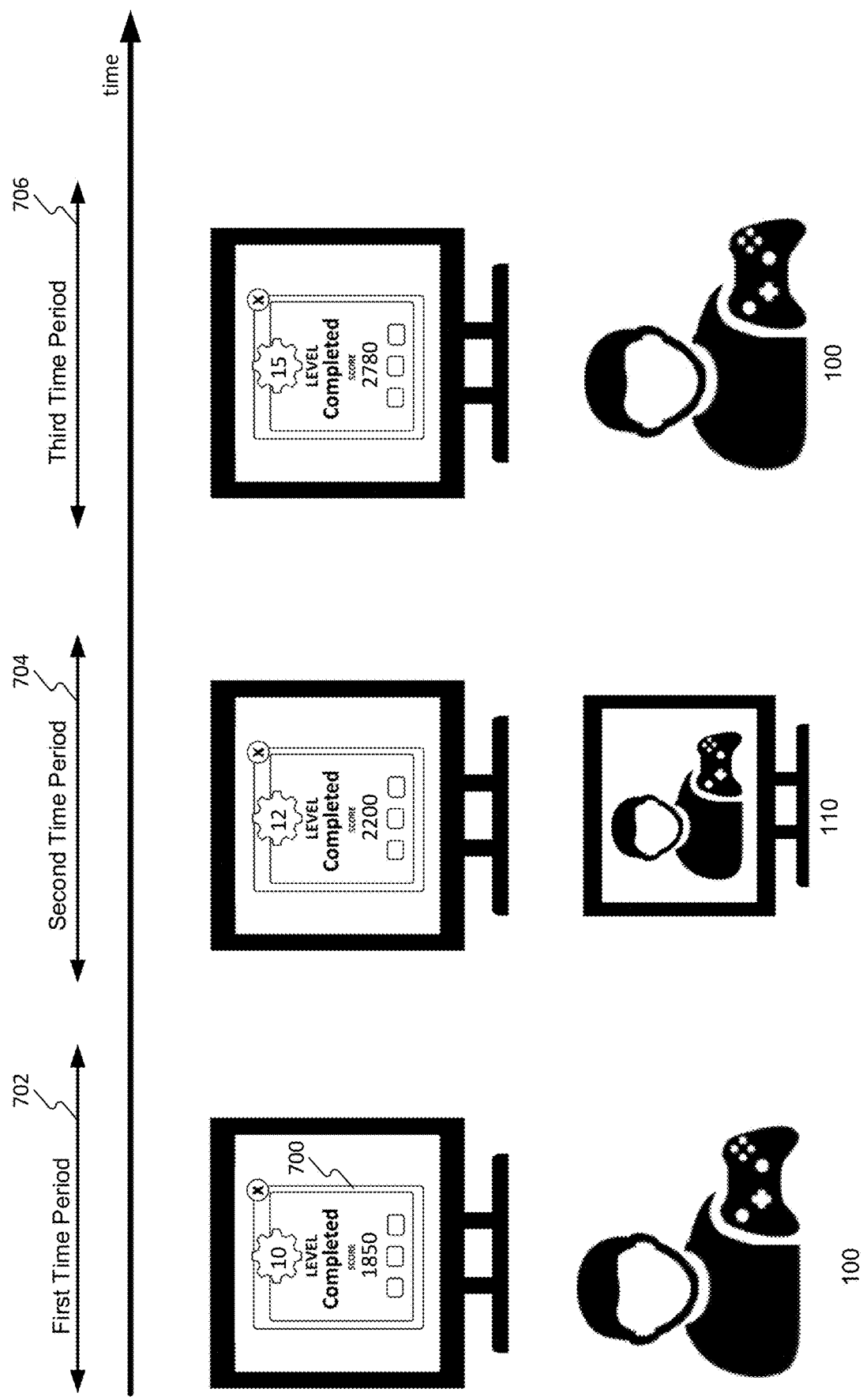
FIG. 7A is an illustration of a fourth use case for using an artificial entity, consistent with some embodiments of the present disclosure.

Some embodiments of the disclosure include "using a game logic to manage an online game, wherein the online game includes at least one non-player character controlled by the game logic and at least one player character controllable by a source individual." The term "using" refers to the act of employing, utilizing, or applying something for a particular purpose. In this context, "using" involves the application of game logic to control various aspects of an online game. Examples include deploying algorithms to dictate NPC behaviors, leveraging AI to manage game dynamics, and utilizing rule-based systems to ensure consistent game operations. In addition, the term game logic refers to the set of rules, algorithms, and mechanics that govern the behavior and progression of a game. For example, game logic may include the decision-making processes for NPCs, the mechanics for combat or interactions, and the overall flow and structure of game levels. Moreover, the term "online game" refers to a video game that is either partially or primarily played through the internet or another computer network. Online games can include genres such as Multiplayer Online Battle Arena (e.g., League of Legends), First-Person Shooter (e.g., Call of Duty), Battle Royale (e.g., Fortnite), Online Role-Playing Game (e.g., World of Warcraft), Real-Time Strategy (e.g., Age of Empires), Survival (e.g., Minecraft), Sports (e.g., FIFA), Racing (e.g., Need for Speed), and Card Games (e.g., bridge). As illustrated in FIG. 7A, online game 700 may be of type of any of these types of games.

Some embodiments of the disclosure include "determining information reflective of a first manner by which the source individual plays the online game during a first time period in which the at least one player character interacts with the at least one non-player character." The term "determining" refers to ascertaining, establishing, or arriving at an outcome by some process. This may involve collecting data on player actions, analyzing gameplay patterns, or recording in-game decisions. For instance, determining may involve tracking the choices a player makes during quests, the strategies employed in combat, or the frequency of interactions with NPCs. In addition, the term "information" refers to data, facts, or details obtained or learned about something or someone. In this context, information may include metrics on player performance, records of in-game interactions, or analytics on gameplay behavior. For example, information may encompass the number of quests completed, dialogue choices made, or combat tactics used by the player. Moreover, the term "first time period" refers to a specific span of time during which an activity occurs. In this case, it pertains to the initial duration in which the player interacts with the NPCs in the game. For example, this period could be defined by the first ten levels of a game, the initial hour of gameplay, or any other segment of time during which the player's behavior is monitored. As illustrated in FIG. 7A, during time period 702, source individual 100 plays online game 700. For example, in the game "The Witcher 3" Geralt can engage in conversations with townsfolk in villages and towns to learn local rumors or accept smaller side quests. In the illustrated example, the determined information is associated with the completed levels 1-10.

Some embodiments of the disclosure include "generating an artificial entity for representing the source individual based on the determined information." The term "generating" refers to the process of creating, producing, or bringing something into existence. This may involve using algorithms to model behaviors, leveraging AI to replicate player strategies, or synthesizing a virtual character that mimics the player's actions. For instance, generating may involve developing a bot that can play the game autonomously or creating a digital avatar that reflects the player's in-game decisions. In addition, the term "artificial entity" refers to a non-human character or agent designed to simulate human behavior or actions within a game. This can include AI-controlled characters, virtual avatars, or automated bots. For example, an artificial entity may be programmed to complete quests, interact with other characters, or participate in battles in a manner similar to the human player. Moreover, the term "determined information" refers to the data and insights obtained from monitoring the player's actions and decisions during gameplay. This information serves as the basis for creating the artificial entity. For instance, determined information may include the player's preferred combat tactics, dialogue choices, and interaction patterns with NPCs. As illustrated in FIG. 7A, artificial entity 110 may be generated based on the manner by which the source individual plays the online game during the first time period.

Some embodiments of the disclosure include "causing the artificial entity to control the at least one player character during a second time period subsequent to the first time period, wherein a second manner by which the artificial entity plays the online game is based on the first manner by which the source individual played the online game." The term "causing" refers to bringing about an action or result through some means. This may involve programming the artificial entity to take control of the player's character, initiating specific game mechanics, or triggering events within the game. For example, causing may involve activating an AI bot to take over gameplay or setting parameters for how the artificial entity should interact with the game environment. In addition, the term "artificial entity" was defined above. Moreover, the term "second time period" refers to a subsequent span of time following the initial monitoring phase. This period is characterized by the artificial entity's control over the player's character. For example, the second time period could be defined by the levels following the initial ten, the next hour of gameplay, or any other segment of time where the AI takes over. As illustrated in FIG. 7A, during the second time period 704, artificial entity 110 plays online game 700 and completes levels 11 and 12. Thereafter, at the third time period 706, source individual 100 starts at level 13 and reaches level 15.

Some embodiments of the disclosure include "the determined information reflective of the first manner by which the source individual plays the online game includes preferred moves of the at least one player character." The term "preferred moves" refers to the specific actions, tactics, or strategies that a player frequently uses during gameplay. This could include favored combat techniques, preferred routes in a race, or particular choices in a role-playing scenario. For example, a player might consistently choose a stealth approach in an action game, favoring moves like crouching, hiding, and silent takedowns. This information helps in accurately replicating the player's style in the artificial entity.

Some embodiments of the disclosure include "the determined information reflective of the first manner by which the source individual plays the online game includes a level of skill of the source individual in the online game based on interactions of the at least one player character with the at least one non-player character during the first time period, and wherein the artificial entity is assigned a level of skill akin to the level of skill of the source individual." The term "level of skill" refers to the proficiency or expertise of the player, which can be measured by various metrics such as reaction time, accuracy, strategic decision-making, and overall performance. For instance, a highly skilled player in a first-person shooter might have excellent aim and quick reflexes, which would be mirrored in the artificial entity's behavior.

Some embodiments of the disclosure include "the determined information reflective of a third manner by which the source individual interacts with the at least one player character controllable by a reference individual; wherein the second manner by which the artificial entity plays the online game is based on the first manner associated with interactions with the at least one non-player character and the third manner associated with interactions with the at least one player character." The term "third manner" refers to the source individual's behavior when interacting with other player characters controlled by real individuals. For example, in a multiplayer game, the source individual might display teamwork skills, such as coordinating attacks, sharing resources, or providing support. This aspect of gameplay is essential for creating an artificial entity that can interact effectively with human players.

Some embodiments of the disclosure include "the third manner includes addressing the reference individual as at least one of a rival, an enemy, a teammate, a guildmate, a mentor, a friend, a trading partner, or a follower." The term "reference individual" refers to another player character controlled by a human player. The way the source individual addresses or interacts with this character can vary significantly based on their relationship. For instance, a reference individual addressed as a rival might engage in competitive actions, while a reference individual addressed as a mentor might involve seeking advice and following guidance. These nuances are critical for personalizing the artificial entity's interactions.

Some embodiments of the disclosure include "the game involves multiple players associated with a plurality of player characters and the operations further include notifying some of the multiple players when one of the plurality of player characters is played by an artificial entity." In this context, the term "notifying" refers to informing or alerting other players about specific events or conditions within the game. For example, it may mean letting players know when an artificial entity is controlling a player character of the game instead of a human. This could be achieved through in-game messages, icons, or other indicators. For example, an icon might appear above a player character's head to signify that it is currently being controlled by an artificial entity.

Some embodiments of the disclosure include "the game involves multiple players associated with a plurality of player characters and the operations further include causing the artificial entity to communicate with at least one of the multiple players on behalf of the source individual." The term "communicate" refers to the exchange of information, whether through text, voice, or other forms of interaction. In this scenario, the artificial entity might send messages, give commands, or respond to other players just as the source individual would. For example, the artificial entity might use pre-recorded voice clips or text responses to maintain continuity in the player's absence.

Some embodiments of the disclosure include "the game involves multiple players associated with a plurality of player characters and the operations further include determining a profile for the source individual based on received information indicative of a plurality of relationships between a source individual and a plurality of individuals, and causing the artificial entity to communicate with at least one of the multiple players based on the determined profile." The term "profile" refers to a comprehensive summary of the source individual's behavior, preferences, and interactions within the game. This profile might include details about the player's friends, rivals, frequent collaborators, and preferred communication styles. For example, the artificial entity might use this profile to decide how to respond to a friend versus an enemy, ensuring that interactions remain consistent and authentic.

Some embodiments of the disclosure include "the step of generating the artificial entity is triggered by the source individual." The term "triggered" refers to the initiation of an action or process based on a specific event or condition. Here, it means that the creation of the artificial entity starts when the source individual takes a particular action, such as pressing a button or issuing a command. For example, a player might activate the artificial entity before leaving the game, ensuring their character continues to participate in the game world.

Some embodiments of the disclosure include "the operations further include reporting to the source individual on how the artificial entity played the online game during the second time period." The term "reporting" refers to providing information or feedback about an event or activity. In this context, it means updating the source individual about the artificial entity's actions and performance during their absence. For example, the system might generate a summary of completed missions, earned rewards, and notable interactions, helping the player stay informed about their character's progress.

Some embodiments of the disclosure include "the step of generating the artificial entity is triggered by an individual other than the source individual." This scenario suggests that someone else, such as a game administrator or another player, can initiate the creation of the artificial entity. This feature might be useful in team-based games where maintaining group cohesion is essential. For example, if a team leader notices that a player is offline, they could trigger the artificial entity to fill in and maintain the team's effectiveness.

Some embodiments of the disclosure include "the operations further include, prior to generating the artificial entity, confirming that the individual other than the source individual has permission to generate the artificial entity for representing the source individual." The term "confirming" refers to verifying or ensuring that a condition is met. In this case, it means checking that the person triggering the artificial entity has the necessary authorization. This could involve checking permissions set by the source individual or following predefined game rules. For example, a parent might have permission to activate an artificial entity for their child's account. Some embodiments of the disclosure include "generating the artificial entity includes determining a personality for the artificial entity based on the record of the source individual." The term "personality" refers to the set of characteristics, traits, and behaviors that define how an entity interacts with others. In this context, it means creating an artificial entity that reflects the source individual's unique personality. For example, if the player is known for being humorous and lighthearted, the artificial entity might be programmed to make jokes and respond in a cheerful manner.

Some embodiments of the disclosure include "controlling the at least one player character during the second time period includes managing new interactions with the at least one non-player character." The term "managing" refers to overseeing and directing actions or processes. Here, it means that the artificial entity not only replicates the source individual's previous actions but also handles new interactions that arise during gameplay. For example, the artificial entity might engage in conversations with non-player characters (NPCs), complete quests, or respond to in-game events, ensuring continuous and dynamic participation in the game.

Some embodiments of the disclosure include "during the second time period, notifying the source individual on an event that takes place, and, upon receiving input from the source individual, switch control of the at least one player character from the artificial entity to the source individual." The term "notifying" was defined above. The term "switch control" refers to transferring the ability to manage and direct a player character's actions from one entity to another. In this scenario, the system informs the source individual about significant events, such as the start of a crucial battle or the discovery of a rare item. If the source individual chooses to intervene, control is handed back from the artificial entity to the player.

Some embodiments of the disclosure include "after the first time period and prior to the second time period, receiving identification of at least one event that triggers switching control." The term "identification" refers to the process of recognizing or specifying something. Here, it means determining which events are significant enough to warrant notifying the source individual and potentially switching control. For example, the player might specify that they want to be alerted if their character is challenged to a duel or if their in-game faction is under attack. This ensures that the player remains engaged and can intervene when it matters most.

Some embodiments of the disclosure include "enabling the source individual to play the online game during a third time period subsequent to the second time period, wherein game achievements accomplished by the artificial entity are available to the source individual." The term "enabling" refers to making it possible for someone to do something. In this context, it means allowing the source individual to resume control of their character after the artificial entity has played for a while. The achievements earned by the artificial entity, such as completed quests, earned experience points, and acquired items, are transferred to the source individual. This ensures that the player's progress is not hindered by their absence.

Some embodiments of the disclosure include "the artificial entity that controls the at least one player character during the second time period is separated from the game logic that controls the at least one non-player character." The term "separated" refers to being distinct or independent from something else. Here, it means that the artificial entity operates independently of the game's central logic that governs NPC behavior. This separation ensures that the artificial entity acts as a unique representation of the source individual rather than just another NPC. For example, while NPCs might follow scripted paths, the artificial entity might adapt and respond dynamically based on the source individual's style.

Some embodiments of the disclosure include "causing the artificial entity to control at least one other player character associated with another online game during a third time period subsequent to the second time period, wherein a third manner by which the artificial entity plays the another online game is based on the first manner by which the source individual played the online game." The term "associated" refers to being connected or related to something. Here, it means that the artificial entity can be applied to a different game, maintaining the source individual's unique style. For example, a player's strategic thinking in a real-time strategy game might influence how the artificial entity performs in a different strategy game, ensuring a consistent gaming experience across multiple titles.

Some embodiments of the disclosure include "after the first time period and prior to the second time period, receiving instructions from the source individual, and causing the artificial entity to control the at least one player character during the second time period according to the received instructions." The term "instructions" refers to directives or commands that specify how something should be done. In this context, it means that the source individual can provide specific guidelines for the artificial entity to follow. For example, the player might instruct the artificial entity to focus on gathering resources, avoiding conflict, or prioritizing specific quests. This ensures that the artificial entity's actions align with the player's goals and preferences.

Figure 7B:
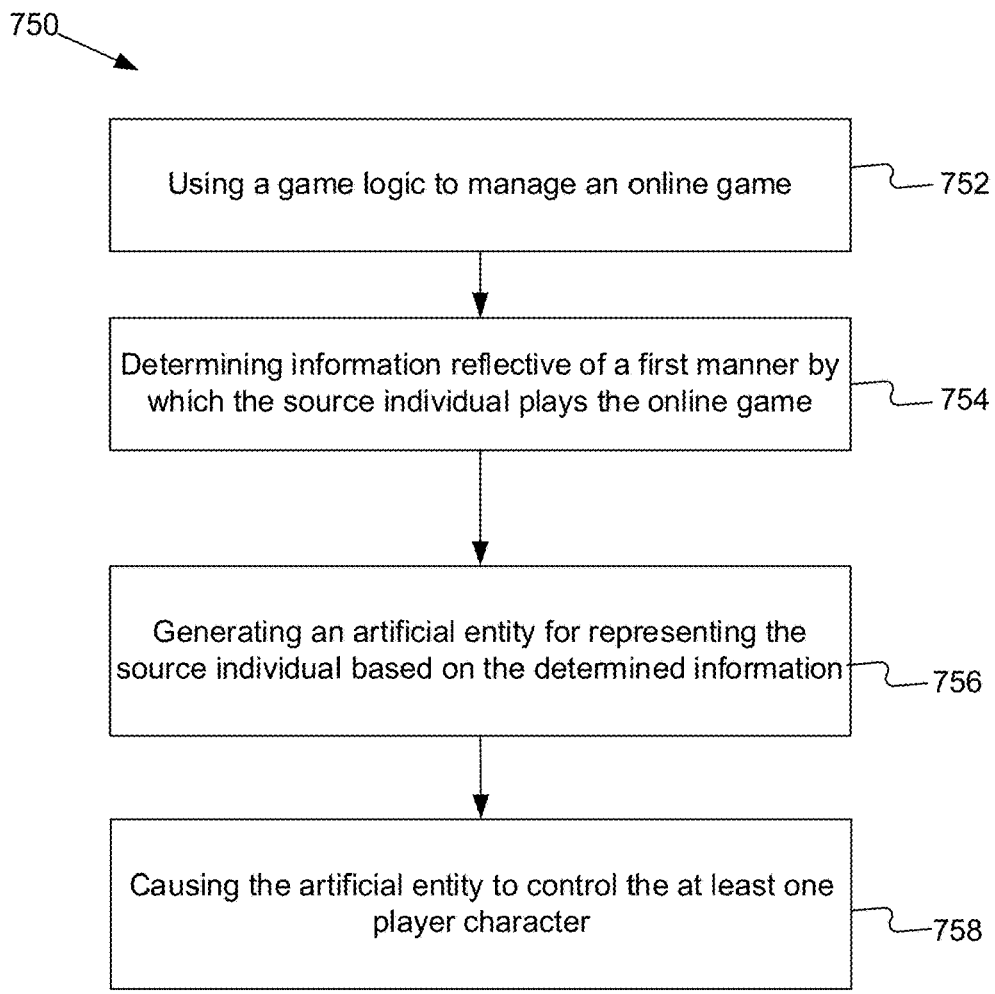
FIG. 7B is a flowchart of an example process associated with the fourth use case, consistent with some embodiments of the present disclosure.

FIG. 7B illustrates a flowchart of an exemplary process 750 for operating artificial entities, consistent with embodiments of the present disclosure. In some disclosed embodiments, process 750 may be performed by at least one processor (e.g., processing device 210) to perform operations or functions described herein. In some disclosed embodiments, some aspects of process 750 may be implemented as software (e.g., program codes or instructions) that are stored in a memory (e.g., memory device 220) or a non-transitory computer-readable medium. In some disclosed embodiments, some aspects of process 750 may be implemented as hardware (e.g., a specific-purpose circuit). In some disclosed embodiments, process 750 may be implemented as a combination of software and hardware.

Referring to FIG. 7B, the flow chart of process 750 begins with step 752, which involves using a game logic to manage an online game. This game logic controls at least one non-player character and manages interactions between this non-player character and at least one player character, which is controllable by a source individual. The term game logic refers to the underlying code and algorithms that govern the rules, mechanics, and progression of the game. For example, in a strategy game, the game logic would dictate the behavior of enemy units, resource management, and victory conditions. In this context, the game logic is crucial for ensuring that the game operates smoothly and provides a consistent experience for all players. In step 754, the process involves determining information reflective of a first manner by which the source individual plays the online game during a first time period in which the at least one player character interacts with the at least one non-player character. The term determining was defined above. This step may involve collecting data on the player's actions, decisions, and interactions within the game. For instance, the system might analyze the source individual's combat strategies, resource allocation, and decision-making processes. This information is essential for understanding the source individual's unique gameplay style and preferences, which will be used to create a corresponding artificial entity. Step 756 involves generating an artificial entity for representing the source individual based on the determined information. The term generating refers to the creation and programming of a digital avatar or virtual character that mirrors the source individual's gameplay style. This may involve using machine learning algorithms to replicate the player's behavior and decision-making processes. For example, the artificial entity might be programmed to use the same tactics and strategies as the source individual, ensuring that it performs in a manner consistent with the player's style. This step is crucial for maintaining continuity and immersion in the game, especially when the player is not actively controlling their character. Finally, step 758 involves causing the artificial entity to control the at least one player character during a second time period subsequent to the first time period, wherein a second manner by which the artificial entity plays the online game is based on the first manner by which the source individual played the online game. The term causing refers to initiating or triggering an action or event. In this context, it means activating the artificial entity to take over control of the player character. The second manner by which the artificial entity plays the game is a direct continuation of the source individual's gameplay style, ensuring that the character behaves consistently even in the player's absence. For example, if the player is known for aggressive tactics, the artificial entity will continue to play aggressively. This step ensures a seamless transition and maintains the integrity of the gameplay experience.

In one aspect of the disclosure, methods, systems, and software are provided for generating learning behavior patterns of a source individual and determining actions for an artificial entity. The method may include collecting information indicative of a plurality of first actions that a source individual took when encountering a plurality of first situations. A method for operating artificial entities, the method may also include analyzing the collected information to determine rules indicative of behavior patterns of the source individual. A method for operating artificial entities, the method may furthermore include generating an artificial entity associated with the source individual based on the collected information. A method for operating artificial entities, the method may in addition include receiving data reflecting a second situation that the artificial entity faces with. A method for operating artificial entities, the method may moreover include determining a second action for the artificial entity to respond to the second situation based on the determined rules indicative of the behavior patterns. Other embodiments of this aspect include corresponding computer systems, apparatus, and computer programs recorded on one or more computer storage devices, each configured to perform the actions of the methods.

Some embodiments of the disclosure include collecting information indicative of a plurality of first actions that a source individual took when encountering a plurality of first situations. The term "collecting" refers to the act of gathering or compiling data or information from various sources. The collected information may include any data or information that is relevant to the behavior patterns of the source individual. For example, the collected information may include data on the source individual's actions, preferences, and habits. In addition, the term "indicative of" refers to the fact that the collected information provides evidence or suggests the behavior patterns of the source individual. The collected information may not necessarily provide a complete picture of the behavior patterns, but rather serves as an indication or clue to the behavior patterns. Moreover, the term "first actions" refers to any actions taken by the source individual in response to the first situations. The first actions may include any behavior or activity exhibited by the source individual in response to a particular situation. For example, the first actions may include the source individual's response to a particular stimulus, such as clicking on a link, scrolling through a webpage, or making a purchase.

Some embodiments of the disclosure include analyzing the collected information to determine prompts indicative of behavior patterns of the source individual. The term "analyzing" refers to the process of examining or studying the collected information to identify patterns or trends. The analysis may involve various techniques, such as statistical analysis, machine learning, or data mining. In addition, the term "prompts" refers to input instructions or cues provided to an AI model (e.g., artificial entity) to guide its generation of output, typically in the form of text, images, or other data. These prompts may serve as directives that influence the content, style, or context of the AI-generated output. For example, in natural language processing tasks, prompts can include sentence starters, keywords, or structured queries that prompt the artificial entity to generate coherent text responses, summaries, or creative outputs. Similarly, in image generation tasks, prompts may consist of initial images, textual descriptions, or desired visual attributes that guide the artificial entity in creating new images or modifying existing ones. In the context of the present disclosure, the prompts may be indicative of behavior patterns of the source individual. The prompts may provide necessary context and structure for the artificial entity to produce relevant and meaningful outputs aligned with the source individual personality. The prompts may be expressed as a set of instructions or guidelines that define the behavior patterns of the source individual. For example, the prompts may indicate that the source individual is more likely to make a purchase when presented with a certain type of product or offer. Moreover, the term "behavior patterns" refers to the consistent or recurring actions or behaviors exhibited by the source individual in response to various situations. The behavior patterns may be influenced by various factors, such as the source individual's preferences, habits, or personality traits.

Some embodiments of the disclosure include generating an artificial entity associated with the source individual based on the collected information. The term "generating" refers to the act of creating or producing something, in this case an artificial entity. The artificial entity may be a digital clone or representation of the source individual. In addition, the term "artificial entity" refers to a digital or virtual entity that is created to mimic or simulate the behavior patterns of the source individual. The artificial entity may be created using various techniques, such as machine learning algorithms, neural networks, or other artificial intelligence tools. Moreover, the term "associated with" refers to the fact that the artificial entity is linked or connected to the source individual. The association may be based on various factors, such as the collected information, the behavior patterns, or other characteristics of the source individual.

Some embodiments of the disclosure include receiving data reflecting a second situation that the artificial entity faces with. The term "receiving" refers to the act of obtaining or acquiring data or information from an external source. The data may be in any form, such as text, images, audio, or video. In addition, the term "second situation" refers to any situation or context in which the artificial entity is placed. The second situation may be similar or different from the first situations encountered by the source individual. For example, the second situation may involve the artificial entity browsing a website or interacting with a chatbot. Moreover, the term "faces with" refers to the fact that the artificial entity is presented with a situation or context that requires a response or action. The response or action may be based on the behavior patterns identified through the analysis of the collected information. In one embodiment, the second situation differs from the plurality of first situations and takes place without knowledge of the source individual.

Some embodiments of the disclosure include determining a second action for the artificial entity to respond to the second situation based on the determined rules indicative of the behavior patterns. The term "determining" refers to the act of making a decision or arriving at a conclusion based on the available information or data. In addition, the term "second action" refers to any action or behavior exhibited by the artificial entity in response to the second situation. The second action may be based on the behavior patterns identified through the analysis of the collected information and the rules generated based on the analysis. Moreover, the term "prompts indicative of the behavior patterns" refers to the set of instructions or guidelines that define the behavior patterns of the source individual and are used to generate the artificial entity. The prompts may be applied to the behavior of the artificial entity to generate the appropriate response or action in a given situation.

Figure 8:
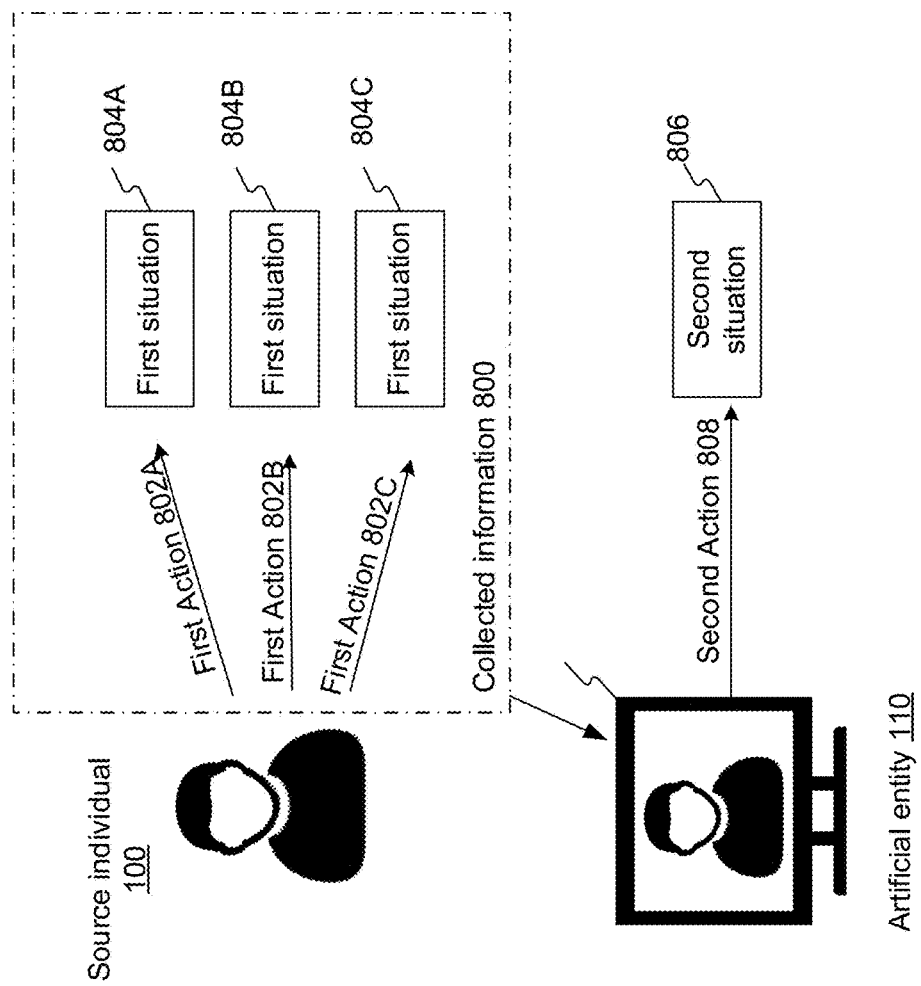
FIGS. 8, 10, 12, 14, 16, 18, 20, 22, 24, and 26 are illustrations of different features of artificial entity consistent with some embodiments of the present disclosure.

FIG. 8 illustrates some disclosed embodiments. As shown, source individual 100 encountered several first situations (804A, 804B, and 804C) and responded to each first situation with a corresponding first actions (802A, 802B, and 802C). The system may collect information 800 about the first situations 804 and the first actions 802. Thereafter, artificial entity 110 is generated based on collected information 800. As described throughout the application, additional information may be used in generating artificial entity 110. In addition, the collected information may be analyzed to determine prompts for artificial entity 110 indicative of behavior patterns of source individual 100. When artificial entity 110 encounter second situation 806, it responds with second action 808 based on the determined prompts indicative of the behavior patterns of source individual 100.

In one embodiment, the second situation faced by the artificial entity may be different from the first situations encountered by the source individual and takes place without the knowledge of the source individual. An example of this could be a question asked by someone other than the source individual, and the artificial entity generates an answer based on the determined prompts indicative of personal bias, cultural influence, level of interest, expertise, or communication style of the source individual.

In another embodiment, the second situation may involve a question that the source individual had never been asked before, and the second action includes generating an answer based on the determined prompts indicative of personal bias, cultural influence, level of interest, expertise, or communication style of the source individual. In some cases, the determined prompts may also be indicative of the source individual's level of expertise or communication style.

In another embodiment, the second situation may involve an interaction with new content that the source individual never consumed before, and the second action includes generating a reaction to the new content based on the determined prompts indicative of personal bias, cultural influence, level of interest, prior engagement, or level of openness of the source individual to new content.

In another embodiment, the second situation involves an interaction with a new individual that the source individual never interacted with before, and the second action includes generating a reaction to the new individual based on the determined prompts indicative of the source individual's level of trust, value regarding social interactions, level of politeness, prior engagements, or preconceived notions or biases to appearance, ethnicity, or gender of the new individual.

In one embodiment, the determined prompts are indicative of a trait of the source individual reflected in their reactions to different types of events. The plurality of first actions includes reactions of the source individual to differing types of events associated with the plurality of first situations. For example, if the source individual reacts positively to sports-related events, the determined prompts may indicate that the individual is a sports fan. This information can be used to determine the second action for the artificial entity, such as answering a query related to sports with enthusiasm.

In another embodiment, determining the prompts indicative of behavior patterns includes predicting a probable reaction of the source individual to a second situation based on their reactions to a plurality of first situations. For example, if the source individual has no interest with a particular hobby, the determined prompts may indicate that the individual is not interested in that hobby. This information can be used to determine the second action for the artificial entity, such as answering a query related to the hobby with little or no enthusiasm.

In yet another embodiment, determining the prompts is based on collected information and input reflective of personalization parameters. The input can be received from the source individual or a user other than the source individual that triggered the generation of the artificial entity. For example, if the input received from the source individual indicates that they prefer a certain type of music, the determined prompts may indicate that the individual is a music lover. This information can be used to determine the second action for the artificial entity, such as playing music that the source individual would enjoy.

In another embodiment, determining the second action for the artificial entity is based on the determined prompts and publicly available information on the source individual. For example, if the source individual has publicly available information indicating that they are a fan of a particular sports team, the determined prompts may indicate that the individual is a sports fan. This information can be used to determine the second action for the artificial entity, such as answering a query related to the sports team with a level of expertly the appropriate for a fan of the particular sports team.

In yet another embodiment, determining context associated with the second situation. The second action for the artificial entity is based on the determined prompts and the determined context. For example, if the determined prompts indicate that the source individual is a music lover and the determined context indicates that they are in a quiet environment, the second action for the artificial entity may be to play soft music.

In another embodiment, the collected data may include image data. The determined behavior patterns include preferences of the source individual inferred from the image data. The second action for the artificial entity includes answering to a query according to the preferences of the source individual. For example, if the image data indicates that the source individual is a fan of the Boston Celtics, the second action for the artificial entity may be to answer a query related to the Boston Celtics.

In yet another embodiment, the collected information may include GPS data. The determined behavior patterns include favorite locations of the source individual inferred from the GPS data. The second action for the artificial entity includes answering a query according to the favorite locations of the source individual. For example, if the GPS data indicates that the source individual goes to Starbucks every week, the second action for the artificial entity may be to answer a query related to Starbucks.

In another embodiment, the collected information may include chat history. The determined behavior patterns include favorite emojis of the source individual inferred from the chat history. The second action for the artificial entity includes generating a text message that includes at least one of the favorite emojis of the source individual. For example, if the chat history indicates that the source individual frequently uses a particular emoji, the second action for the artificial entity may be to generate a text message that includes that emoji.

In yet another embodiment, the collected information may include social media posts. The determined behavior patterns include a writing style of the source individual inferred from the social media posts. The second action for the artificial entity includes posting a message in social media that follows the writing style of the source individual. For example, if the social media posts indicate that the source individual uses a particular tone or language, the second action for the artificial entity may be to post a message that follows that tone or language.

In another embodiment, the method may include receiving data reflecting at least one reaction to the second action and updating the prompts for the artificial entity based on the at least one reaction. This can help improve the accuracy of the determined prompts. For example, if the source individual reacts negatively to the second action, the prompts may be updated to avoid similar actions in the future. For example, where the at least one reaction includes a first reaction from the source individual and a second reaction from a person other than the source individual. Updating the prompts for the artificial entity assigns more weight to the first reaction than the second reaction. This can help ensure that the determined prompts are more reflective of the source individual's preferences.

In another embodiment, the method further include receiving additional data reflecting a third situation that the artificial entity faces. The third situation may be similar to the second situation. The third action for the artificial entity to respond to the third situation is based on updated prompts. For example, if the artificial entity is asked the same question more than once, the determined prompts may be updated based on the previous responses to provide a more accurate answer.

In yet another embodiment, the artificial entity may be a digital clone configured to attend virtual meetings instead of the source individual. The operations include providing to the source individual a summary of a meeting that the digital clone replaced the source individual. The summary may be prepared based on the determined prompts indicative of behavior patterns of the source individual. For example, if the determined prompts indicate that the source individual is interested in a particular topic, the summary may focus on that topic.

In another embodiment, the method may include determining a personality trait for the artificial entity based on the collected information associated with a source individual. Upon receiving feedback from the source individual, the personality trait can be removed. This can help ensure that the artificial entity has a persona more reflective of the source individual's preferences. For example, if the source individual has a tendency of being overly aggressive, and often disregarding others' perspectives and feelings. The source individual can program the artificial entity to be more tentative to others.

Consistent with the present disclosure, the source individual may be a living person, and the method may include confirming with the source individual that the manner by which the artificial entity responding to second situations that took place without knowledge of the source individual is indeed following the source individual guidance. Alternatively, the source individual may be a deceased person and the method may include confirming with a relative of the source individual that the manner by which the artificial entity responding to second situations is indeed similar to a manner the source individual would react.

Figure 9:
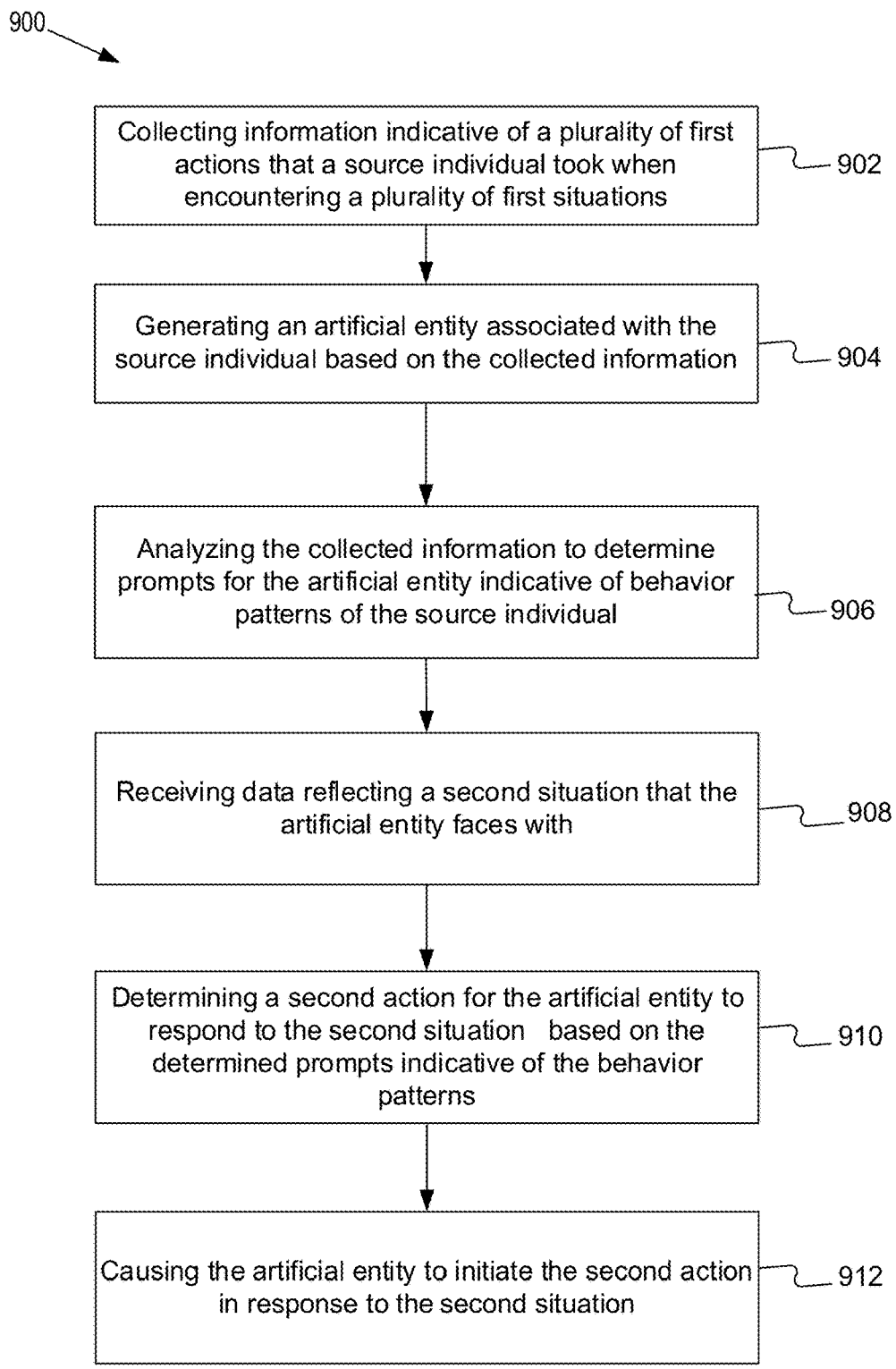
FIGS. 9, 11, 13, 15, 17, 19, 21, 23, 25, and 27 are flowcharts of example processes for operating artificial entities according to different embodiments of the present disclosure.

FIG. 9 illustrates a flowchart of an exemplary process 900 for operating artificial entities, consistent with embodiments of the present disclosure. In some disclosed embodiments, process 900 may be performed by at least one processor (e.g., processing device 210) to perform operations or functions described herein. In some disclosed embodiments, some aspects of process 900 may be implemented as software (e.g., program codes or instructions) that are stored in a memory (e.g., memory device 220) or a non-transitory computer-readable medium. In some disclosed embodiments, some aspects of process 900 may be implemented as hardware (e.g., a specific-purpose circuit). In some disclosed embodiments, process 900 may be implemented as a combination of software and hardware.

Referring to FIG. 9, process 900 includes a step 902 of collecting information indicative of a plurality of first actions that a source individual took when encountering a plurality of first situations. Some first actions may include social media activity—analyzing a person's social media posts, likes, shares, and comments can reveal their communication style, social preferences, political views, hobbies, travel habits, and even emotional state. Other first actions may include online purchasing behavior: studying what a person buys online can offer insights into their lifestyle, interests, values, and financial status. For instance, frequent purchases of books on a specific topic might indicate a deep interest in that subject. Other first actions may include language and writing style: analyzing the language, grammar, and tone used in emails, forum posts, or social media updates can provide clues about a person's personality traits, such as openness, conscientiousness, extraversion, agreeableness, and neuroticism. Other first actions may include gaming preferences and performance: for individuals who play online games, their gaming preferences, play style, performance, and interactions with other players can indicate aspects of their personality, such as competitiveness, teamwork skills, leadership abilities, and even tendencies towards risk-taking or aggression. Other first actions may include search queries and topics of interest: analyzing the topics a person frequently searches for online can reveal their curiosity, concerns, aspirations, and areas of expertise. For example, someone who frequently searches for recipes might enjoy cooking, while someone who searches for travel destinations might have a passion for exploration. Other first actions may include response to online advertisements and promotions: analyzing how a person responds to online advertisements and promotions can provide insights into their consumer behavior, preferences, brand affiliations, and financial priorities.

Process 900 further includes a step 904 of generating an artificial entity associated with the source individual based on the collected information. For example, generating the artificial entity may include integrating the collected information from various online sources and organizing this data in a structured format that allows for efficient processing and analysis. The process may also include using algorithms and models to simulate the user's behavior patterns based on the collected information, and incorporating machine learning techniques to predict future behaviors and preferences of the source individual, leveraging historical data and real-time feedback. And, implementing natural language processing (NLP) algorithms to enable the artificial entity to communicate with users in a natural and human-like manner.

Process 900 further includes a step 906 of analyzing the collected information to determine prompts for the artificial entity indicative of behavior patterns of the source individual. For example, the process may use natural language processing (NLP) and machine learning techniques to analyze the collected data. Thereafter, the process may utilize psychometric models, such as the Big Five personality traits (Openness, Conscientiousness, Extraversion, Agreeableness, Neuroticism), to create a profile of the source individual, and assign scores or labels to each personality trait based on the analysis of the first actions. The process may further include identifying recurring patterns and behaviors in the user's online activities. Based on the source individual's personality profile and behavior patterns, determining prompts that are tailored to their interests, preferences, and communication style. The determined prompts may align with the user's known personality traits. For example, if a source individual is identified as highly open to new experiences, prompts could encourage exploration of new topics or suggest adventurous activities. The determined prompts may also reflect the user's specific interests and preferences. For instance, recommend articles, products, or events related to topics they frequently engage with online. The determined prompts may also cause the responses of the artificial entity to use language that resonates with the user's writing style and tone, as inferred from their online communications. This helps create a more natural and engaging interaction experience.

Process 900 further includes a step 908 of receiving data reflecting a second situation that the artificial entity faces with. For example, the second situation may include receiving questions from individuals other than the source individual; assisting with tasks, receiving requests from the source individual, and identifying an event that may be of interest to the source individual.

Process 900 further includes a step 910 of determining a second action for the artificial entity to respond to the second situation based on the determined prompts indicative of the behavior patterns. Step 912 of causing the artificial entity to initiate the second action in response to the second situation. For example, the second action may include answering questions from individuals: the artificial entity would analyze the questions and provide relevant information or answers based on its programmed knowledge base or by searching the internet for accurate information; assisting with tasks: the artificial entity could guide individuals through step-by-step instructions to complete tasks efficiently, provide relevant resources or tools, or even automate certain tasks based on predefined criteria; offering emotional support: the artificial entity may employ empathy algorithms to understand and respond appropriately to the emotional state of the individual, offering supportive messages, suggestions for coping strategies, or recommending professional help if necessary; resolving technical issues: using troubleshooting algorithms, the artificial entity would diagnose technical problems and provide solutions or guide individuals through troubleshooting steps to resolve issues with software, hardware, or digital services; providing educational content: drawing from a database of educational materials, the artificial entity could offer personalized learning resources, tutorials, or explanations on various topics based on the individual's interests or learning objectives; managing calendar and schedule: the artificial entity would organize appointments, set reminders, and optimize schedules based on the individual's preferences, priorities, and availability; responding to phone calls, text messages, and emails: employing natural language processing, the artificial entity would interpret incoming communications, draft appropriate responses, and manage communication channels effectively, prioritizing urgent messages and filtering spam; making reservations: utilizing integration with reservation systems or online services, the artificial entity can facilitate booking appointments, reservations for restaurants, hotels, or other services, based on the individual's preferences and availability; providing news updates: the artificial entity can curate and deliver relevant news articles, updates, or summaries based on the individual's interests, preferences, and current events; managing online shopping: integrating with e-commerce platforms, the artificial entity could assist with product searches, comparisons, and purchases, based on the individual's preferences, budget, and previous purchase history; reacting to content and social media posts: analyzing content and sentiment, the artificial entity could provide feedback, engage in discussions, or offer relevant information in response to social media posts or online content; providing personalized recommendations: leveraging machine learning algorithms, the artificial entity would analyze user data, preferences, and behavior to offer tailored recommendations for products, services, content, or activities that align with the individual's interests and preferences.

In one aspect of the disclosure, methods, systems, and software are provided for collecting information about a source individual and determining interest levels associated with the collected information. The collected information may include browsing history, listening history to a podcast service, text that the source individual wrote and sent online, digital content that the source individual created and published online, and records of events that the source individual attended or places that the source individual visited. The interest levels may be associated with separated browsing sessions, separated podcasts, or separated online activities. The invention also includes determining a profile for an artificial entity based on the collected information and updating the profile of the artificial entity with additional offline events that are of interest to the source individual. The operations may include confirming with the source individual that the additional offline event is indeed of interest to the source individual prior to updating the profile of the artificial entity. The source individual may be a living person or a deceased person, and the profile of the artificial entity may include details on the passing of the source individual. The invention also includes determining prompts for the artificial entity indicative of behavior patterns of the source individual and validating the truthfulness of the additional offline event before updating the profile of the artificial entity. Validating the truthfulness of the additional offline event may involve receiving confirmation on the additional offline event from the source individual or from at least two independent sources.

Some embodiments of the disclosure include collecting information associated with a source individual during a first time period. The term "collecting" refers to the act of gathering or compiling data or information from various sources. This may include obtaining information from social media platforms, online forums, or other publicly available sources. Additionally, the act of collecting may involve the use of data mining techniques or other automated processes to extract relevant information. For example, collecting information may involve analyzing a source individual's social media activity to determine their interests and preferences. In addition, the term "information" refers to any data or data points that may be relevant to the analysis of the source individual's interests. This may include demographic information, browsing history, purchase history, or any other data that may be used to infer the source individual's interests. For example, information may include data on the source individual's age, gender, location, or occupation. Moreover, the term "source individual" refers to the person whose interests are being analyzed. This may include any individual who has provided information that can be used to infer their interests, such as through social media activity or online browsing behavior. For example, the source individual may be a user of a social media platform who has provided information about their interests and preferences.

Figure 10:
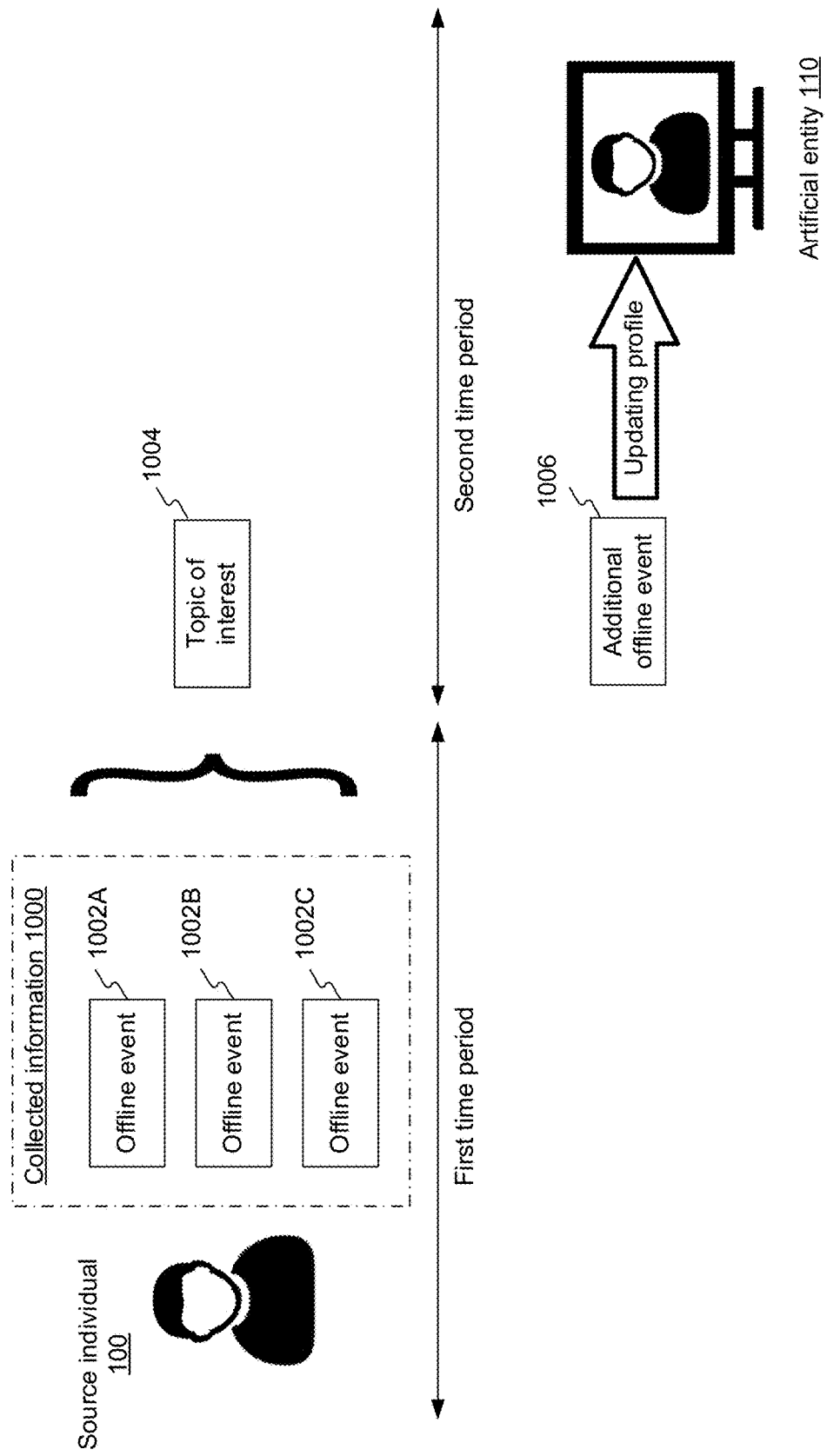

Some embodiments of the disclosure include analyzing the collected information to determine interest levels of the source individual to multiple offline events unprompted by the source individual. The term "analyzing" refers to the act of examining or evaluating data or information to draw conclusions or insights. This may involve the use of statistical analysis, machine learning algorithms, or other analytical techniques. For example, analyzing may involve identifying patterns in the source individual's social media activity to determine their interests. In addition, the term "interest levels" refers to the degree to which the source individual is interested in a particular topic or event. This may be inferred from the source individual's online activity, such as the frequency with which they engage with content related to a particular topic. For example, if the source individual frequently posts or shares content related to a particular sports team, this may indicate a high level of interest in that team. Moreover, the term "offline events" refers to incidents or activities that occur outside of the digital realm, i.e., the offline events has an effect in the real world. This may include attending a sporting event, visiting a museum, or participating in a community event. For example, if the source individual frequently posts about attending sporting events, this may indicate a high level of interest in sports. For example, as illustrated in FIG. 10, collected information 1000 about source individual 100 may include data on offline events 1002A, 10002B, and 10002C.

Some embodiments of the disclosure include identifying from the determined interest levels at least one topic of interest of the source individual. The term "identifying" refers to the act of recognizing or pinpointing a particular item or concept. This may involve the use of data analysis techniques to identify patterns or trends in the source individual's online activity. For example, identifying may involve recognizing that the source individual frequently engages with content related to a particular sports team. In addition, the term "topic of interest" refers to a particular subject or area that the source individual is interested in. This may be inferred from the source individual's online activity, such as the content they engage with or the topics they frequently discuss. For example, if the source individual frequently posts about a particular sports team this may indicate that sports is a topic of interest for them. Moreover, the term "determined interest levels" refers to the degree to which the source individual is interested in a particular topic or event. This may be inferred from the source individual's online activity, such as the frequency with which they engage with content related to a particular topic. For example, if the source individual frequently posts or shares content related to a particular sports team, this may indicate a high level of interest in that team. For example, as illustrated in FIG. 10, topic of interest 1004 is determined from offline events 1002.

Some embodiments of the disclosure include determining a profile for an artificial entity representing the source individual based on the collected information and the at least one topic of interest. The term "determining" refers to the act of establishing or ascertaining a particular item or concept. This may involve the use of data analysis techniques to identify patterns or trends in the source individual's online activity. For example, determining may involve recognizing that the source individual frequently engages with content related to a particular sports team. In addition, the term "profile" refers to a collection of data or information that describes the source individual's interests, preferences, and behavior. This may include demographic information, browsing history, purchase history, or any other data that may be used to infer the source individual's interests. For example, a profile may include data on the source individual's age, gender, location, or occupation. Moreover, the term "artificial entity" refers to a digital representation of the source individual that is created based on the collected information and the at least one topic of interest. This may include a chatbot, virtual assistant, or other digital persona that is designed to interact with users in a human-like manner. For example, an artificial entity may be designed to provide personalized recommendations for events or activities based on the source individual's interests.

Some embodiments of the disclosure include during a second time period subsequent the first time period receiving data indicative of an occurrence of an additional offline event. The term "receiving" refers to the act of obtaining or acquiring data or information from an external source. This may involve the use of sensors, data feeds, or other data collection mechanisms. For example, receiving may involve obtaining data on the occurrence of a particular event from a third-party data provider. In addition, the term "data indicative of an occurrence" refers to any data or information that provides evidence or proof of the occurrence of a particular event. This may include data on the location, time, or duration of the event, as well as any other relevant information. For example, data indicative of an occurrence may include a timestamped photo or video of the event. Moreover, the term "additional offline event" refers to any event or activity that occurs outside of the digital realm and is not related to the events or activities that were analyzed during the first time period. This may include attending a concert, visiting a theme park, or participating in a charity event. An additional offline event may be a community festival that the source individual attends. For example, as illustrated in FIG. 10, during a second time period, an additional offline event 1006 may occur.

Some embodiments of the disclosure include determining that the additional offline event relates to the at least one topic of interest of the source individual and updating the profile of the artificial entity to reflect knowledge on the additional offline event. The term "determining" refers to the act of establishing or ascertaining a particular item or concept. This may involve the use of data analysis techniques to identify patterns or trends in the source individual's online activity. For example, determining may involve recognizing that the source individual frequently engages with content related to a particular sports team. In addition, the term "relates to" refers to any connection or association between the additional offline event and the at least one topic of interest of the source individual. This may include a direct or indirect relationship between the event and the topic of interest. For example, if the source individual is interested in sports and attends a sporting event, this may be considered to relate to their topic of interest. Moreover, the term "updating" refers to the act of modifying or revising a particular item or concept. This may involve adding new data or information to an existing profile, or creating a new profile altogether. For example, updating may involve adding data on the source individual's attendance at a particular event to their existing profile. For example, as illustrated in FIG. 10, a profile of artificial entity 110 may be updated with details on additional offline event 1006.

According to the disclosed embodiments, the source individual is a living person, and the additional offline event occurred without their knowledge. The term "source individual" refers to the original person whose data is being used to create or update a profile. For example, this could include instances where an offline event such as a surprise party or an unexpected visit to a museum is incorporated into their profile without their awareness.

In some embodiments, the operations include confirming with the source individual that the additional offline event is indeed of interest before updating the profile of the artificial entity. The term "confirming" refers to verifying, validating, or ensuring the accuracy or relevance of information. Specific examples include sending a notification to the source individual to validate their interest in an offline event such as a local sports game or concert.

Consistent with the present disclosure, the source individual may be a deceased person, and the profile of the artificial entity includes details on their passing. The term "deceased person" refers to an individual who has passed away, and this can encompass any person no longer living. For instance, the profile might be updated with details about their funeral or significant milestones they had achieved before passing.

In some cases, the collected information includes the browsing history of the source individual, and the determined interest levels are associated with separate browsing sessions. The term "browsing history" refers to the recorded data of web pages visited by an individual. This can include various sessions such as those conducted on different devices like a laptop at home and a smartphone during a commute.

According to the disclosed embodiments, the collected information includes the listening history of the source individual to a podcast service, with determined interest levels associated with separate podcasts. The term "listening history" refers to the tracked data of audio content consumed by an individual. For example, the system may track interest levels in different podcast genres, such as technology discussions or historical documentaries.

In some embodiments, the collected information includes text that the source individual wrote and sent online. The term "text" refers to written words that can be communicated via digital means. This includes emails, social media posts, and comments on blogs or forums, which can all be used to gauge the individual's interests and preferences.

Consistent with the present disclosure, the collected information includes digital content that the source individual created and published online. The term "digital content" refers to any form of media or information that exists in digital format. Examples include videos uploaded to YouTube, songs shared on music platforms, and digital art showcased on personal websites or social media.

In some cases, the collected information includes records of events that the source individual attended or places they visited. The term "records" refers to documented evidence of activities or locations. For instance, frequent visits to a specific stadium may indicate a strong interest in a particular sports team, such as the NBA's Washington Wizards.

According to the disclosed embodiments, determining the profile for the artificial entity includes identifying prompts indicative of the source individual's behavior patterns. The term "prompts" refers to cues or triggers that elicit specific responses or actions. These prompts could include habitual behaviors like daily gym visits or regular attendance at local community events.

In some embodiments, the operations include determining the source individual's option regarding a specific topic of interest based on the collected information. The term "option" refers to a preference or choice made by the individual. This involves updating the artificial entity's profile to reflect preferences such as favoring a particular political viewpoint or brand loyalty and generating outputs that mirror these preferences.

Consistent with the present disclosure, the operations include validating the truthfulness of the additional offline event before updating the profile of the artificial entity. The term "validating" refers to the process of verifying the accuracy or authenticity of information. For example, cross-checking an event's occurrence with reliable sources or confirming details with the source individual ensures the integrity of the profile updates.

In some cases, validating the truthfulness of the additional offline event involves receiving confirmation from the source individual or an entity they previously indicated as truthful. The term "confirmation" refers to corroboration or affirmation of information. Specific examples include verification from trusted contacts or cross-referencing event details with official records or reputable news sources.

According to the disclosed embodiments, validating the truthfulness of the additional offline event involves receiving confirmation from at least two independent sources. The term "independent sources" refers to separate, unconnected entities that provide verification. This can include multiple news agencies or independent witnesses confirming the occurrence of an event.

In some embodiments, the operations further include receiving a question from a target individual and causing the artificial entity to generate a response based on the updated profile. The term "target individual" refers to the person asking the question, who can either be the source individual or another person interacting with the artificial entity. For example, family members or friends might inquire about the source individual's preferences or opinions.

Consistent with the present disclosure, if the topic of interest includes a specific sports team, the artificial entity's response will reflect updated knowledge on recent achievements of that team. The term "specific sports team" refers to any organized group of athletes competing in a particular sport. For instance, the artificial entity might provide updates on the latest wins or player statistics of the user's favorite basketball team.

In some cases, if the topic of interest includes a specific politician, the artificial entity's response will reflect updated knowledge on recent statements made by that politician. The term "specific politician" refers to an individual holding or running for a political office. Examples include providing insights on recent policy announcements or public speeches made by the politician.

According to the disclosed embodiments, if the field of interest is related to a specific field of technology, the artificial entity's response will reflect updated knowledge on recent developments in that field. The term "specific field of technology" refers to a particular area within the tech industry, such as artificial intelligence, renewable energy, or biotechnology. The entity might share recent advancements, new products, or significant research findings.

In some embodiments, if the field of interest is related to a specific content creator, the artificial entity's response will reflect updated knowledge on recent content published by that creator. The term "specific content creator" refers to an individual or group producing digital content. Examples include updates on new videos from a popular YouTuber or new blog posts from a renowned writer.

Consistent with the present disclosure, if the field of interest is related to the family of the source individual, the artificial entity's response will reflect updated knowledge on recent events that affected a family member. The term "family" refers to individuals related by blood, marriage, or close association. This could include updates on significant life events like births, weddings, or graduations.

In some cases, the generated answer will include an expression of empathy regarding recent events that affected a family member of the source individual. The term "expression of empathy" refers to statements that convey understanding, compassion, or support. Examples include phrases like "sorry for your loss" for condolences or "I'm happy for you" to celebrate joyful occasions.

Figure 11:
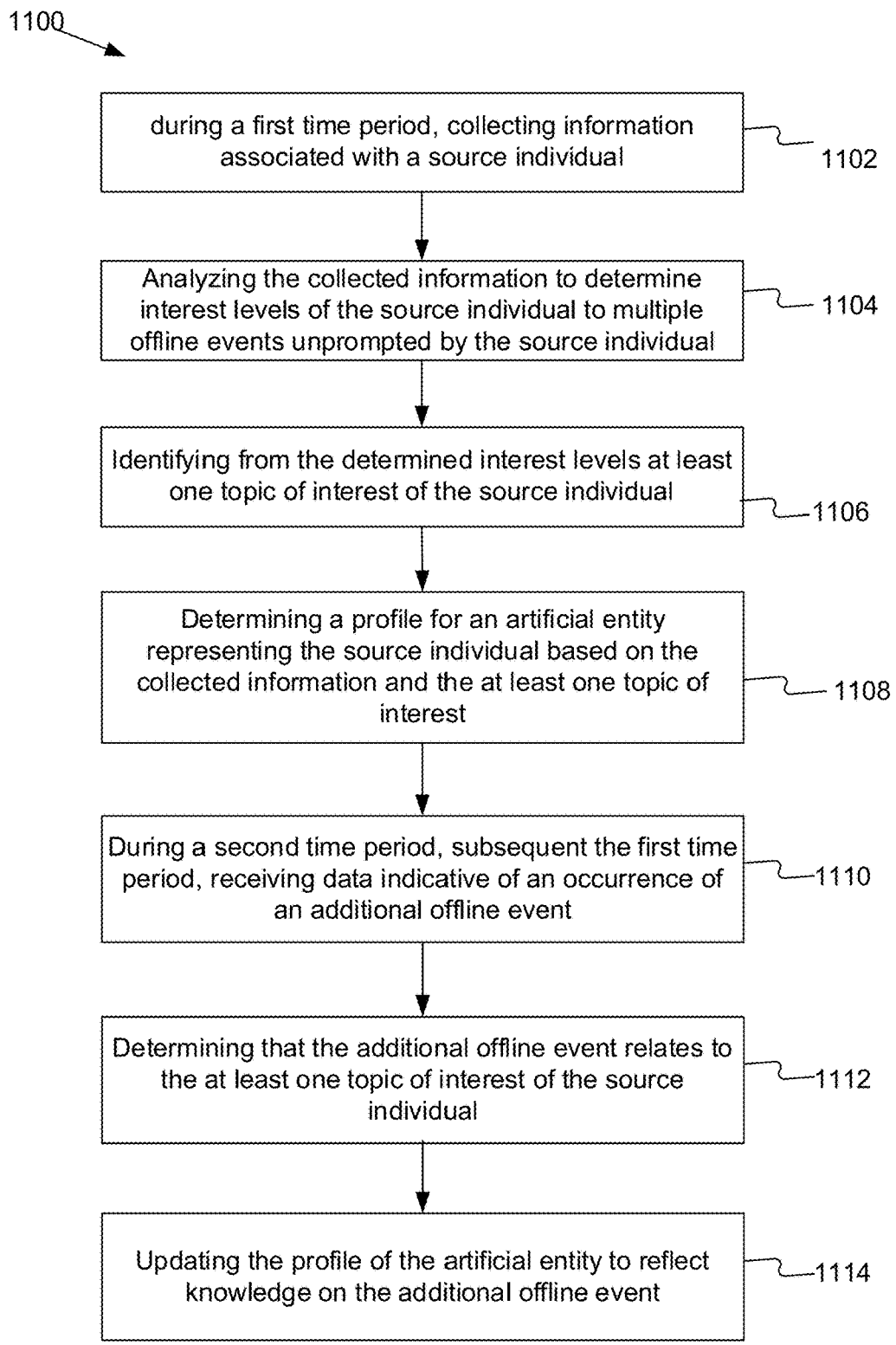

FIG. 11 illustrates a flowchart of an exemplary process 1100 for operating artificial entities, consistent with embodiments of the present disclosure. In some disclosed embodiments, process 1100 may be performed by at least one processor (e.g., processing device 210) to perform operations or functions described herein. In some disclosed embodiments, some aspects of process 1100 may be implemented as software (e.g., program codes or instructions) that are stored in a memory (e.g., memory device 220) or a non-transitory computer-readable medium. In some disclosed embodiments, some aspects of process 1100 may be implemented as hardware (e.g., a specific-purpose circuit). In some disclosed embodiments, process 1100 may be implemented as a combination of software and hardware.

Referring to FIG. 11, process 1100 includes a step 1102 of collecting information associated with a source individual. The type of information collected is described elsewhere in this disclosure. Process 1100 further includes a step 1104 of analyzing the collected information to determine interest levels of the source individual to multiple offline events unprompted by the source individual. For example, following the process, the system may recognize different interest levels of the source individual to different topics. Process 1100 further includes a step 1106 of identifying from the determined interest levels at least one topic of interest of the source individual. A topic of interest may be one where the determined interest level is greater than a threshold. Process 1100 further includes a step 1108 of determining a profile for an artificial entity representing the source individual based on the collected information and the at least one topic of interest. The profile reflects the source individual's interests, habits, and patterns. In some cases, the system may incorporate at least one identified topic of interest to ensure the profile accurately represents the source individual's focal points and priorities. Process 1100 further includes a step 1110 of receiving data indicative of an occurrence of an additional offline event. The additional offline event may occur without knowledge of the source individual. Process 1100 further includes a step 1112 of determining that the additional offline event relates to the at least one topic of interest of the source individual. For example, the field of interest is related to the family of the source individual and the additional offline event is associated with a family member of the source individual. Process 1100 further includes a step 1114 of updating the profile of the artificial entity to reflect knowledge on the additional offline event. The way, for example, when the artificial entity is asked a questions, it may incorporate a knowledge on the additional offline event in its response.

In one aspect of the disclosure, methods, systems, and software are provided for generating an artificial entity that accounts to the level of intimacy the source individual had with other individuals are provided. In this embodiment, an artificial entity that can mimic the behavior patterns of a source individual with respect to a plurality of individuals. The artificial entity is generated based on collected information about the relationships between the source individual and the plurality of individuals. The collected information is analyzed to determine behavior patterns of the source individual with respect to each individual, which is indicative of the level of intimacy between them. The artificial entity can then interact with the individuals based on the determined level of intimacy, using specific communication styles, such as nicknames, tone, and emojis, that mirror the behavior patterns of the source individual.

The operations of the artificial entity can be adjusted based on received data reflecting interactions with the individuals, such as changes in the level of intimacy between the source individual and the specific individual. The collected information can also include significant dates, such as birth-dates, and the artificial entity can determine whether to mention them while interacting with a specific individual based on the determined level of intimacy. The behavior patterns of the source individual can include both verbal and non-verbal parameters, such as body language and facial expressions, which the artificial entity can mimic to create a more personalized interaction.

Figure 12:
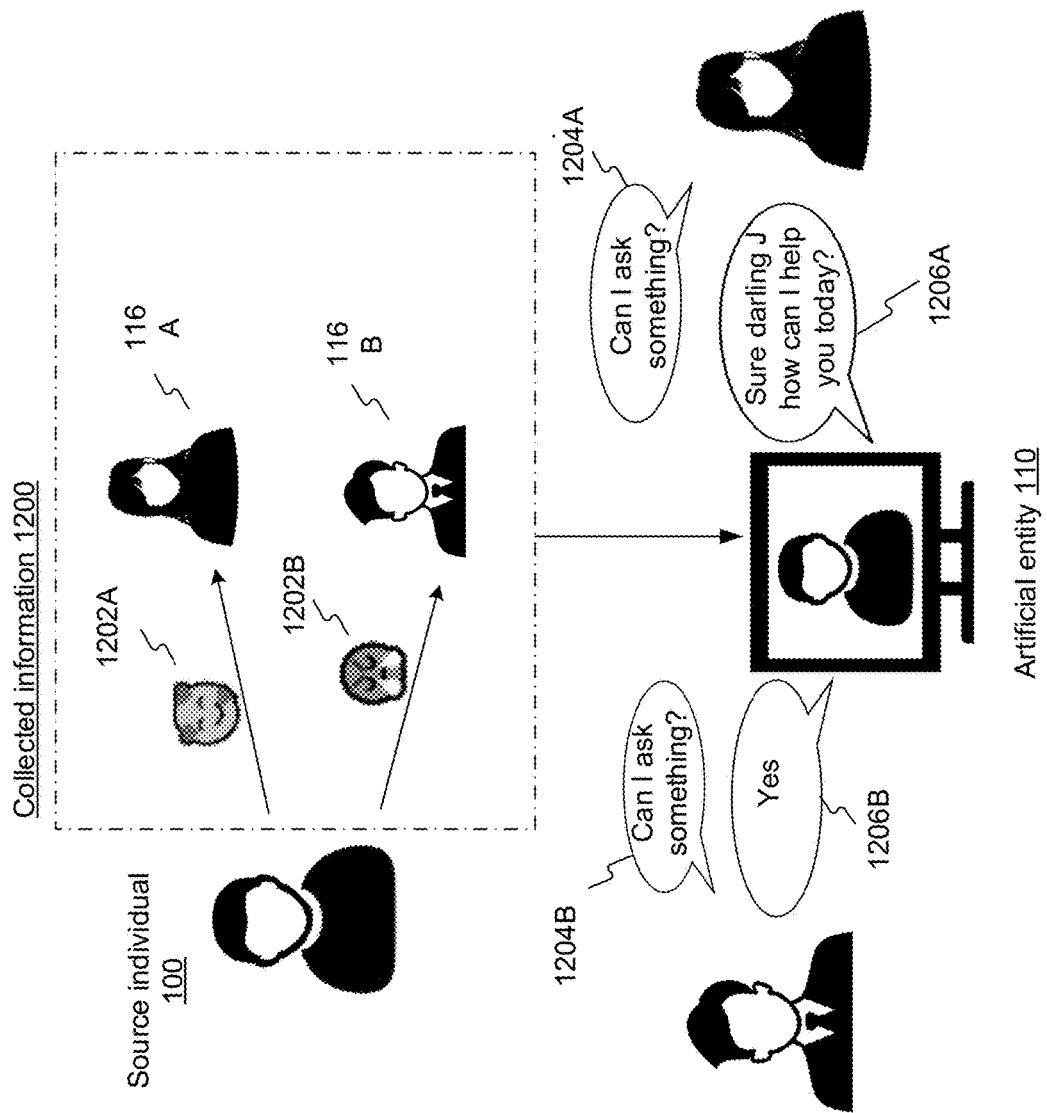

Some embodiments of the disclosure include collecting information indicative of a plurality of relationships between a source individual and a plurality of individuals. For example, as shown in FIG. 12, the system may collect information 1200 about individuals 116A and 116B. The term "collecting" refers to the process of gathering data or information from various sources. This may involve obtaining information from databases, social media platforms, or other sources of information. For example, the information may include data on the frequency and duration of interactions between the source individual and the plurality of individuals, as well as the types of interactions that occur. In addition, the term "information" may refer to any data or knowledge that can be used to determine the behavior patterns of the source individual with respect to each of the plurality of individuals. Moreover, the term "relationships" refers to the connections or associations between the source individual and the plurality of individuals. This may include personal relationships, professional relationships, or any other type of relationship that can be used to determine the behavior patterns of the source individual. For example, plurality of individuals may include family members, friends, colleagues, or acquaintances.

Some embodiments of the disclosure include analyzing the collected information to determine behavior patterns of the source individual with respect to each of the plurality of individuals wherein the behavior patterns is indicative of a level of intimacy. In the simplified example shown in FIG. 12, the system may determine that source individual 100 loves individual 116A (e.g., emoji 1202A) and does not like individual 116B (e.g., emoji 1202B). The term "analyzing" refers to the process of examining the collected information to identify patterns or trends. This may involve using statistical methods, machine learning algorithms, or other techniques to identify behavior patterns of the source individual. For example, the behavior patterns may include the frequency and duration of interactions, the types of interactions, or the content of the interactions. In addition, the term "behavior patterns" refers to the actions or activities of the source individual with respect to each of the plurality of individuals. This may include the frequency and duration of interactions, the types of interactions, or the content of the interactions. Moreover, the term "level of intimacy" refers to the degree of closeness or familiarity between the source individual and each of the plurality of individuals. This may include emotional intimacy, physical intimacy, or any other type of intimacy that can be used to determine the behavior patterns of the source individual.

Some embodiments of the disclosure include generating an artificial entity associated with the source individual based on the collected information. The term "generating" refers to the process of creating or producing something new. In this case, the artificial entity is created based on the collected information about the behavior patterns of the source individual. The artificial entity may be a chatbot, a virtual assistant, or any other type of artificial intelligence that can interact with individuals. In addition, the term "artificial entity" refers to a computer program or system that is designed to simulate human behavior or intelligence. The artificial entity may be programmed to respond to various types of interactions, such as text messages, emails, or phone calls. Moreover, the term "associated with" refers to the connection or relationship between the artificial entity and the source individual. The artificial entity may be designed to mimic the behavior patterns of the source individual, or it may be programmed to respond in a way that is consistent with the behavior patterns of the source individual.

Some embodiments of the disclosure include receiving data reflecting an interaction of the artificial entity with at least one individual of the plurality of individuals. In the simplified example of FIG. 12, the interaction between artificial entity 110 and individuals 116A and 116B is a same question "Can I ask something." The term "receiving" refers to the process of obtaining or acquiring something. In this case, the artificial entity receives data reflecting an interaction with at least one individual of the plurality of individuals. The data may include text messages, emails, or any other type of communication that occurs between the artificial entity and the individual. In addition, the term "interaction" refers to the communication or exchange of information between the artificial entity and the individual. The interaction may involve asking and answering questions, providing information, or engaging in any other type of conversation. Moreover, the term "data" refers to the information that is exchanged during the interaction. The data may include text, images, or any other type of information that is relevant to the interaction.

Some embodiments of the disclosure include determining a manner for the artificial entity to respond to the interaction based on determined the level of intimacy that the source individual has with the at least one individual. For example, based on the level of intimacy that source individual 100 has with reference individuals 116A and 116B, the system decides that the answer to individual 116A should be long and warm, and the answer to individual 116B should be short and cold. The term "determining" refers to the process of making a decision or arriving at a conclusion based on the available information. In this case, the artificial entity determines a manner for responding to the interaction based on the level of intimacy that the source individual has with the at least one individual. In addition, the term "manner" refers to the way in which the artificial entity responds to the interaction. The manner may involve providing information, asking questions, the tone of the communication, and any other type of characteristic of the conversation or interaction (e.g., the appropriate tone, selection of emoji, the language register, or content of the response). Moreover, the term "level of intimacy" refers to the degree of closeness or familiarity between the source individual and the at least one individual.

Consistent with the present disclosure, the operations further include determining that the source individual had a first level of intimacy with a first individual and a second level of intimacy with a second individual, where the first level is greater than the second level. The artificial entity communicates with the first individual in a warmer manner than with the second individual. The term "intimacy level" refers to the closeness or personal connection between the source individual and another individual. For example, the artificial entity might use more casual language and expressive tones with the first individual while maintaining a more formal and reserved manner with the second individual.

According to the disclosed embodiments, the artificial entity communicates with the first individual using a nickname and with the second individual using a forename. The term "nickname" refers to an informal, often affectionate name given to someone instead of their formal name. For instance, the nickname could be a familiar or humorous variation of the first individual's name that the source individual typically used, or it might be a new nickname approved by the first individual.

In some embodiments, the artificial entity communicates with the first individual using a forename and with the second individual using a formal address. The term "formal address" refers to a respectful and conventional way of addressing someone, such as using titles like Mr., Ms., or Dr., along with their last name. For example, the artificial entity might address the first individual as "John" while referring to the second individual as "Mr. Smith."

Consistent with the present disclosure, the artificial entity communicates with the first individual using a first tone and with the second individual using a second tone, where the first tone is softer than the second tone. The term "tone" refers to the quality or character of sound used in communication. For instance, the first tone could be gentle and friendly, while the second tone might be more neutral or formal.

According to the disclosed embodiments, the artificial entity provides longer answers to the first individual compared to the answers provided to the second individual. The term "longer answers" refers to more detailed and extensive responses. For example, when the first individual asks a question, the artificial entity might give a comprehensive explanation, while it might offer a concise reply to the second individual.

In some cases, the artificial entity shares private details with the first individual and avoids sharing private details with the second individual. The term "private details" refers to personal information that is not typically disclosed to everyone. For example, the artificial entity might share updates about the source individual's health or personal experiences with the first individual but refrain from sharing such information with the second individual.

Consistent with the present disclosure, the artificial entity uses specific emojis while communicating with the first individual and avoids using the specific emojis while communicating with the second individual. The term "emojis" refers to small digital images or icons used to express ideas or emotions in electronic communication. For instance, the artificial entity might use a heart emoji when messaging the first individual but refrain from using it with the second individual to maintain a more formal tone.

According to the disclosed embodiments, when the received data reflects a joint interaction between the artificial entity, the first individual, and the second individual, the artificial entity communicates with both individuals based on the second level of intimacy. The term "joint interaction" refers to a scenario where multiple individuals are engaged in a conversation or activity together. For example, during a group chat, the artificial entity might adopt a communication style suitable for the less intimate relationship to ensure overall appropriateness.

In some embodiments, when the received data reflects a joint interaction between the artificial entity, the first individual, and the second individual, the artificial entity communicates with the first individual based on the first level of intimacy and with the second individual based on the second level of intimacy. The term "communication style" refers to the way in which information is conveyed. For instance, the artificial entity might use friendly and familiar language with the first individual while maintaining a formal and reserved approach with the second individual.

Consistent with the present disclosure, the operations further include determining which individuals are parents of the source individual and whether the artificial entity should call the parents by their first names or as "mom" and "dad." The term "parents" refers to the father and mother of the source individual. For example, if the collected data indicates a close familial relationship, the artificial entity might refer to the parents as "mom" and "dad" instead of using their first names.

According to the disclosed embodiments, the collected information includes significant dates to the plurality of individuals, and the operations further include determining whether the artificial entity should mention a significant date while interacting with a specific individual based on the determined level of intimacy with that individual. The term "significant dates" refers to important dates such as birthdays, anniversaries, or holidays. For instance, the artificial entity might acknowledge a significant date like a birthday when interacting with a closely connected individual.

In some cases, the significant dates include birthdates of the plurality of individuals, and the operations further include determining whether the artificial entity should congratulate the specific individual based on the determined level of intimacy. The term "congratulate" refers to expressing good wishes or praise for an achievement or special occasion. For example, the artificial entity might send a personalized birthday greeting to the first individual if the intimacy level is high enough.

Consistent with the present disclosure, the determined behavior patterns of the source individual with respect to each of the plurality of individuals include verbal parameters that the source individual uses while interacting with each individual. The term "verbal parameters" refers to aspects of spoken or written communication, such as tone, word choice, and style. For instance, the artificial entity might mirror the source individual's informal language and slang when interacting with close friends.

According to the disclosed embodiments, the verbal parameters include at least one of the following: length of responses, details of responses, tone, language register, manner of greetings, manner of closings, and usage of emojis. The term "language register" refers to the level of formality or informality used in communication. For example, the artificial entity might use short, casual greetings and farewells with friends, while adopting more formal and detailed language with colleagues.

In some cases, the determined behavior patterns of the source individual with respect to each of the plurality of individuals include non-verbal parameters that the source individual uses while interacting with each individual. The term "non-verbal parameters" refers to aspects of communication that do not involve words, such as body language and facial expressions. For example, the artificial entity might nod or smile more frequently when interacting with close acquaintances.

Consistent with the present disclosure, the non-verbal parameters include at least one of the following: body language, eye contact, smiles and laughter, and facial expressions. The term "body language" refers to the gestures, movements, and postures used in communication. For instance, the artificial entity might use open and relaxed body language to convey friendliness and approachability.

According to the disclosed embodiments, the operations further include causing the artificial entity to interact with a specific individual according to a specific manner determined based on the level of intimacy that the source individual had with that individual. The term "specific manner" refers to a particular style or approach in communication. For example, the artificial entity might adopt a supportive and empathetic tone when interacting with a close friend of the source individual.

In some cases, the operations include receiving data on additional interactions with the specific individual and changing the specific manner in which the artificial entity interacts with the specific individual based on the received data. The term "additional interactions" refers to subsequent communications or engagements between the individuals. For example, if the source individual and a friend have a disagreement, the artificial entity might adjust its communication style to reflect the changed relationship dynamics.

Consistent with the present disclosure, the additional interactions with the specific individual include interactions between the artificial entity and the specific individual, indicative of the relationship between them. The term "indicative" refers to showing or suggesting something. For instance, the artificial entity might recognize a shift in the intimacy level based on new patterns of communication and modify its behavior accordingly.

Figure 13:
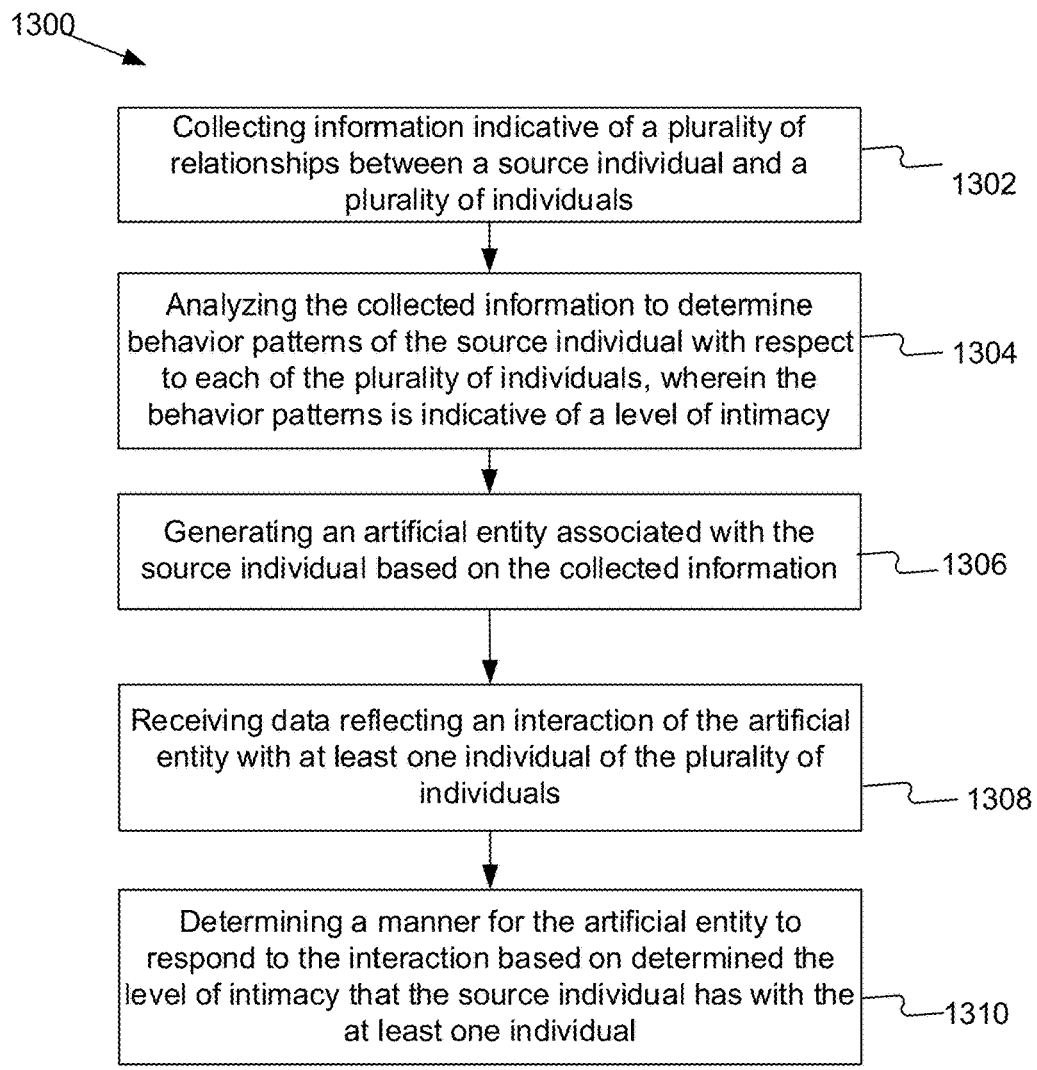

FIG. 13 illustrates a flowchart of an exemplary process 1300 for operating artificial entities, consistent with embodiments of the present disclosure. In some disclosed embodiments, process 1300 may be performed by at least one processor (e.g., processing device 210) to perform operations or functions described herein. In some disclosed embodiments, some aspects of process 1300 may be implemented as software (e.g., program codes or instructions) that are stored in a memory (e.g., memory device 220) or a non-transitory computer-readable medium. In some disclosed embodiments, some aspects of process 1300 may be implemented as hardware (e.g., a specific-purpose circuit). In some disclosed embodiments, process 1300 may be implemented as a combination of software and hardware.

Referring to FIG. 13, process 1300 includes a step 1302 of collecting information indicative of a plurality of relationships between a source individual and a plurality of individuals. The type of information collected is described elsewhere in this disclosure. Process 1300 further includes a step 1304 of analyzing the collected information to determine behavior patterns of the source individual with respect to each of the plurality of individuals, wherein the behavior patterns is indicative of a level of intimacy. For example, following the process, the system may recognize different levels of intimacy of the source individual with different individuals. Process 1300 further includes a step 1306 of generating an artificial entity associated with the source individual based on the collected information. The process of generating artificial entity is described elsewhere in this disclosure. Process 1300 further includes a step 1308 of receiving data reflecting an interaction of the artificial entity with at least one individual of the plurality of individuals. For example, the received data may be a question that at least one individual asked. Process 1300 further includes a step 1310 of determining a manner for the artificial entity to respond to the interaction based on determined the level of intimacy that the source individual has with the at least one individual.

In one aspect of the disclosure, methods, systems, and software are provided for collecting information indicative of conversations between a source individual and a plurality of reference individuals, analyzing the collected information to determine speech attributes of the source individual in different situations, generating an artificial entity associated with the source individual, receiving data reflecting a current situation that includes a question for the artificial entity from a target individual, and causing the artificial entity to present an answer to the question in a manner closer to the speech attributes of the source individual in the situation that is closer to the current situation.

The determination of the situation may be based on the topic of the question, the identity of the target individual, or personal data of the source individual. In some examples, the speech attributes can include specific language register preferences, vocabulary preferences, voice pronunciation characteristics, or writing characteristics. The artificial entity can also learn nicknames used by the source individual and refer to the target individual by a learned nickname. Additionally, a large language model may be used to generate the answer.

Figure 14:
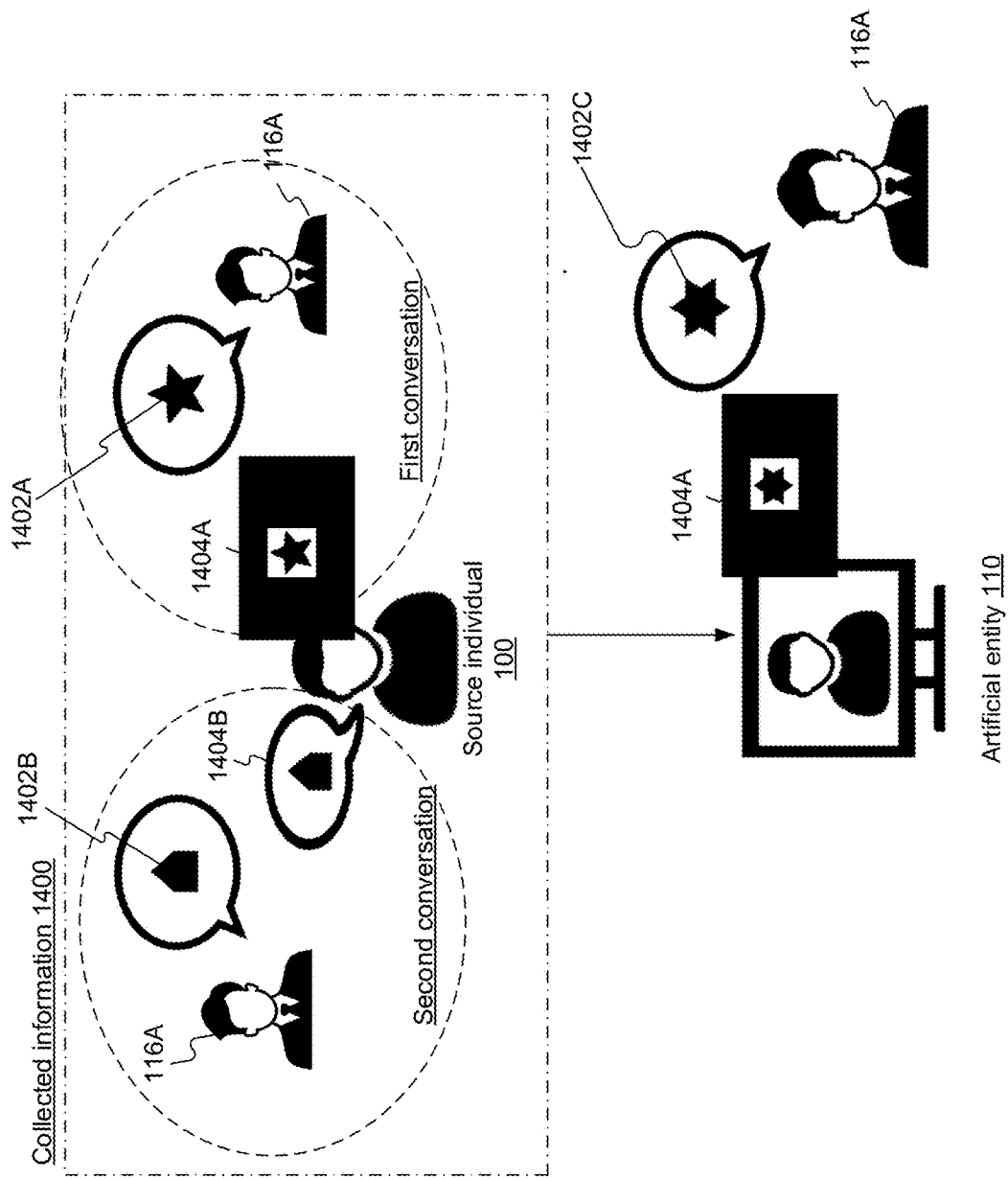

Some embodiments of the disclosure include collecting information indicative of a plurality of conversations between a source individual and a plurality of reference individuals. For example, as shown in FIG. 14, the system may collect information 1400 about two conversions between source individual 100 and reference individual 116A. The first and second conversions take place at different times. The term "collecting" refers to the process of gathering data or information from various sources. In this context, collecting information may involve recording conversations between the source individual and the reference individuals, or obtaining transcripts or summaries of those conversations. The collected information may include speech patterns, word choices, and other characteristics of the source individual's communication style. In addition, the term "information indicative" refers to data that provides evidence or clues about a particular phenomenon. In this context, the collected information is indicative of the speech attributes of the source individual. The term "speech attributes" refers to various characteristics of an individual's speech, such as tone, pitch, volume, and speed. For example, the collected information may indicate that the source individual speaks more slowly and uses simpler language when talking to children, compared to when talking to adults. Moreover, the term "plurality of conversations" refers to multiple instances of communication between the source individual and the reference individuals. The conversations may occur in different contexts or settings, and may involve different topics or subject matters. For example, the conversations may include phone calls, text messages, emails, or in-person interactions.

Some embodiments of the disclosure include analyzing the collected information to determine first speech attributes of the source individual when speaking in a first situation and second speech attributes when speaking in a second situation. In the simplified example of FIG. 14, the first conversation is on a first topic 1402A and the second conversation is on a second topic 1402B. The collected information is analyzed to determine that when speaking on a first topic 1402A, source individual 100 has first speech attributes 1404A and when speaking on a second topic 1402B, source individual 100 has speech attributes 1404B. The term "analyzing" refers to the process of examining or studying data to identify patterns, relationships, or other insights. In this context, analyzing the collected information involves identifying the speech attributes of the source individual in different situations. In addition, the term "first situation" refers to a specific context or setting in which the source individual communicates with others. The first situation may be characterized by certain environmental factors, such as noise level, lighting, or temperature, or by certain social factors, such as the identity or status of the reference individuals. For example, the first situation may be a business meeting, where the source individual speaks in a formal and professional manner. Moreover, the term "second situation" refers to another specific context or setting in which the source individual communicates with others. The second situation may be different from the first situation in terms of environmental or social factors. For example, the second situation may be a casual conversation with friends, where the source individual speaks in a more relaxed and informal manner.

Some embodiments of the disclosure include generating an artificial entity associated with the source individual based on the collected information. The term "generating" refers to the process of creating or producing something new based on existing data or information. In this context, generating an artificial entity involves creating a virtual representation of the source individual that can interact with others. In addition, the term "artificial entity" refers to a computer program or system that simulates human-like behavior or intelligence. The artificial entity may be designed to respond to questions, provide information, or perform other tasks based on its programming and data inputs. For example, the artificial entity may be a chatbot that can answer customer service inquiries. Moreover, the term "associated with the source individual" refers to the connection or relationship between the artificial entity and the source individual. The artificial entity may be based on the speech attributes and other characteristics of the source individual, and may be designed to mimic or emulate the source individual's communication style.

Some embodiments of the disclosure include receiving data reflecting of a current situation that includes a question for the artificial entity from a target individual. In the simplified example of FIG. 14, reference individual 116A asks artificial entity 110 a question about topic 1402C. The term "receiving" refers to the process of obtaining or acquiring data or information from an external source. In this context, receiving data involves obtaining information about a current situation that includes a question for the artificial entity. In addition, the term "current situation" refers to the context or setting in which the target individual is interacting with the artificial entity. The current situation may be characterized by certain environmental or social factors that influence the communication between the target individual and the artificial entity. For example, the current situation may be a customer service inquiry, where the target individual is seeking assistance with a product or service. Moreover, the term "question for the artificial entity" refers to a request or inquiry directed at the artificial entity by the target individual. The question may be related to a specific topic or subject matter, and may require the artificial entity to provide information or perform a task.

Some embodiments of the disclosure include making a determination that the current situation is closer to the first situation than the second situation and based on the determination causing the artificial entity to present an answer the question in a manner closer to the first speech attributes of the source individual than the second speech attributes of the source individual. In the simplified example of FIG. 14, artificial entity 110 answer about topic 1402C in a manner closer to first speech attributes 1404A because topic 1402C is closer to topic 1402A than to topic 1402B. The term "making a determination" refers to the process of reaching a conclusion or decision based on available data or information. In this context, making a determination involves evaluating the current situation and comparing it to the first and second situations. In some cases, the determination does not involve comparing the situation to the first and second situations, just identifying the closest situation using, e.g., machine learning or identifying keywords of in the conversation. In addition, the term "closer to the first situation" refers to the degree of similarity or proximity between the current situation and the first situation. The determination may be based on various factors, such as the topic of the question, the identity of the target individual, or the context of the communication. Moreover, the term "present an answer" refers to the process of providing a response or solution to the question posed by the target individual. The answer may be generated by the artificial entity based on its programming and data inputs, and may be designed to reflect the speech attributes of the source individual in the first situation. For example, if the first situation is a formal business meeting, the artificial entity may provide a more formal and professional response to the question.

In some embodiments, as illustrated in FIG. 14, the first situation involves an interaction about a specific topic, and the second situation involves an interaction about a different topic. The determination that the question from the target individual is closer to the first situation is based on the topic of the question. For example, if the source individual exhibits more excitement or embarrassment when discussing certain topics, the artificial entity will mimic these speech attributes. The term "topic" refers to the subject matter or theme of the conversation. Specific examples include topics such as technology, personal relationships, or hobbies.

According to the disclosed embodiments, the first situation involves an interaction with one individual, while the second situation involves an interaction with another individual. The determination that the question from the target individual is closer to the first situation is based on the identity of the target individual. The term "identity" refers to the distinguishing character or personality of an individual. For instance, the target individual could be the same person as the first individual or someone from the same social circle.

Consistent with the present disclosure, personal data of the source individual is used to determine that the target individual is closer to the first individual than the second individual. The term "personal data" refers to any information relating to an identified or identifiable person. Examples include social network friends, bibliographic details, and professional connections.

In some cases, personal data indicates that the first individual is a family member of the source individual and the second individual is a colleague. The term "family member" refers to someone related by blood, marriage, or adoption. Examples include parents, siblings, and children.

According to the disclosed embodiments, personal data may indicate that the first individual has a personal connection with the source individual, while the second individual follows the source individual on a social network. The term "personal connection" refers to a relationship or association between two people. Examples include friends, mentors, or significant others.

In some embodiments, first speech attributes include specific language register preferences of the source individual when speaking in a first situation, and the answer is generated based on these preferences. The term "language register" refers to the level of formality in language use. Examples include formal register for professional settings and casual register for conversations with friends.

Consistent with the present disclosure, first speech attributes include specific vocabulary preferences of the source individual when speaking in a first situation, and the answer is generated based on these preferences. The term "vocabulary" refers to the set of words known and used by a person. Examples include technical jargon in a professional context and slang in informal conversations.

According to the disclosed embodiments, first speech attributes include specific voice pronunciation characteristics of the source individual when speaking in a first situation, and the answer is audibly presented based on these characteristics. The term "pronunciation" refers to the way in which a word is spoken. Examples include accents, clarity, and rhythm of speech.

In some cases, specific voice pronunciation characteristics may include pitch, rate of speech, volume, tone, accent, clarity, rhythm, speech disorders, articulation, and intonation. The term "pitch" refers to the perceived frequency of a sound. For example, a high-pitched voice might be more energetic, while a low-pitched voice might convey seriousness.

Consistent with the present disclosure, first speech attributes include specific writing characteristics of the source individual when communicating in a first situation, and the answer is textually presented based on these characteristics. The term "writing characteristics" refers to the distinctive features of a person's written communication. Examples include grammar, vocabulary, writing tone, and style.

In some embodiments, specific writing characteristics may include grammar, vocabulary, writing tone, writing style, and emoji preferences. The term "writing tone" refers to the attitude or approach expressed in writing. For example, a formal tone might be used in professional emails, while a casual tone might be used in text messages.

According to the disclosed embodiments, the operations include learning nicknames used by the source individual, and when answering the question, the artificial entity refers to the target individual by a learned nickname. The term "nickname" refers to a familiar or humorous name given to a person. Examples include "Bob" for Robert or "Liz" for Elizabeth.

In some cases, the target individual is excluded from the plurality of reference individuals, and the operations further include identifying a common trait between the target individual and at least one reference individual associated with the first situation. The term "common trait" refers to a characteristic shared by two or more individuals. Examples include similar hobbies, career paths, or educational backgrounds.

Consistent with the present disclosure, the common trait may include social circle, gender, age group, hobbies, career, or educational background. The term "social circle" refers to a group of people with whom one regularly interacts. Examples include colleagues, friends, and family members.

According to the disclosed embodiments, determining the first speech attributes includes determining a voice profile of the source individual when speaking in a first situation and causing the artificial entity to answer the question using an artificial voice based on the determined voice profile. The term "voice profile" refers to a set of vocal characteristics unique to an individual. Examples include pitch, tone, and accent.

In some embodiments, the operations include applying a large language model (LLM) to generate the answer, wherein the operations include using the first speech attributes to determine prompts for the LLM. The term "large language model" refers to a type of artificial intelligence trained on vast amounts of text data to understand and generate human language. Examples include GPT-3 and BERT.

Consistent with the present disclosure, the operations further include receiving data reflecting a response from the target individual to the answer of the artificial entity and making an updated determination that the current situation is now closer to the second situation than the first situation. The term "response data" refers to the information received in reaction to a stimulus. Examples include verbal replies, facial expressions, and body language.

According to the disclosed embodiments, the updated determination is based on a renewed understanding of the subject of the conversation between the target individual and the artificial entity. The term "renewed understanding" refers to a refreshed or updated perception of information. Examples include recognizing a shift in topic or detecting changes in emotional tone.

In some cases, the updated determination is based on a renewed understanding of the identity of the target individual. The term "identity" refers to the distinguishing character or personality of an individual. Examples include recognizing the target individual as a new acquaintance or re-identifying them as someone from a different context.

Figure 15:
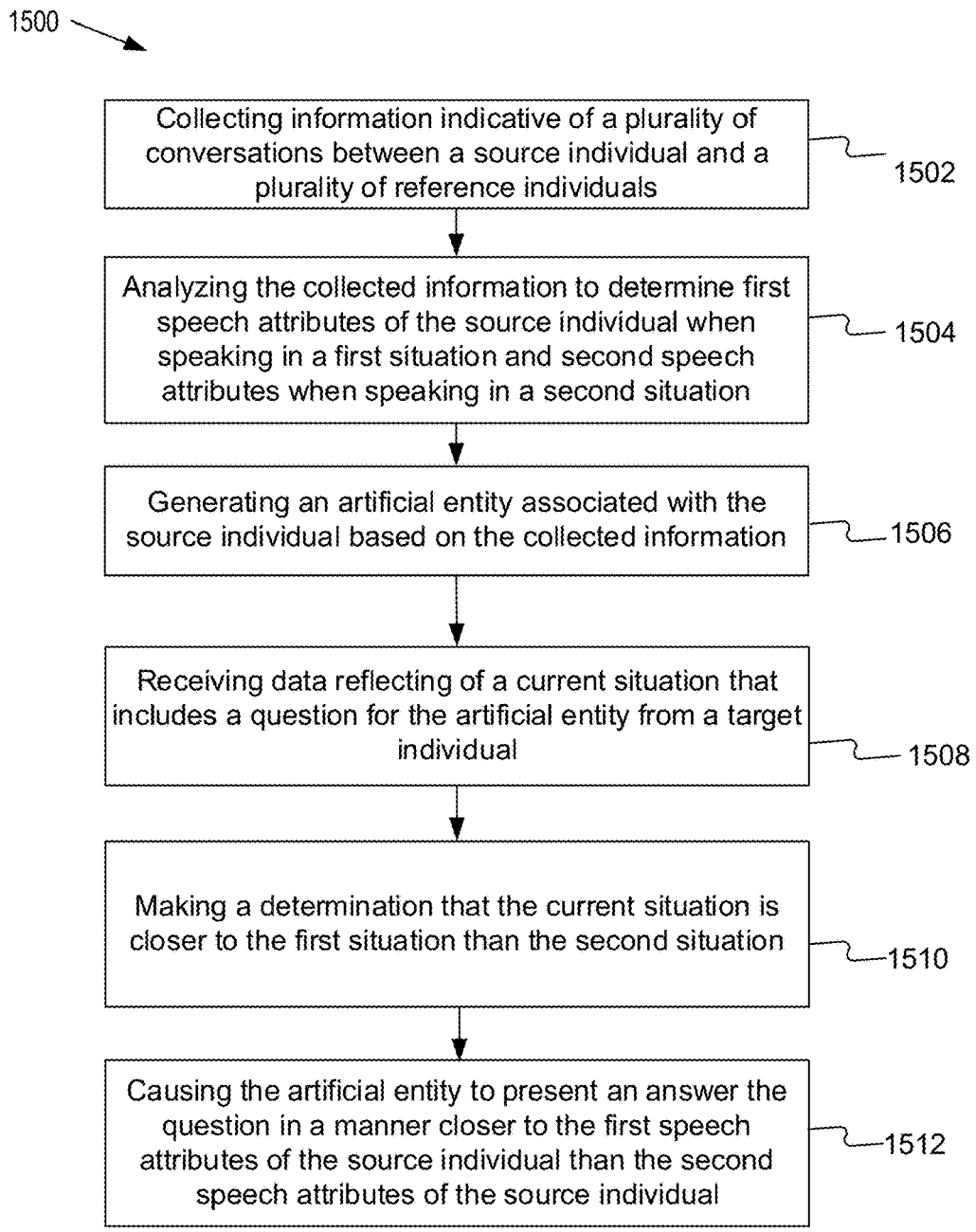

FIG. 15 illustrates a flowchart of an exemplary process 1500 for operating artificial entities, consistent with embodiments of the present disclosure. In some disclosed embodiments, process 1500 may be performed by at least one processor (e.g., processing device 210) to perform operations or functions described herein. In some disclosed embodiments, some aspects of process 1500 may be implemented as software (e.g., program codes or instructions) that are stored in a memory (e.g., memory device 220) or a non-transitory computer-readable medium. In some disclosed embodiments, some aspects of process 1500 may be implemented as hardware (e.g., a specific-purpose circuit). In some disclosed embodiments, process 1500 may be implemented as a combination of software and hardware.

Referring to FIG. 15, process 1500 includes a step 1502 of collecting information indicative of a plurality of conversations between a source individual and a plurality of reference individuals. The type of information collected is described elsewhere in this disclosure. Process 1500 further includes a step 1504 of analyzing the collected information to determine first speech attributes of the source individual when speaking in a first situation and to determine second speech attributes when speaking in a second situation. For example, the situation may be an interaction about a certain topic or interaction with a certain individual. Process 1500 further includes a step 1506 of generating an artificial entity associated with the source individual based on the collected information. The process of generating artificial entity is described elsewhere in this disclosure. Process 1500 further includes a step 1508 of receiving data reflecting of a current situation that includes a question for the artificial entity from a target individual. For example, the target individual may be one of the plurality of reference individuals or someone related to one of the plurality of reference individuals. Process 1500 further includes a step 1510 of making a determination that the current situation is closer to the first situation than the second situation. For example, as discussed above the determination may avoid direct pairwise comparisons with both situations. Process 1500 further includes a step 1512 of causing the artificial entity to present an answer to the question in a manner closer to the first speech attributes of the source individual than the second speech attributes of the source individual. For example, the answer may be provided using an artificial voice and the manner include specific voice pronunciation characteristics. Alternatively, the answer may be textual and the manner include specific writing characteristics.

In one aspect of the disclosure, methods, systems, and software are provided for creating and using a timeline of a source individual to determine answers of artificial entities. The embodiment may include collecting information related to a source individual, analyzing the collected information to identify a plurality of events involving the source individual, and determining associated behavior data reflective of a state of the source individual during the plurality of events. The embodiment also include generating a chronological record of the source individual indicative of a timeline of the plurality of events and the determined associated behavior data, generating an artificial entity associated with the source individual, and receiving a question for the artificial entity from a target individual. Based on the chronological record of the source individual, the embodiment involve determining an answer for the question.

Figure 16:
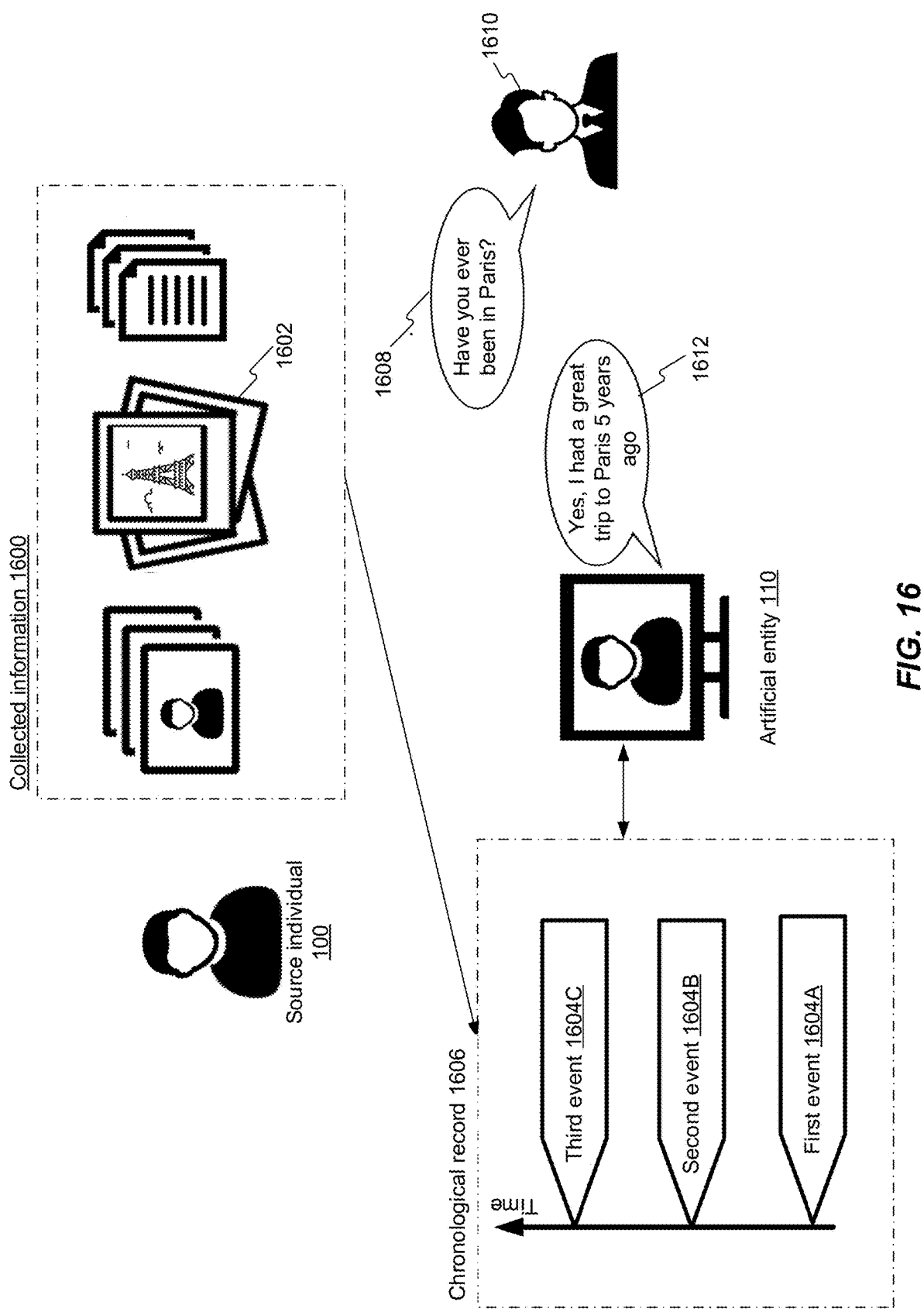

Some embodiments of the disclosure include collecting information related to a source individual. For example, as shown in FIG. 16, the system may collect information 1600 that includes a plurality of images 1602 (and other information as describe elsewhere in the disclosure). The term "collecting" refers to the act of gathering or assembling information related to the source individual. This may include obtaining images, videos, audio recordings, or any other type of data that can be used to identify and track the source individual. For example, collecting information may involve using facial recognition technology to identify the source individual in various images or videos. In addition, the term "source individual" refers to the person or entity that is the subject of the collected information. This may include a specific individual, such as a celebrity or public Figure, or a group of individuals, such as a sports team or political party. The collected information may include any data that is relevant to the source individual, such as their appearance, behavior, or activities. Moreover, the term "plurality of images" refers to multiple images of the source individual that are collected and analyzed. This may include images from various sources, such as social media, news articles, or surveillance footage. The images may be analyzed to identify patterns or trends in the behavior of the source individual.

Some embodiments of the disclosure include analyzing the collected information to identify a plurality of events involving the source individual. In the example illustrated in FIG. 16, first event 1604A, second event 1604B, and third event 1604C were identified from plurality of images 1602. The term "analyzing" refers to the act of examining or studying the collected information to identify specific events or patterns. This may involve using machine learning algorithms or other data analysis techniques to identify events that are relevant to the source individual. In addition, the term "plurality of events" refers to a series of activities or occurrences that involve the source individual. This may include events such as public appearances, social media posts, or news articles that mention the source individual. The events may be analyzed to identify patterns or trends in the behavior of the source individual. Moreover, the term "associated behavior data" refers to data that is reflective of a state of the source individual during a plurality of events. This may include data such as the source individual's emotional state, physical location, or interactions with other individuals. The behavior data may be analyzed to identify patterns or trends in the behavior of the source individual.

Some embodiments of the disclosure include generating a chronological record of the source individual indicative of a timeline of the plurality of events and the determined associated behavior data. For example, chronological record 1606 may include data on events 1604A-C. The term "generating" refers to the act of creating or producing the chronological record based on the collected and analyzed information. The chronological record may include a timeline of events and associated behavior data that is organized in a chronological order. This may include a timeline of events and associated behavior data that is organized by date and time. The chronological record may be used to track the behavior and activities of the source individual over time. Moreover, the term "associated behavior data" refers to data that is reflective of a state of the source individual during the plurality of events. This may include data such as the source individual's emotional state, physical location, or interactions with other individuals. The behavior data may be analyzed to identify patterns or trends in the behavior of the source individual.

Some embodiments of the disclosure include generating an artificial entity (e.g., artificial entity 110) associated with the source individual wherein the artificial entity has access to the chronological record of the source individual. The term "artificial entity" refers to a computer program or system that is designed to simulate human behavior or intelligence. The artificial entity may be designed to interact with humans in a natural way, such as through conversation or other forms of communication. In addition, the term "access" refers to the ability of the artificial entity to retrieve and use the chronological record of the source individual. The artificial entity may use the chronological record to answer questions or provide information to humans. Moreover, the term "source individual" refers to the person or entity that is the subject of the collected information. This may include a specific individual, such as a celebrity or public Figure, or a group of individuals, such as a sports team or political party. The collected information may include any data that is relevant to the source individual, such as their appearance, behavior, or activities.

Some embodiments of the disclosure include receiving a question (e.g., question 1608) for the artificial entity from a target individual (e.g., target individual 1610). The term "receiving" refers to the act of obtaining or accepting a question from a target individual. The question may be received through a variety of channels, such as email, text message, or social media. In addition, the term "target individual" refers to the person or entity that is asking the question of the artificial entity. The target individual may be a human or another artificial entity. Moreover, the term "question" refers to an inquiry or request for information. The question may be related to the source individual or any other topic that the artificial entity is designed to answer.

Some embodiments of the disclosure include based on the chronological record of the source individual determining an answer (e.g., answer 1612) for the question. The term "determining" refers to the act of ascertaining, establishing, or arriving at an outcome by some process. The process may involve analyzing the chronological record of the source individual or using other data sources to arrive at an answer. In addition, the term "chronological record" refers to a record that is organized in a chronological order. This may include a timeline of events and associated behavior data that is organized by date and time. The chronological record may be used to track the behavior and activities of the source individual over time. Moreover, the term "answer" refers to a response or information provided in response to a question. The answer may be generated by the artificial entity based on the information available in the chronological record or other data sources.

In some embodiments at least one of the plurality of images was captured by the source individual, and at least one other of the plurality of images depicts the source individual. The term "plurality of images" refers to multiple visual representations, such as photographs, videos, or graphics, captured or collected over time. For example, the images could be a mix of selfies taken by the source individual and photos taken by others that include the source individual.

Consistent with the present disclosure, the plurality of images of the source individual includes scanned documents. The operations include using Optical Character Recognition (OCR) to recognize text written in the scanned documents to identify at least one event involving the source individual and behavior data reflective of the source individual's state during the event. The term "OCR" refers to technology that converts different types of documents, such as scanned paper documents or PDFs, into editable and searchable data. For instance, a scanned letter containing personal notes can reveal an event like a graduation, providing context for the behavior data.

According to the disclosed embodiments, the operations further include retrieving the plurality of images of the source individual from an online website that the source individual is registered to. The term "online website" refers to any digital platform where users can upload and share content, such as social media sites. For example, images from Facebook or Instagram accounts could be retrieved to enrich the data set about the source individual.

In some cases, upon generating the artificial entity, the operations include receiving online data associated with the source individual. Analyzing this online data identifies additional events involving the source individual and behavior data reflective of their state during these events, updating the chronological record accordingly. The term "online data" refers to digital information available on the internet, including social media posts, blog entries, and other digital footprints. For example, recent tweets could provide insights into current activities and emotions of the source individual.

Consistent with the present disclosure, the operations include processing the chronological record of the source individual to identify periods with insufficient information and generating a questionnaire based on this insufficiency. The term "chronological record" refers to an ordered timeline of events and activities of the source individual. For instance, if there is a gap in data during a particular year, a questionnaire could be created to gather information about that period.

According to the disclosed embodiments, the questionnaire is aimed at the source individual and includes at least one question about a period with insufficient information. The term "questionnaire" refers to a set of written or printed questions used for collecting information. For example, it might ask the source individual to describe activities during a specific month when data is missing. In some embodiments, the questionnaire is aimed at a person who knows the source individual and includes at least one question about a period with insufficient information. The term "person who knows the source individual" refers to any individual with a personal connection or relationship with the source individual. For instance, a family member might be asked to fill in details about the source individual's early childhood.

Consistent with the present disclosure, the operations include identifying a plurality of persons who may provide information to complete the insufficient information about the source individual. The term "plurality of persons" refers to multiple individuals who have interacted with or know the source individual. For example, colleagues, friends, and relatives could be identified as potential information sources.

According to the disclosed embodiments, the operations include generating different questionnaires for the plurality of persons, based on the known relationship between the source individual and these persons. The term "relationship" refers to the connection or association between two or more people. For instance, a friend might receive a questionnaire focusing on social events, while a coworker might receive one related to professional activities.

In some cases, the artificial entity may be a digital clone of the source individual, and the target individual that interacts with the digital clone can select an age for it. The term "digital clone" refers to a virtual representation of a person created using digital data. For example, a digital clone could be adjusted to simulate the source individual at different life stages, such as childhood or adulthood, to provide age-appropriate responses.

Consistent with the present disclosure, the operations include using a Large Language Model (LLM) and the plurality of images of the source individual to generate a textual description of at least one event. The term "LLM" refers to advanced AI models capable of understanding and generating human-like text. For instance, an LLM could analyze photos from a birthday party and produce a narrative of the event.

According to the disclosed embodiments, the textual description of at least one event is written in the first-person narration. The term "first-person narration" refers to a storytelling method where the narrator speaks from their own perspective using "I" or "we". For example, the textual description could read, "I celebrated my birthday with friends and family at a local park."

In some embodiments, the answer provided to the target individual includes at least a portion of the textual description of at least one event. The term "target individual" refers to the person interacting with the artificial entity. For instance, the target individual might receive a detailed account of a significant life event, enhancing their interaction with the digital clone.

Consistent with the present disclosure, the operations include determining a profile of the source individual from records associated with past interactions and generating the textual description based on this profile. The term "profile" refers to a comprehensive summary of a person's characteristics and behavior. For example, past emails and messages could be analyzed to build a detailed profile of the source individual.

According to the disclosed embodiments, the operations include correlating the identified events with global events to determine context, and generating the textual description based on this context. The term "global events" refers to significant occurrences worldwide that can provide additional context to personal events. For instance, a personal event like a job promotion could be related to a broader economic trend.

In some cases, the determined behavior data reflects whether the source individual was active or passive in the plurality of events. The term "behavior data" refers to information about an individual's actions and reactions. For example, behavior data could show whether the source individual was a participant or an observer in a group activity.

Consistent with the present disclosure, the determined behavior data reflects whether the source individual had a positive or negative experience in the plurality of events. The term "positive experience" refers to events that elicit favorable emotions, while "negative experience" refers to those that elicit unfavorable emotions. For instance, a wedding might be marked as a positive experience, while a job loss might be negative.

According to the disclosed embodiments, the operations include determining behavior patterns of the source individual based on behavior data and determining prompts for the artificial entity indicative of these patterns. The term "behavior patterns" refers to recurring actions or reactions of an individual. For example, regular attendance at social gatherings might indicate an extroverted behavior pattern.

In some embodiments, the operations include analyzing the plurality of images of the source individual to determine the level of intimacy with at least one additional individual, and determining the answer based on this level of intimacy. The term "level of intimacy" refers to the closeness or familiarity between two individuals. For example, images showing frequent and close interactions might indicate a high level of intimacy, influencing the nature of responses from the artificial entity.

Figure 17:
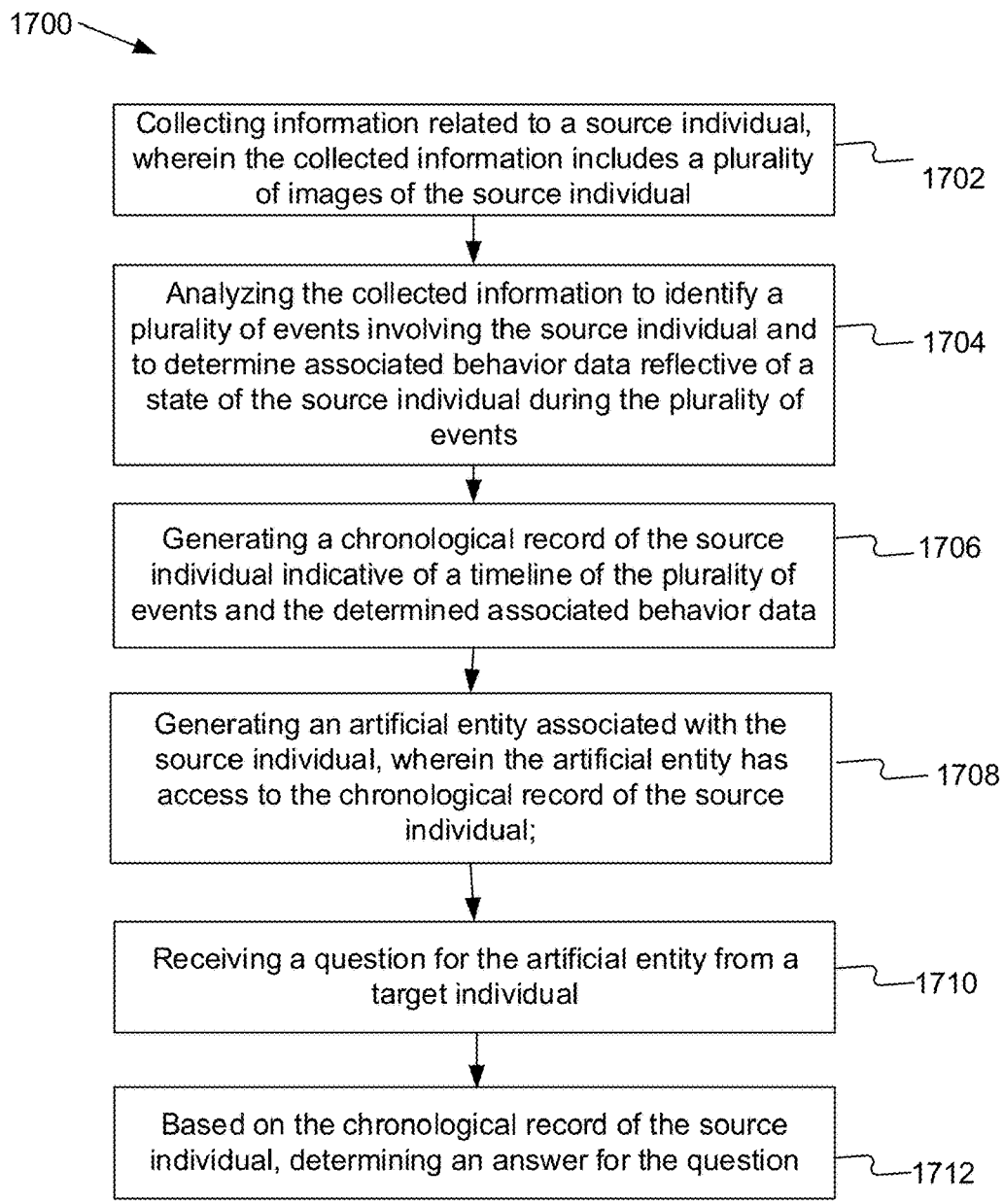

FIG. 17 illustrates a flowchart of an exemplary process 1700 for operating artificial entities, consistent with embodiments of the present disclosure. In some disclosed embodiments, process 1700 may be performed by at least one processor (e.g., processing device 210) to perform operations or functions described herein. In some disclosed embodiments, some aspects of process 1700 may be implemented as software (e.g., program codes or instructions) that are stored in a memory (e.g., memory device 220) or a non-transitory computer-readable medium. In some disclosed embodiments, some aspects of process 1700 may be implemented as hardware (e.g., a specific-purpose circuit). In some disclosed embodiments, process 1700 may be implemented as a combination of software and hardware.

Referring to FIG. 17, process 1700 includes a step 1702 of collecting information related to a source individual, wherein the collected information includes a plurality of images of the source individual. The type of information collected is described elsewhere in this disclosure. Process 1700 further includes a step 1704 of analyzing the collected information to identify a plurality of events involving the source individual and to determine associated behavior data reflective of a state of the source individual during the plurality of events. For example, the determined behavior data reflects whether the source individual was active or passive in the plurality of events or whether the source individual had a positive experience or a negative experience in the plurality of events. Process 1700 further includes a step 1706 of generating a chronological record of the source individual indicative of a timeline of the plurality of events and the determined associated behavior data. The generation of the chronological record may be based on data from the plurality of images and/or from other information about the source individual (e.g., input data 102 as illustrated in FIG. 3A). Process 1700 further includes a step 1708 of generating an artificial entity associated with the source individual, wherein the artificial entity has access to the chronological record of the source individual. The process of generating artificial entity is described elsewhere in this disclosure. Process 1700 further includes a step 1710 of receiving a question for the artificial entity from a target individual, and a step 1712 of determining an answer for the question based on the chronological record of the source individual. For example, the answer include a description of an event that the source individual was involved in.

In one aspect of the disclosure, methods, systems, and software are provided for operating artificial entities. The operations include receiving information associated with a source individual, analyzing the received information to determine a record of the source individual, generating an artificial entity associated with the source individual, and receiving data reflecting a first question for the artificial entity from a first individual. The system accesses the record to determine a first answer to the first question based on past interactions the source individual has had with the first individual and causes the artificial entity to output the first answer to the first individual. The system then receives data reflecting a second question for the artificial entity from a second individual, accesses the record to determine a second answer to the second question based on past interactions the source individual has had with the second individual, and causes the artificial entity to output the second answer to the second individual.

The system further includes determining a context for determining the first answer and determining a different context for determining the second answer. The context can include shared hobbies, experiences, objects, traits, entities, and emotional states. The system can also determine if past interactions were private or non-private and account for the sensitivity of the first individual to a specific topic. Additionally, the system can account for the presence of the second individual in the conversation when determining the first answer and prevent the artificial entity from answering an additional question directed to the second individual.

Figure 18:
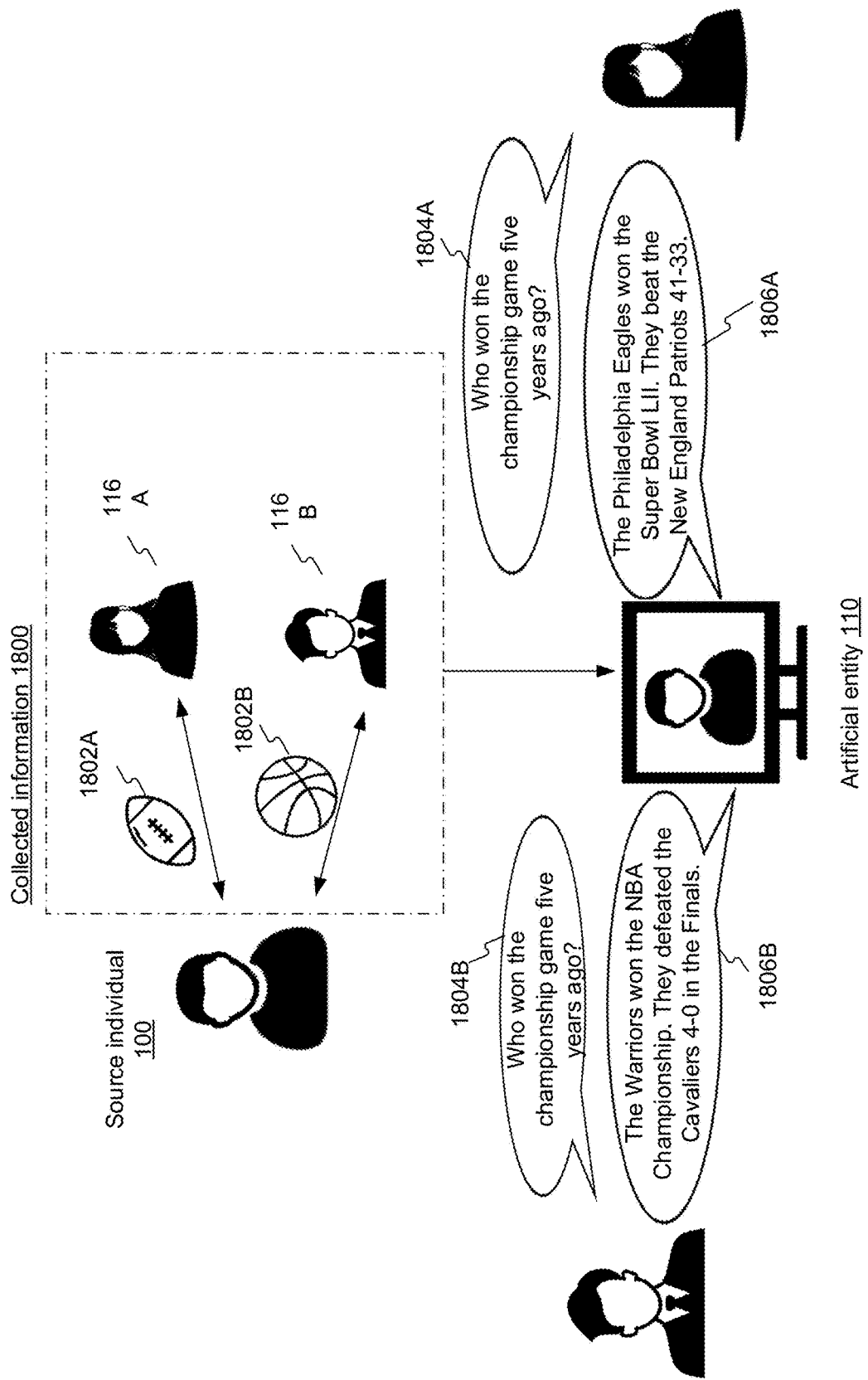

Some embodiments of the disclosure include receiving information associated with a source individual. For example, as shown in FIG. 18, the system may receive or collect information 1800. The term "receiving" refers to obtaining or acquiring data or information from a source. In this context, the information may include any data related to the source individual, such as their name, age, occupation, and any other relevant information. For example, the information may be obtained through a survey, questionnaire, or any other suitable means. In addition, the term "source individual" refers to the person or entity whose interactions are being analyzed to generate an artificial entity. The source individual may be a real person or an entity, such as a company or organization. The broad definition of this term encompasses any individual or entity that has interactions with a plurality of individuals.

Some embodiments of the disclosure include analyzing the received information to determine a record of the source individual, wherein the record reflects the interactions the source individual has had with a plurality of individuals. For example, as shown in FIG. 18, source individual 100 may have interactions 1802A about football with first individual 116A and interactions 1802B about basketball with second individual 116B. The term "analyzing" refers to examining or studying the received information to identify patterns or trends. In this context, the analysis may involve identifying the source individual's interactions with a plurality of individuals and creating a record of those interactions. In addition, the term "plurality of individuals" refers to a group of two or more individuals with whom the source individual has had interactions. The broad definition of this term encompasses any group of individuals, regardless of their relationship to the source individual. The term "record" refers to a collection of data that reflects the interactions the source individual has had with a plurality of individuals. The record may include any data related to the interactions, such as the date, time, location, and nature of the interaction. For example, the record may include data from social media interactions, email exchanges, or any other suitable means.

Some embodiments of the disclosure include generating an artificial entity associated with the source individual. For example, as shown in FIG. 18, artificial entity 110 may be generated. The term "generating" refers to creating or producing something new. The term "artificial entity" refers to a computer-generated entity that is designed to mimic the behavior of a real individual. The artificial entity may be programmed to respond to questions and interact with other individuals in a manner that is consistent with the source individual's past interactions. In this context, the artificial entity is created based on the record of the source individual's past interactions.

Some embodiments of the disclosure include receiving data reflecting a first question for the artificial entity from a first individual. For example, as shown in FIG. 18, first individual 116A may ask first question 1804A. The term "first question" refers to a question posed by a first individual to the artificial entity. The broad definition of this term encompasses any question that may be asked of the artificial entity. Moreover, the term "accessing the record" refers to retrieving data from the record of the source individual's past interactions. The data may be used to determine an answer to the question posed by the first individual.

Some embodiments of the disclosure include causing the artificial entity to output the first answer to the first individual. For example, as shown in FIG. 18, artificial entity 110 may provide first answer 1806A. The term "output" refers to providing a response or answer to a question or request. In this context, the artificial entity is programmed to provide an answer to the first individual's question based on the data retrieved from the record.

Some embodiments of the disclosure include receiving data reflecting a second question for the artificial entity from a second individual. For example, as shown in FIG. 18, second individual 116B may ask second question 1804B. In addition, the term "second question" refers to a question posed by a second individual to the artificial entity. The broad definition of this term encompasses any question that may be asked of the artificial entity. For example, as shown in FIG. 18, artificial entity 110 may provide second answer 1806B. According to some embodiments, the second question may differ from the first answer provided to the first individual. For example, even when the first and the second questions are the same. The broad definition of this term encompasses any answer that is different from the first answer, regardless of the nature of the difference. Furthermore, the term "causing the artificial entity to output the second answer to the second individual" refers to providing a response or answer to the second individual's question based on the data retrieved from the record. The artificial entity is programmed to provide an answer to the second individual's question that differs from the first answer provided to the first individual. As shown in FIG. 18, first answer 1806A is based on interactions 1802A about football that source individual 100 had with first individual 116A, and second answer 1806B is based on interactions 1802B about basketball that source individual 100 had with second individual 116B.

In some embodiments, the system determines that the source individual has had more than one past interaction with the first individual but none with the second individual. The term "determining" refers to ascertaining, establishing, or arriving at an outcome by some process. For instance, this may involve analyzing communication logs, such as emails or chat histories, to identify interaction patterns.

Consistent with the present disclosure, the system determines a first context for the first answer based on past interactions between the source individual and the first individual, and a second context for the second answer based on interactions between the source individual and the second individual. The term "context" refers to the circumstances or setting surrounding an event. For example, context can include the time, place, and nature of the interactions.

According to the disclosed embodiments, the first context may include a series of events shared by the source and first individuals, while the second context includes events shared by the source and second individuals. The term "events" refers to occurrences or happenings. Examples include attending meetings, working on projects together, or participating in social gatherings.

In some cases, the first context includes a hobby shared by the source and first individuals, and the second context includes a different hobby shared by the source and second individuals. The term "hobby" refers to an activity done regularly in one's leisure time for pleasure. Examples might be playing chess, gardening, or hiking.

Consistent with the present disclosure, the first context may also include a unique experience shared between the source and the first individual, with the second context involving a different shared experience with the second individual. The term "experience" refers to practical contact with and observation of facts or events. Examples include traveling together, surviving a natural disaster, or participating in a sports event.

According to the disclosed embodiments, the first context could involve an object both the source and the first individual interacted with, while the second context involves a different object. The term "object" refers to a material thing that can be seen and touched. Examples include a book they both read, a dish they both enjoyed, or a pet they both cared for.

In some cases, the first context includes a shared trait between the source and first individual, while the second context includes a different trait shared with the second individual. The term "trait" refers to a distinguishing characteristic or quality. Examples include personality traits like extraversion or introversion, or specific preferences like a high need for cognition.

Consistent with the present disclosure, the first context might include a shared interest in an entity such as a celebrity, sports team, or TV series, with the second context involving a different entity. The term "entity" refers to something that exists independently. For instance, the source and first individual might both follow a particular TV show, while the source and second individual follow a different show.

According to the disclosed embodiments, the system identifies whether past interactions between the source and the first individual were private or non-private, and incorporates only non-private interactions in the answer provided to the first individual. The term "private interactions" refers to communications intended to be confidential. Examples include personal emails or direct messages. In some cases, the system determines that the first individual is sensitive to a specific topic based on past interactions and adjusts the answer accordingly. The term "sensitivity" refers to the quality of being easily affected by external influences. Examples include avoiding topics that may cause distress or discomfort.

Consistent with the present disclosure, the system determines a first context from data reflecting the first question and a second context from data reflecting the second question. The term "data" refers to facts and statistics collected for reference or analysis. This can include text from the questions themselves or metadata associated with the questions.

According to the disclosed embodiments, the first context may include the estimated emotional state of the first individual when asking the question, and the second context includes the emotional state of the second individual. The term "emotional state" refers to a person's current feelings. Examples include being happy, sad, anxious, or calm. In some cases, the first context includes the estimated knowledge level of the first individual on the topic of the question, and the second context includes the knowledge level of the second individual. The term "knowledge level" refers to the extent of someone's understanding or awareness of a topic. This could be inferred from their educational background or previous interactions on the topic.

Consistent with the present disclosure, the first context could involve the age of the first individual, while the second context involves the age of the second individual. The term "age" refers to the length of time that a person has lived. This is important for tailoring answers to be age-appropriate.

According to the disclosed embodiments, the first context may include the type of relationship between the source and the first individual, and the second context includes the type of relationship with the second individual. The term "relationship" refers to the way in which two or more people are connected. Examples include familial, professional, or friendship relationships.

In some cases, the system determines that past interactions with the first individual were private, while interactions with the second individual were non-private, and includes details of non-private interactions in the answer provided to the first individual. The term "non-private interactions" refers to communications that are not intended to be confidential. Examples include public social media posts or forum discussions.

Consistent with the present disclosure, when the artificial entity engages in a conversation with both the first and second individuals, it accounts for the presence of the second individual when determining the answer for the first individual. The term "artificial entity" refers to a computer system designed to simulate human interaction. Examples include chatbots and virtual assistants.

According to the disclosed embodiments, when the artificial entity engages in a conversation with both the first and second individuals and receives an additional question from the first individual directed at the second individual, it prevents itself from answering. The term "additional question" refers to a follow-up inquiry made during a conversation. This can be identified using natural language processing techniques to analyze the conversation context and participant interactions. For example, the system can determine if the additional question is directed to the artificial entity or to the second individual by leveraging natural language processing (NLP) and context analysis. Firstly, it can analyze the linguistic patterns and structure of the conversation. For example, if the question follows a direct address or includes the name or identifier of a participant, the system can infer that the question is intended for that individual. Additionally, the system can use pronoun resolution to understand references made earlier in the conversation. By tracking who said what and in what context, the system can identify when a question is following up on a statement made by a specific person, thereby directing the question to them.

Additionally the system may use machine learning algorithms trained on large datasets of conversations. These algorithms can recognize patterns and cues that typically indicate a change in the addressee. Features such as turn-taking dynamics and the use of specific phrases can be analyzed to make accurate predictions. Moreover, the system can incorporate user profiles and interaction histories to improve its understanding. For instance, if one participant often asks another for advice or clarification, the system can learn this pattern and use it to predict future interactions, thereby correctly identifying the intended recipient of a question in real-time. Integrating these methods allows the system to manage the complexity and fluidity of group chat conversations effectively.

Figure 19:
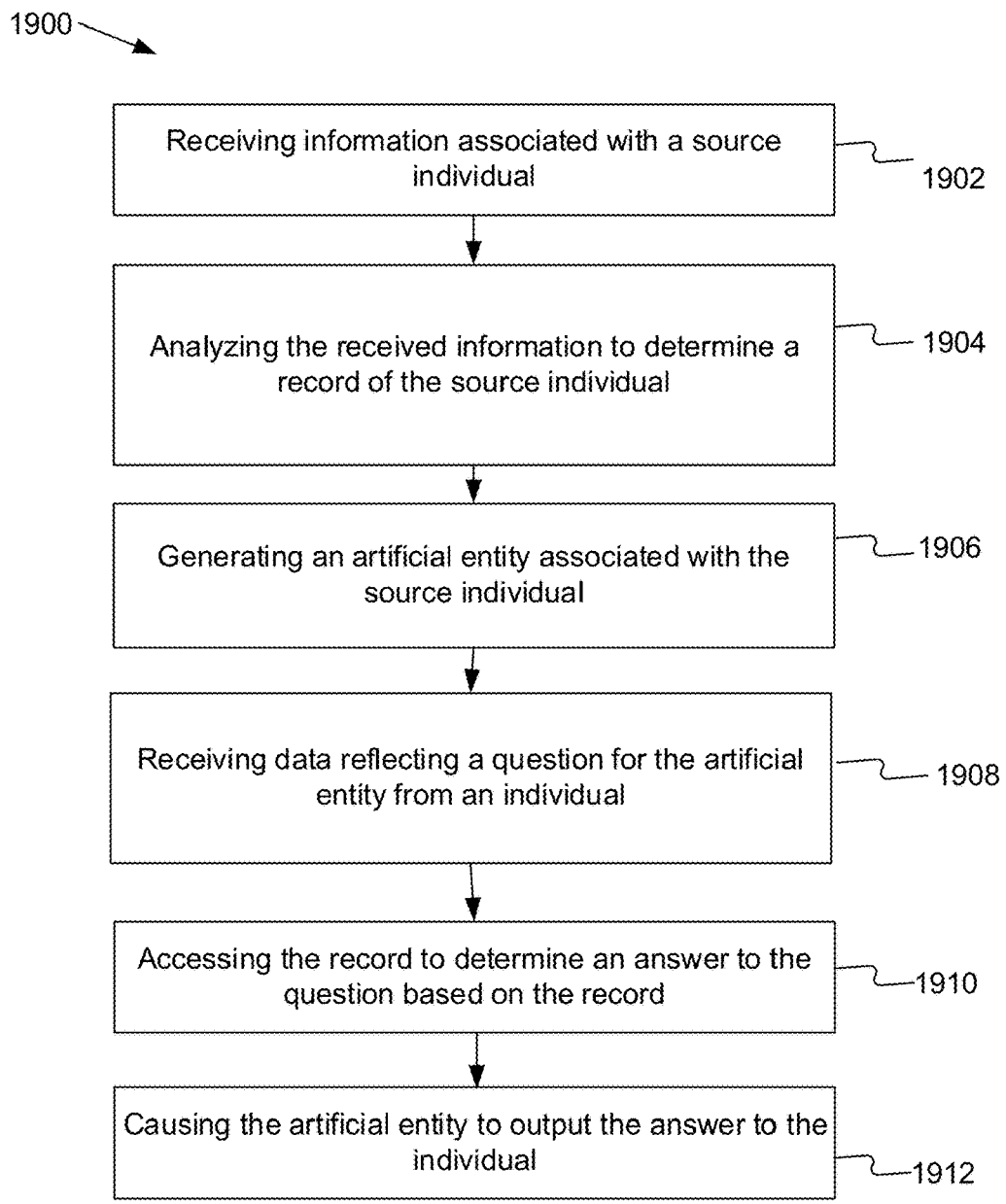

FIG. 19 illustrates a flowchart of an exemplary process 1900 for operating artificial entities, consistent with embodiments of the present disclosure. In some disclosed embodiments, process 1900 may be performed by at least one processor (e.g., processing device 210) to perform operations or functions described herein. In some disclosed embodiments, some aspects of process 1900 may be implemented as software (e.g., program codes or instructions) that are stored in a memory (e.g., memory device 220) or a non-transitory computer-readable medium. In some disclosed embodiments, some aspects of process 1900 may be implemented as hardware (e.g., a specific-purpose circuit). In some disclosed embodiments, process 1900 may be implemented as a combination of software and hardware.

Referring to FIG. 19, process 1900 includes a step 1902 of receiving information associated with a source individual. The type of information received is described elsewhere in this disclosure. Process 1900 further includes a step 1904 of analyzing the received information to determine a record of the source individual. For example, the record reflects the interactions the source individual has had with a plurality of individuals. Process 1900 further includes a step 1906 of generating an artificial entity associated with the source individual. The process of generating artificial entity is described elsewhere in this disclosure. Process 1900 further includes a step 1908 of receiving data reflecting a question for the artificial entity from an individual. In some cases, the process may include receiving data reflecting a first question for the artificial entity from a first individual and receiving data reflecting a second question for the artificial entity from a second individual. Process 1900 further includes a step 1910 of accessing the record to determine an answer to the question based on the record. Specifically, the record may be accessed to determine a first answer to the first question based on past interactions the source individual has had with the first individual, and to determine a second answer to the second question based on past interactions the source individual has had with the second individual, the second answer differs from the first answer. Process 1900 further includes a step 1912 of causing the artificial entity to output the answer to the individual. For example, causing the artificial entity to output the first answer to the first individual and the second answer to the second individual.

In one aspect of the disclosure, methods, systems, and software are provided for operating artificial entities that can keep secrets and private details of a source individual. The operations include receiving information associated with the source individual, analyzing the received information to determine a record of the source individual wherein the record includes private details on the source individual, generating an artificial entity associated with the source individual, receiving data reflecting a question for the artificial entity from a target individual wherein a response to the question would reveal at least one private detail on the source individual, accessing a data structure storing a privacy policy associated with the source individual, and based on the privacy policy making a determination whether the target individual can be exposed to the at least one private detail. When the determination indicates that the target individual can be exposed to the at least one private detail, the artificial entity generates a first answer to the question that reveals the at least one private detail. When the determination indicates that the target individual cannot be exposed to the at least one private detail, the artificial entity generates a second answer to the question that avoids from revealing the at least one private detail and causes the artificial entity to output at least one of the first answer or the second answer to the target individual.

These embodiments further include processing the record of the source individual to classify portions of the received information as the private details on the source individual, assigning a privacy level to each of the private details, and determining a reference privacy level for the target individual based on the privacy policy wherein the target individual can be exposed to private details associated with assigned privacy levels lesser than the reference privacy level of the target individual. The privacy policy can be determined based on previous input from the source individual about specific topics or specific individuals, and artificial intelligence can be used to determine the privacy policy associated with the source individual based on past interactions the source individual had with differing individuals. The determination whether the target individual can be exposed to the at least one private detail is based on past interactions that the target individual has had with the artificial entity or the source individual. When the determination indicates that the target individual cannot be exposed to the at least one private detail, the second answer indicates that the artificial entity cannot reveal the at least one private detail, and when the determination indicates that the target individual can be exposed to the at least one private detail, the operations further include storing in memory an indication that the target individual was exposed to the at least one private detail.

Some embodiments of the disclosure include "receiving information associated with a source individual." The term "receiving" refers to obtaining or acquiring information from a source. This may include retrieving data from a database, receiving data from an external source, or collecting data via sensors or user input interfaces. For example, information may be received through a network connection from an online form submitted by a user or collected from various IoT devices monitoring environmental conditions. In addition, the term "information associated with a source individual" refers to any data that is related to the source individual. This may encompass a wide range of personal and demographic details, such as name, address, date of birth, employment history, educational background, and other pertinent records. For example, it might include social media activity, online search history, or transaction records that provide insight into the individual's preferences and behavior. Moreover, the term "source individual" refers to the person from whom the information is derived. This individual can be a user of a system, a client, or any person whose data is being processed. For example, a source individual could be a customer providing feedback via a survey, an employee whose work performance data is being analyzed, or a patient whose medical history is being reviewed.

Figure 20:
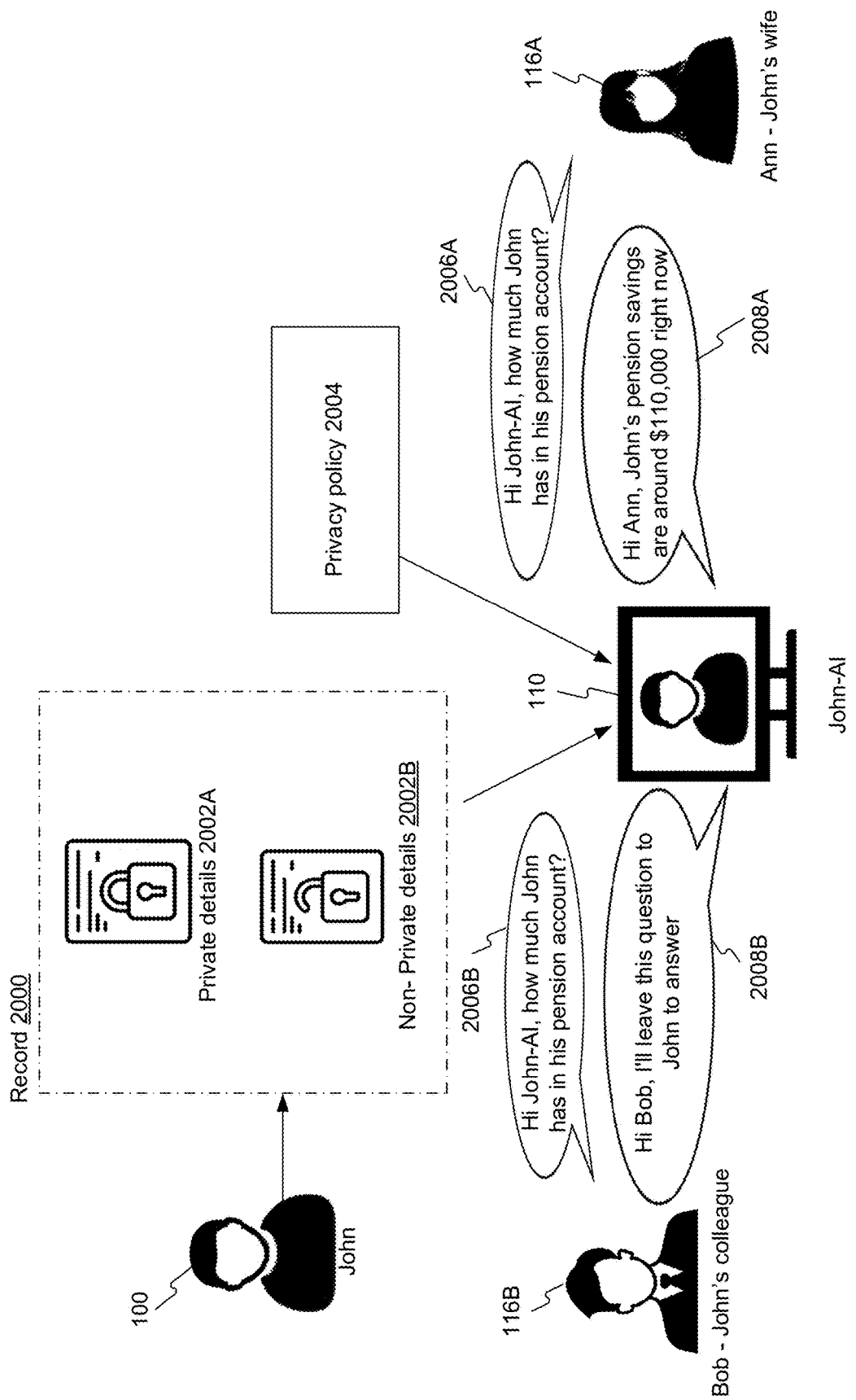

Some embodiments of the disclosure include "analyzing the received information to determine a record of the source individual, wherein the record includes private details on the source individual." For example, as shown in FIG. 20, the system may determine a record 2000 of source individual 100 named "John." As shown, record 2000 may include private details 2002A and non-private details 2002B. The term "analyzing" refers to examining, processing, or evaluating data to extract meaningful insights or conclusions. This may involve statistical analysis, data mining, or the application of machine learning algorithms. For example, analyzing could include parsing text data to identify relevant keywords or applying clustering techniques to group similar data points. In addition, the term "record" refers to a comprehensive compilation or summary of data associated with the source individual. This record may consist of structured data like database entries or unstructured data such as textual documents. For example, a record could include a detailed profile of an individual, aggregating various aspects like contact information, past transactions, and user preferences. Moreover, the term "private details" refers to sensitive or confidential information that pertains to the source individual. This can include personal identifiers such as social security numbers, financial information like bank account details, medical records, and other sensitive data. For example, private details might encompass an individual's health diagnosis, credit card transactions, or confidential employment evaluations.

Some embodiments of the disclosure include "generating an artificial entity associated with the source individual." The term "generating" refers to creating, producing, or constructing something, often through computational methods or algorithms. This may involve writing software code, setting up configurations, or executing commands that result in the creation of a new entity. For example, generating could entail programming a virtual assistant that simulates human conversation or developing a chatbot with pre-defined responses. In addition, the term "artificial entity" refers to a digital or virtual representation designed to mimic certain aspects of human behavior or interaction. This entity can take various forms, such as virtual assistants, chatbots, or automated agents. For example, an artificial entity could be a virtual customer service agent that handles inquiries on a website or a virtual tutor providing educational assistance to students. Moreover, the term "associated with the source individual" refers to the linkage or connection of the artificial entity to the data or profile of a specific person. This association ensures that the artificial entity operates based on the personalized data of the source individual. In one example, an artificial entity could be tailored to reflect the preferences and history of a customer, providing customized recommendations and responses. In another example, the artificial entity could be tailored to a virtual lover of source individual 100.

Some embodiments of the disclosure include "receiving data reflecting a question for the artificial entity from a target individual, wherein a response to the question would reveal at least one private detail on the source individual." In FIG. 20, reference individual 116A (Ann's—John's wife), ask question 2006A to receive details on Johns pension account; and reference individual 116B (Bob—John's colleague) asks question 2006B to receive details on Johns pension account. The term "receiving" refers to obtaining or acquiring information from a source. This may include inputs from user interfaces, data transmitted over networks, or information received through sensors. For example, receiving could involve capturing user queries submitted through a chat interface or collecting voice commands via a smart speaker. In addition, the term "data" refers to any information, whether structured or unstructured, that can be processed or analyzed. This may include text, numbers, images, or other forms of digital content. For example, data could consist of a text message asking about an individual's recent transactions or an audio recording of a question posed to a virtual assistant. Moreover, the term "target individual" refers to the person who is interacting with the artificial entity and posing the question. This individual seeks information or responses from the system based on the data associated with the source individual. For example, the target individual could be a customer service representative inquiring about a client's order status or a user asking about another person's public profile information.

Some embodiments of the disclosure include "accessing a data structure storing a privacy policy associated with the source individual." The term "accessing" refers to retrieving, obtaining, or entering data from a storage location. This can involve connecting to databases, opening files, or querying information systems. For example, accessing might include running a SQL query to retrieve records from a relational database or opening a document stored in a cloud-based service. In addition, the term "data structure" refers to an organized format for storing and managing data. This can include arrays, linked lists, trees, or databases that facilitate efficient data retrieval and manipulation. For example, a data structure could be a relational database table holding user preferences or a JSON file containing configuration settings for an application. Moreover, the term "privacy policy" refers to a set of rules or guidelines that dictate how personal or sensitive information should be handled and protected. This may include restrictions on data access, sharing protocols, and security measures to safeguard privacy. For example, a privacy policy might specify that only authorized personnel can view certain records or that data must be encrypted during transmission. Examples of how the privacy policy is determined are discussed below.

Some embodiments of the disclosure include "based on the privacy policy, making a determination whether the target individual can be exposed to the at least one private detail." The term "making a determination" refers to deciding, concluding, or arriving at a judgment based on available information. This may involve applying criteria, evaluating conditions, or using algorithms to reach a decision. For example, making a determination could include using a set of rules to assess whether data access requests comply with privacy policies or running an AI model to predict authorization levels. In addition, the term "target individual" refers to the person who is interacting with the artificial entity and posing the question. This individual seeks information or responses from the system based on the data associated with the source individual. For example, the target individual could be a customer service representative inquiring about a client's order status or a user asking about another person's public profile information. Moreover, the term "private detail" refers to any information that is sensitive or confidential and pertains to the source individual. This can include personal identifiers such as social security numbers, financial information like bank account details, medical records, and other sensitive data. For example, private details might encompass an individual's health diagnosis, credit card transactions, or confidential employment evaluations.

Figure 21:
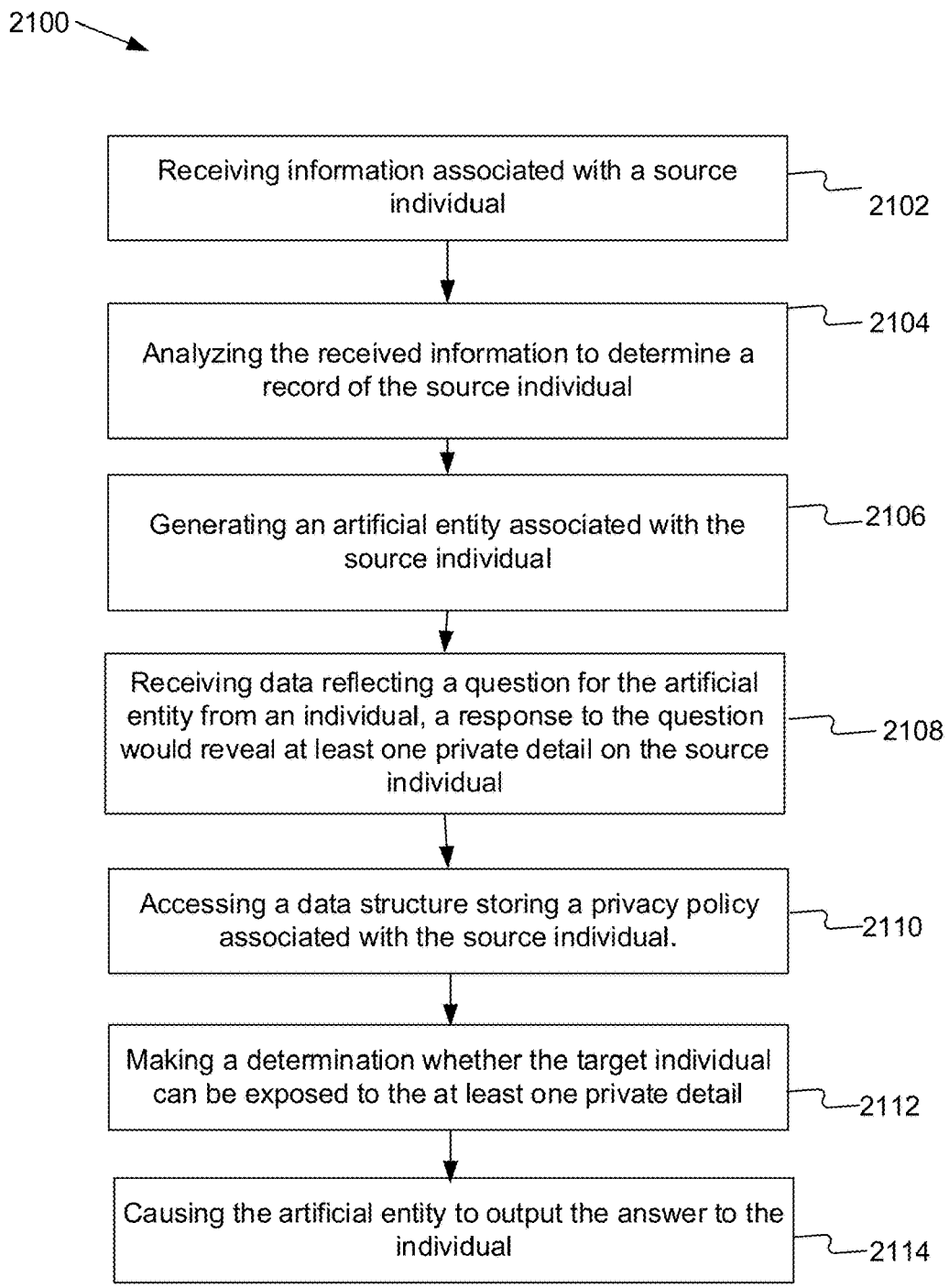

Some embodiments of the disclosure include "when the determination indicates that the target individual can be exposed to the at least one private detail, generating a first answer to the question that reveals the at least one private detail." In the example illustrated in FIG. 21, John-AI (i.e., artificial entity 110 associated with source individual 100) generates a first answer 2008A that reveals how much John has in his pension account. The term "generating" refers to creating, producing, or constructing something, often through computational methods or algorithms. This may involve writing software code, setting up configurations, or executing commands that result in the creation of a new entity. For example, generating could entail programming a virtual assistant that simulates human conversation or developing a chatbot with pre-defined responses. In addition, the term "first answer" refers to the initial response provided to the target individual that includes sensitive or confidential information. This response is based on the determination that the target individual is authorized to access the private details of the source individual. For example, the first answer might reveal specific medical records, financial transactions, or other sensitive data. Moreover, the term "reveals" refers to the act of making known, disclosing, or unveiling information that was previously hidden or confidential. This can include presenting details explicitly in text, showing data visually, or providing access to restricted information. For example, revealing might involve displaying a patient's medical diagnosis to an authorized healthcare provider or showing a client's financial history to a bank officer.

Some embodiments of the disclosure include "when the determination indicates that the target individual cannot be exposed to the at least one private detail, generating a second answer to the question that avoids from revealing the at least one private detail." In the example illustrated in FIG. 21, John-AI generates second answer 2008B that does not reveal how much John has in his pension account. The term "second answer" refers to the alternative response provided to the target individual that excludes any sensitive or confidential information. This response ensures that private details of the source individual are not disclosed, adhering to privacy policies and security protocols. For example, the second answer might provide general information or non-specific responses that do not reveal any sensitive data. Moreover, the term "avoids from revealing" refers to the intentional omission or exclusion of private details in the response. This approach ensures that sensitive information remains confidential and is not exposed to unauthorized individuals. For example, avoiding revealing might involve providing a summary of public activities without disclosing personal identifiers or specific transactions.

Some embodiments of the disclosure include "causing the artificial entity to output at least one of the first answer or the second answer to the target individual." The term "causing" refers to initiating, triggering, or prompting an action or event. This may involve executing commands, sending signals, or invoking processes that result in a specific outcome. For example, causing could include activating a notification system to deliver a message or calling a function that generates a response. In addition, the term "output" refers to displaying, presenting, or transmitting information to a user or system. This may include text, images, audio, or other forms of media that convey information. For example, output might involve displaying a response on a screen, playing a voice message, or sending an email.

Some embodiments of the disclosure include processing the record of the source individual to classify portions of the received information as the private details of the source individual. The system analyzes the collected data to identify information segments that pertain to the source individual's personal life. These "private details" encompass a wide range of sensitive information, such as financial data, health records, personal relationships, or political affiliations. The term "classify" refers to categorizing or grouping information based on predefined criteria.

Some embodiments of the disclosure include assigning a privacy level to each of the private details. The system evaluates each identified private detail and assigns a corresponding privacy level. This level indicates the degree of sensitivity associated with the information, with higher levels representing more sensitive data. For example, a social security number might have a higher privacy level than a publicly available email address.

Some embodiments of the disclosure include determining a reference privacy level for the target individual based on the privacy policy, wherein the target individual can be exposed to private details associated with assigned privacy levels lesser than the reference privacy level of the target individual. The system establishes a baseline privacy threshold for the target individual based on the defined privacy policy. Only private details with privacy levels below this threshold are considered for potential disclosure to the target individual. For instance, if the target individual's reference privacy level is "medium," only private details with "low" or "medium" privacy levels would be eligible for sharing.

Some embodiments of the disclosure include determining the privacy policy based on previous input from the source individual about specific topics. The system leverages the source individual's past preferences and expressed concerns regarding particular topics to create a customized privacy policy. For example, if the source individual has previously indicated a strong desire for privacy regarding their financial information, the system would assign higher privacy levels to financial details.

Some embodiments of the disclosure include determining the privacy policy based on previous input from the source individual with regards to specific individuals. The system considers the source individual's past interactions and preferences when dealing with specific individuals to tailor the privacy policy accordingly. For instance, the source individual might have expressed comfort sharing certain information with close friends but preferred stricter privacy with colleagues.

Some embodiments of the disclosure include setting a reference privacy level for an individual that differs from a default reference privacy level. The system allows the source individual to override the default privacy settings for specific individuals, enabling granular control over information sharing on a per-person basis. For example, the source individual might set a higher reference privacy level for a coworker than for a close friend.

Some embodiments of the disclosure include using artificial intelligence to determine the privacy policy associated with the source individual based on past interactions the source individual had with differing individuals. The system employs AI algorithms to analyze the source individual's past interactions with various individuals and infer their privacy preferences. By examining communication patterns, shared information, and other relevant data, the AI constructs a personalized privacy policy.

Some embodiments of the disclosure include performing semantic analysis on the past interactions the source individual had with the differing individuals to determine the privacy policy. The AI utilizes natural language processing techniques to extract meaning from the source individual's past interactions. By understanding the context and nuances of the conversations, the AI can make more accurate inferences about the source individual's privacy preferences.

Some embodiments of the disclosure include basing the determination of whether the target individual can be exposed to the at least one private detail on past interactions that the target individual has had with the artificial entity. The system considers the target individual's previous interactions with the artificial entity to assess their potential knowledge or interest in the private detail. For example, if the target individual has previously inquired about the source individual's financial situation, it suggests potential awareness of related private details.

Some embodiments of the disclosure include analyzing the past interactions of the target individual with the artificial entity to determine that the target individual knows about the at least one private detail. The system examines the target individual's interaction history with the artificial entity to identify any indications of awareness regarding the specific private detail. This analysis helps determine if the target individual is a suitable recipient for the information.

Some embodiments of the disclosure include basing the determination of whether the target individual can be exposed to the at least one private detail on past interactions the source individual has had with the target individual. The system evaluates the interaction history between the source and target individuals to assess shared knowledge or previous discussions related to the private detail. This information helps determine the appropriateness of sharing private details with the target individual.

Some embodiments of the disclosure include analyzing the received information indicative of the past interactions to determine that the target individual knows about the at least one private detail. The system examines communication records between the source and target individuals to detect any references or implications related to the private detail. This analysis helps assess the target individual's potential awareness of the information.

Some embodiments of the disclosure include private details that include romantic details of the source individual. The term "romantic details" encompasses a broad range of sensitive information pertaining to the source individual's personal relationships, including dating history, relationship status, and intimate preferences.

Some embodiments of the disclosure include private details that include financial details of the source individual. The term "financial details" refers to sensitive information about the source individual's income, assets, liabilities, investments, and spending habits.

Some embodiments of the disclosure include private details that include an action that the source individual did. The term "action" denotes any activity or behavior performed by the source individual, regardless of its legality or social acceptability. Examples include hobbies, travel history, or personal habits.

Some embodiments of the disclosure include indicating that the artificial entity cannot reveal the at least one private detail when the determination indicates that the target individual cannot be exposed to the at least one private detail. For example, if the system determines that the target individual should not be exposed to a specific private detail, the artificial entity explicitly declines to share that information.

Some embodiments of the disclosure include asking permission from the source individual to share when the determination indicates that the target individual cannot be exposed to the at least one private detail. For example, if the system determines that the target individual should not be exposed to a private detail, the artificial entity seeks explicit permission from the source individual before sharing the information.

Some embodiments of the disclosure include storing in memory an indication that the target individual was exposed to the at least one private detail when the determination indicates that the target individual can be exposed to the at least one private detail. The system records instances where a private detail is shared with a target individual. This information can be used for tracking purposes and potentially identifying individuals who have been exposed to specific private details.

Some embodiments of the disclosure include receiving additional data reflecting a request from the source individual to identify which individuals were exposed to the at least one private detail, and causing the artificial entity to output identifying the target individual. The system allows the source individual to request a report detailing which individuals have been exposed to a specific private detail. The artificial entity generates a list of individuals who have previously received the specified private information.

FIG. 21 illustrates a flowchart of an exemplary process 2100 for operating artificial entities, consistent with embodiments of the present disclosure. In some disclosed embodiments, process 2100 may be performed by at least one processor (e.g., processing device 210) to perform operations or functions described herein. In some disclosed embodiments, some aspects of process 2100 may be implemented as software (e.g., program codes or instructions) that are stored in a memory (e.g., memory device 220) or a non-transitory computer-readable medium. In some disclosed embodiments, some aspects of process 2100 may be implemented as hardware (e.g., a specific-purpose circuit). In some disclosed embodiments, process 2100 may be implemented as a combination of software and hardware.

Referring to FIG. 21, the flow chart of process 2100 begins with step 2102 of receiving information associated with a source individual. The type of information received described elsewhere in the disclosure. In step 2104, the received information is analyzed to determine a record of the source individual. The record reflects the interactions the source individual has had with a plurality of individuals. Step 2106 involves generating an artificial entity associated with the source individual. The process of generating the artificial entity is described elsewhere in the disclosure. In step 2108, data reflecting a question for the artificial entity is received from an individual. In some cases, a response to the question would reveal at least one private detail on the source individual. Step 2110 involves accessing a data structure storing a privacy policy associated with the source individual. Specifically, the privacy policy may be used to determine if the target individual has permission to know the at least one private detail. Step 2112 involves making a determination whether the target individual can be exposed to the at least one private detail. And step 2114 involves causing the artificial entity to output an answer to the target individual. When the determination indicates that the target individual can be exposed to the at least one private detail, step 2114 involves generating a first answer to the question that reveals the at least one private detail. On the other hand, when the determination indicates that the target individual cannot be exposed to the at least one private detail, step 2114 involves generating a second answer to the question that avoids revealing the at least one private detail.

In one aspect of the disclosure, methods, systems, and software are provided for operating artificial entities triggered by conversational events. The operations include receiving information associated with a source individual, analyzing the information to determine a behavior baseline of the source individual, and identifying at least one conversational event that triggers the source individual to deviate from the behavior baseline. An artificial entity is generated to conduct a conversation with a target individual, and responses are generated based on whether the target individual's statements correspond with the conversational event. The responses may deviate from the behavior baseline of the source individual, and may involve changing voice characteristics, language register, vocabulary, or emojis associated with the artificial entity.

The conversational events may include specific topics, emotional statements, emotional reactions, jokes, conflict or disagreement, usage of foul language, or exposure to personal information. The behavior baseline may be revised based on input from the source individual or feedback from the target individual, and may be selected based on the type of relationship the source individual has with the target individual. The existence of non-verbal events may also be determined and used to trigger deviations from the behavior baseline.

Figure 22:
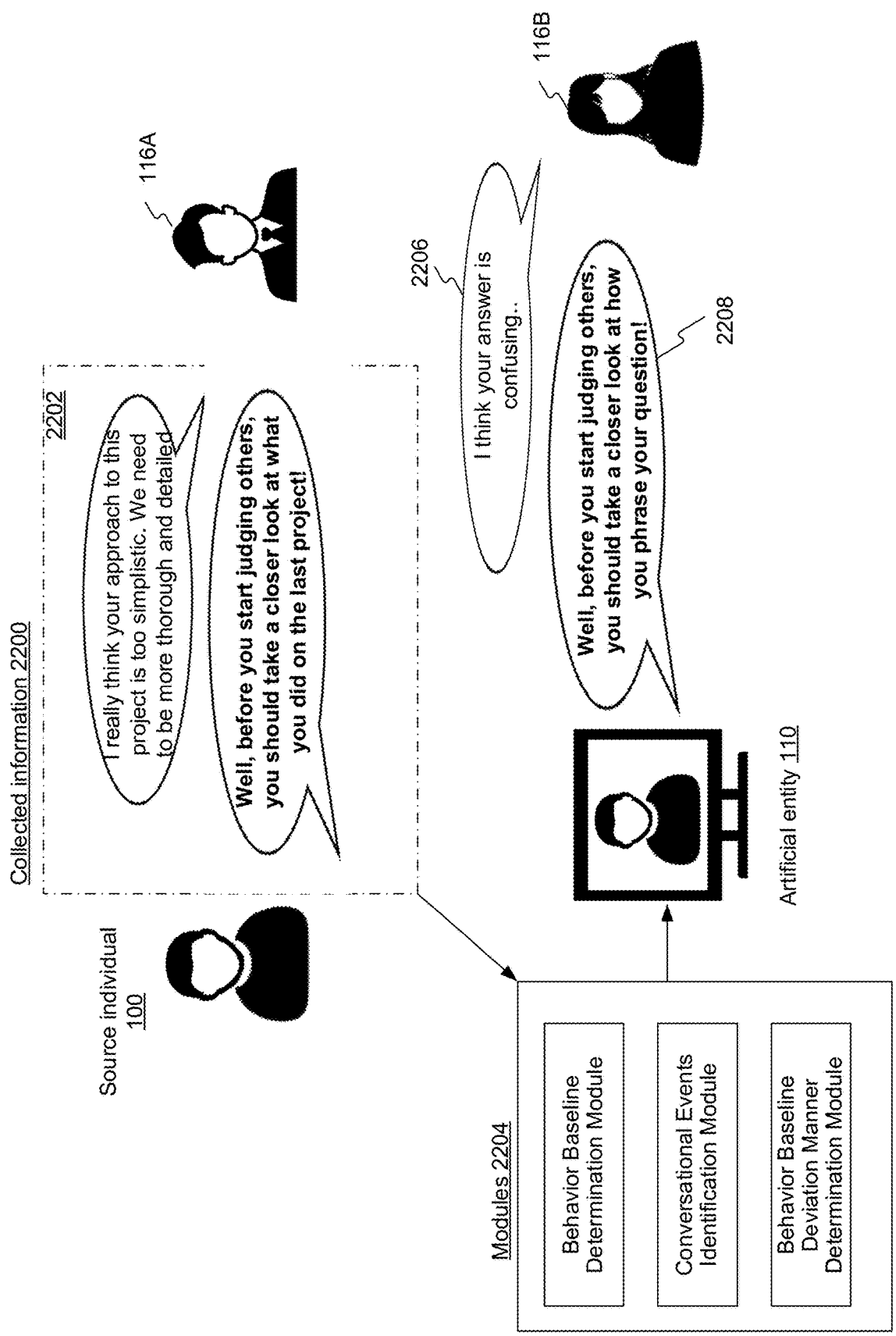

Some embodiments of the disclosure include receiving information associated with source individual. For example, as shown in FIG. 22, the system may receive/collect information 2200. The term "receiving" refers to obtaining or acquiring information from any source or in any form. For example, the information may be received from a database, a user input, or a sensor. The received information may include any data that is relevant to the source individual, such as personal information, social media activity, or communication history. In addition, the term "information associated with source individual" refers to any data that is related to the source individual. This may include, but is not limited to, demographic information, employment history, education history, or any other information that may be used to identify or characterize the source individual. Moreover, the term "plurality of records reflective of a plurality of relationships of the source individual with various individuals" refers to any data that reflects the connections or interactions between the source individual and other individuals. This may include, but is not limited to, social media activity, communication history, or any other data that may indicate a relationship or interaction between the source individual and another individual.

Some embodiments of the disclosure include analyzing the received information to determine a plurality of records reflective of a plurality of relationships of the source individual with various individuals. In the example illustrated in FIG. 22, the records show a conversation 2202 between source individual 100 and a reference individual 116A. The term "analyzing" refers to examining or processing the received information to extract meaningful data or insights. For example, the received information may be analyzed using machine learning algorithms, natural language processing techniques, or any other analytical method. In addition, the term "plurality of records reflective of a plurality of relationships of the source individual with various individuals" refers to any data that reflects the connections or interactions between the source individual and other individuals. This may include, but is not limited to, social media activity, communication history, or any other data that may indicate a relationship or interaction between the source individual and another individual. Moreover, the term "behavior baseline of the source individual" refers to the typical or expected behavior of the source individual based on the analyzed data. This may include, but is not limited to, the source individual's communication style, tone, or topic preferences.

Some embodiments of the disclosure include processing the plurality of records to determine a behavior baseline of the source individual and to identify at least one conversational event that triggers the source individual to deviate from the behavior baseline. For example, the system (e.g., artificial entity service host 130), may include dedicated modules for determining the behavior baseline of the source individual, identifying conversation events, and determining a manner that the source individual deviates from the baseline. In the example illustrated in FIG. 22, the conversational event is an emotional statement (e.g., criticism) that reference individual 116A said. The term "processing" refers to any method of manipulating or analyzing data to extract meaningful insights or information. For example, the data may be processed using statistical analysis, machine learning algorithms, or any other analytical method. In addition, the term "conversational event" refers to any interaction or communication between the artificial entity and the target individual. This may include, but is not limited to, a question, a statement, or any other form of communication. Moreover, the term "deviate from the behavior baseline" refers to any behavior or response that is outside of the expected or typical behavior of the source individual. This may include, but is not limited to, changes in communication style, tone, or topic preferences.

As described above, embodiments of the disclosure include generating an artificial entity 110 corresponding with the source individual for conducting a conversion with a reference individual 116B. Some embodiments of the disclosure include receiving data reflecting a first statement that the target individual said to the artificial entity. The term "receiving" refers to obtaining or acquiring data from any source or in any form. For example, the data may be received from a user input or a sensor. In addition, the term "first statement" refers to any communication or interaction initiated by the target individual. This may include, but is not limited to, a question, a statement, or any other form of communication. Moreover, the term "corresponds with the at least one conversational event" refers to any statement or communication that triggers the source individual to deviate from the behavior baseline. This may include, but is not limited to, changes in communication style, tone, or topic preferences.

Some embodiments of the disclosure include determining that the first statement does not correspond with the at least one conversational event. The term "determining" refers to ascertaining, establishing, or arriving at an outcome by some process. For example, the determination may be made using machine learning algorithms, natural language processing techniques, or any other analytical method. Moreover, the term "output a first response" refers to any communication or interaction initiated by the artificial entity in response to the first statement. This may include, but is not limited to, a question, a statement, or any other form of communication. Some embodiments of the disclosure include causing the artificial entity to output a first response to the first statement in a manner that follows the behavior baseline of the source individual. Moreover, the term "output a first response" refers to any communication or interaction initiated by the artificial entity in response to the first statement. This may include, but is not limited to, a question, a statement, or any other form of communication.

Some embodiments of the disclosure include receiving data reflecting a second statement that the target individual said to the artificial entity. The term "second statement" refers to any communication or interaction initiated by the target individual. This may include, but is not limited to, a question, a statement, or any other form of communication. Moreover, the term "corresponds with the at least one conversational event" refers to any statement or communication that triggers the source individual to deviate from the behavior baseline. This may include, but is not limited to, changes in communication style, tone, or topic preferences.

Some embodiments of the disclosure include determining that the second statement corresponds with the at least one conversational event. In the example illustrated in FIG. 22, the system may determine that second statement is 2206 of reference individual 116B is also criticism. The term "determining" refers to ascertaining, establishing, or arriving at an outcome by some process. For example, the determination may be made using machine learning algorithms, natural language processing techniques, or any other analytical method. This may include, but is not limited to, changes in communication style, tone, or topic preferences. Moreover, the term "output a second response" refers to any communication or interaction initiated by the artificial entity in response to the second statement. This may include, but is not limited to, a question, a statement, or any other form of communication.

Some embodiments of the disclosure include causing the artificial entity to output a second response to the second statement in a manner that deviates from the behavior baseline of the source individual. With reference to the example of FIG. 22, artificial entity 110 may generate response 2208 that deviates from the behavior baseline in a manner similar to the manner that source individual responds to criticism. The term "causing" refers to any action or process that results in the output of the second response. For example, the artificial entity may be programmed to output a response based on certain criteria or rules. Moreover, the term "output a second response" refers to any communication or interaction initiated by the artificial entity in response to the second statement. This may include, but is not limited to, a question, a statement, or any other form of communication.

Some embodiments of the disclosure include "wherein the at least one conversational event includes a statement on a specific topic that the target individual said." For example, if the target individual makes a statement regarding women's rights, the artificial entity may respond in a manner that aligns with the sensitivities of the source individual on this topic. The term "specific topic" refers to any subject matter that can be identified and categorized, such as social issues, personal interests, or professional matters. For instance, discussing climate change, technology advancements, or personal hobbies are all examples of specific topics.

Some embodiments of the disclosure include "wherein the at least one conversational event includes an emotional statement that the target individual said." In some examples, this could involve the target individual offering criticism, praise, a compliment, or a judgment. The term "emotional statement" refers to any expression that conveys a feeling or sentiment, such as happiness, sadness, anger, or surprise. For instance, praising someone's work, criticizing a performance, or complimenting someone's appearance are all types of emotional statements.

Some embodiments of the disclosure include "wherein the at least one conversational event includes an emotional reaction of the target individual to what the artificial entity said." According to one implementation, this might involve the target individual expressing surprise, amusement, or frustration in response to the artificial entity's comments. The term "emotional reaction" refers to the immediate response or feeling elicited by a stimulus, such as laughing at a joke, showing anger at a critique, or displaying joy at a compliment.

Some embodiments of the disclosure include "wherein the at least one conversational event includes a joke that the target individual said to the artificial entity." In some cases, this involves the target individual making a humorous remark or telling a funny story. The term "joke" refers to a statement or short story that is intended to cause laughter or amusement. Examples include puns, anecdotes, or witty comments designed to entertain.

Some embodiments of the disclosure include "wherein the at least one conversational event includes identification of conflict or disagreement." For example, if the target individual expresses a viewpoint that contradicts the artificial entity's programmed responses, a conflict may be identified. The term "conflict" refers to a situation where there is a disagreement or clash of opinions, interests, or needs. Instances of conflict can range from mild disagreements in opinions to intense arguments over critical issues.

Some embodiments of the disclosure include "wherein the at least one conversational event includes a usage of foul language." In some examples, this might involve the target individual using profanity or offensive terms during the interaction. The term "foul language" refers to words or phrases that are considered rude, vulgar, or offensive. Examples include swearing, derogatory remarks, or any language deemed inappropriate in polite conversation.

Some embodiments of the disclosure include "wherein the at least one conversational event includes being exposed to personal information." According to one implementation, this could involve the target individual sharing details about their personal life, such as their address, phone number, or personal experiences. The term "personal information" refers to any data that can be used to identify or contact an individual, including names, contact details, and personal identifiers like social security numbers or birth dates.

Some embodiments of the disclosure include "wherein the operations further include identifying behavior baseline of the source individual for each of the various individuals, and selecting which behavior baseline to follow based on a type of relationship the source individual has with the target individual." For example, the artificial entity might behave differently when interacting with a close friend of the source individual versus a business acquaintance. The term "behavior baseline" refers to the typical patterns of behavior or responses that an individual exhibits under normal circumstances. Specific examples include polite behavior with strangers, casual interactions with friends, or formal conduct with colleagues.

Some embodiments of the disclosure include "wherein the operations further include receiving input from the source individual with regards to a conversation with a specific individual, and revising the behavior baseline with respect to the specific individual based on the input." In some cases, the source individual might indicate to ignore an incident in which they behaved inappropriately. The term "input" refers to any information or feedback provided by the source individual to guide the behavior of the artificial entity. Examples include instructions to be more patient, to avoid certain topics, or to use a specific tone of voice.

Some embodiments of the disclosure include "wherein the manner in which the second response of the artificial entity deviates from the behavior baseline corresponds with a reference manner in which the source individual deviated from the behavior baseline in response to the at least one conversational event." For example, if the source individual typically responds calmly but reacted angrily to a specific event, the artificial entity might mirror this deviation. The term "deviation" refers to a departure from the usual or expected behavior. Specific examples include reacting with anger instead of calmness, or using informal language instead of formal speech.

Some embodiments of the disclosure include "wherein causing the artificial entity to output the second response to the second statement in the manner that deviates from the behavior baseline of the source individual involves changing one or more voice characteristics of the artificial entity." According to one implementation, this could involve altering the pitch, tone, or speed of the artificial entity's voice to reflect the deviation. The term "voice characteristics" refers to the attributes of speech that can be modified, such as intonation, volume, and speech rate. Examples include speaking more softly, using a higher pitch, or slowing down speech.

Some embodiments of the disclosure include "wherein causing the artificial entity to output the second response to the second statement in the manner that deviates from the behavior baseline of the source individual involves changing language register of the artificial entity." In some cases, this might involve switching from a formal to an informal register or vice versa. The term "language register" refers to the level of formality or style of language used in communication. Examples include using formal language in a professional setting or casual language among friends.

Some embodiments of the disclosure include "wherein causing the artificial entity to output the second response to the second statement in the manner that deviates from the behavior baseline of the source individual involves changing a vocabulary of the artificial entity." For example, the artificial entity might use more sophisticated or more colloquial words depending on the context. The term "vocabulary" refers to the set of words and phrases that an individual or entity uses in communication. Specific examples include technical jargon, slang, or simplified language for clarity.

Some embodiments of the disclosure include "wherein causing the artificial entity to output the second response to the second statement in the manner that deviates from the behavior baseline of the source individual involves usage of specific emojis different from emojis associated with the behavior baseline." According to one implementation, the artificial entity might use a laughing emoji instead of a neutral one to convey a different emotion. The term "emoji" refers to small digital images or icons used to express an idea, emotion, or concept in electronic communication. Examples include smiley faces, thumbs up, or heart symbols.

Some embodiments of the disclosure include "wherein the operations include displaying to the source individual representation of the at least one conversational event, receiving input from the source individual indicative of a preferred manner to respond to the at least one conversational event, and wherein the manner in which the second response of the artificial entity deviates from the behavior baseline corresponds with the preferred manner selected by the source individual." In some examples, the source individual might choose a more empathetic response to be used by the artificial entity. The term "representation" refers to a depiction or portrayal of an event or situation. Specific examples include visual displays, text summaries, or audio recordings. Some embodiments of the disclosure include "wherein the operations further include displaying to the source individual representation of the second response, receiving feedback from the source individual indicative of a preferred manner to respond to the second statement, and modifying the artificial entity based on the received feedback." For example, the source individual might provide feedback to use a gentler tone in future interactions. The term "feedback" refers to information provided in response to an action or behavior, intended to guide future actions. Specific examples include ratings, comments, or suggestions for improvement.

Some embodiments of the disclosure include "wherein the operations further include: processing the plurality of records to determine at least one non-verbal event that triggered the source individual to deviate from the behavior baseline; receiving data reflecting a third statement that the target individual said to the artificial entity; determining existence of a non-verbal event; and causing the artificial entity to output a third response to the third statement in a manner that deviates from the behavior baseline of the source individual." According to one implementation, this might involve identifying a non-verbal cue, such as body language, that influenced the source individual's response. The term "non-verbal event" refers to any form of communication that does not involve words, such as facial expressions, gestures, or body movements. Examples include nodding, frowning, or crossing arms.

Some embodiments of the disclosure include "determining existence of a non-verbal event is based on an analysis of image data associated with the target individual." In some cases, this might involve using facial recognition technology to detect emotions or reactions. The term "image data" refers to visual information captured in the form of pictures or video. Specific examples include photographs, video clips, or live camera feeds. Some embodiments of the disclosure include "determining existence of a non-verbal event is based on online information." For example, this could involve analyzing social media posts or news reports to identify events that might have influenced the target individual's behavior. The term "online information" refers to data available on the internet, including social media content, news articles, and public records. Examples include tweets, Facebook posts, or online news stories.

Figure 23:
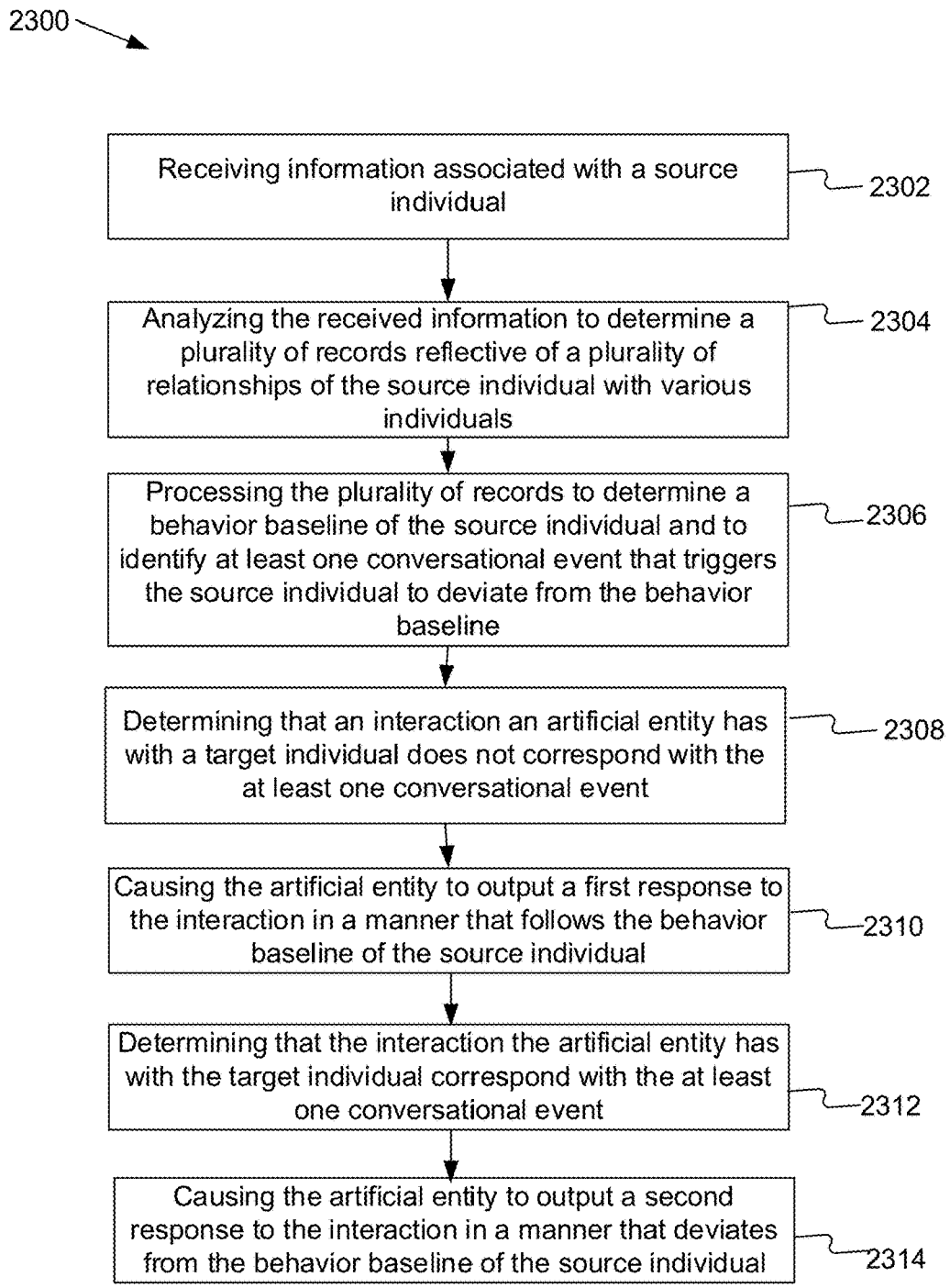

FIG. 23 illustrates a flowchart of an exemplary process 2300 for operating artificial entities, consistent with embodiments of the present disclosure. In some disclosed embodiments, process 2300 may be performed by at least one processor (e.g., processing device 210) to perform operations or functions described herein. In some disclosed embodiments, some aspects of process 2300 may be implemented as software (e.g., program codes or instructions) that are stored in a memory (e.g., memory device 220) or a non-transitory computer-readable medium. In some disclosed embodiments, some aspects of process 2300 may be implemented as hardware (e.g., a specific-purpose circuit). In some disclosed embodiments, process 2300 may be implemented as a combination of software and hardware.

Referring to FIG. 23, the flow chart of process 2300 begins with step 2302 of receiving information associated with a source individual. The type of information received described elsewhere in the disclosure. In step 2304, the received information is analyzed to determine a plurality of records reflective of a plurality of relationships of the source individual with various individuals. Step 2306 involves processing the plurality of records to determine a behavior baseline of the source individual and to identify at least one conversational event that triggers the source individual to deviate from the behavior baseline. Thereafter, process 2300 may include a step of generating the artificial entity as described elsewhere in the disclosure. In step 2308, determining that an interaction an artificial entity has with a target individual does not correspond with the at least one conversational event. The interaction may be a statement that the target individual said to the artificial entity. Step 2310 involves causing the artificial entity to output a first response to the interaction in a manner that follows the behavior baseline of the source individual. Step 2312 involves determining that the interaction the artificial entity has with the target individual correspond with the at least one conversational event. And step 2314 involves causing the artificial entity to output a second response to the interaction in a manner that deviates from the behavior baseline of the source individual. For example, a first statement may be associated with at least one conversational event and thus may trigger a first response and a second statement may be not associated with at least one conversational event and thus may trigger a second response, differs than the first response.

In one aspect of the disclosure, methods, systems, and software are provided for operating artificial entities. The operations include receiving information associated with a source individual, analyzing the received information to identify a plurality of laugh types of the source individual, generating an artificial entity associated with the source individual, receiving data reflecting an interaction between the artificial entity and at least one target individual, determining a response for the interaction that includes content and a delivery manner, and causing the artificial entity to generate the response with the specific laugh. The plurality of laugh types includes audible synthetizations of a giggle, a chuckling, a chortle, a belly laugh, a snicker, a cackle, a snort, a guffaw, a titter, or burst out laughing.

The operations further include selecting a laugh to convey contentment, nervousness, unrestrained joy, or a sense of solidarity with the at least one target individual. The delivery manner is determined based on the situational context associated with the interaction, which involves analyzing the received data reflecting the interaction to make a determination of the situational context associated with the interaction. The situational context can indicate that the at least one target individual is laughing, and the determination of the situational context includes accessing a data structure storing information indicative of a relationship that the source individual has with the at least one target individual.

Figure 24:
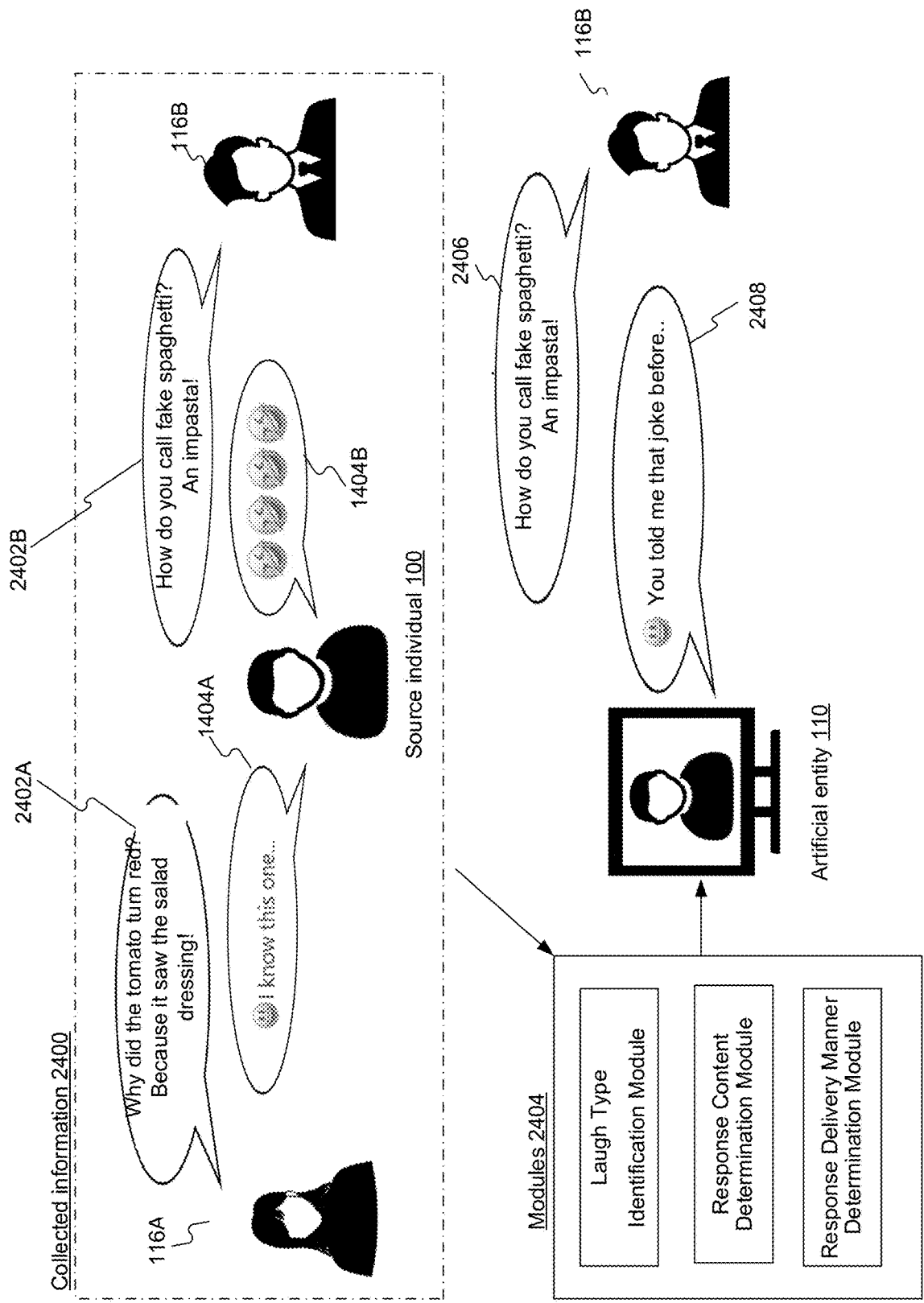

Some embodiments of the disclosure include "receiving information associated with a source individual." For example, as shown in FIG. 24, the system may receive/collect information 200. The term "receiving" refers to the process of obtaining, acquiring, or collecting data from an external source. This can include various methods such as direct input, downloading, or retrieving data from a network. For example, in the context of this claim, receiving information may involve accessing digital records, capturing real-time data from sensors, or gathering user-provided details through an interface. In addition, the term "information associated with a source individual" refers to any data or details that can be linked to a specific person. This may encompass personal details, behavioral patterns, or historical data such as preferences, demographic data, or previous interactions. For instance, information could include voice recordings, social media activity, or biometric data. Moreover, the term "associated with" indicates a relationship or connection between the data and the source individual, which may be established through direct identification or inferential linkage. For example, this association could be based on identifiers like a name or user ID, or inferred from context such as location data correlated with known habits.

Some embodiments of the disclosure include "analyzing the received information to identify a plurality of laugh types of the source individual." As illustrated in FIG. 24, the system may use a laugh type identification module (from plurality of modules 2404) to identify a plurality of laugh types used in various conversation. For example, in response to a joke 2402A that individual 116A said, source individual 100 may use a polite laugh, and in response to a joke 2402B that individual 116B said, source individual 100 may use a burst of laughter. The term "analyzing" refers to the systematic examination and evaluation of data, often to discover patterns, trends, or specific characteristics. This can involve processes such as data mining, statistical analysis, or machine learning algorithms. For instance, analyzing in this context may involve examining audio files to distinguish different laugh types based on tone, duration, and pitch. In addition, the term "plurality of laugh types" refers to multiple distinct forms or variations of laughter that can be identified and categorized. This might include variations such as chuckles, giggles, belly laughs, or nervous laughter, each potentially serving different communicative functions or conveying different emotional states. Moreover, the term "of the source individual" specifies that these laugh types are unique to the person whose information is being analyzed. This could mean that the analysis is tailored to the individual's unique vocal patterns, ensuring that the generated artificial entity accurately mimics their specific laughter styles.

Some embodiments of the disclosure include "generating an artificial entity associated with the source individual." The term "generating" refers to the creation or formation of something, often using computational or mechanical processes. In this context, it involves using software algorithms or machine learning models to create a digital or virtual representation. For example, generating might include constructing a digital avatar, synthesizing a voice model, or developing an interactive chatbot. In addition, the term "artificial entity" refers to a non-human agent created through technology to simulate or replicate certain aspects of human behavior or characteristics. This can include virtual characters, AI-driven personas, or even physical robots (e.g., artificial entity 110). These entities may be used in various applications, from customer service to entertainment. Moreover, the term "associated with the source individual" implies that the artificial entity is designed to reflect or mimic specific attributes of a particular person. This could involve replicating the individual's appearance, voice, mannerisms, or even specific laugh types, ensuring that interactions with the artificial entity are reminiscent of those with the actual person.

Some embodiments of the disclosure include "receiving data reflecting an interaction between the artificial entity and at least one target individual." The receive data may include joke 2406 that reference individual 116B said. The term "receiving" has been previously defined, and in this step, it again refers to obtaining data, this time specifically about interactions. In addition, the term "data reflecting an interaction" refers to information captured or recorded that indicates the nature or content of an engagement or communication between entities. This data can include conversation transcripts, recorded audio or video, or even metadata about the timing and duration of the interaction. For example, data could detail how the artificial entity responded to certain prompts or how the target individual reacted during the exchange. Moreover, the term "between the artificial entity and at least one target individual" specifies that the interaction involves the artificial entity and one or more human participants. This could include one-on-one conversations or group interactions, and the target individual could be a user, customer, or another party engaging with the artificial entity for various purposes.

Some embodiments of the disclosure include "determining a response for the interaction that includes content and a delivery manner, wherein the determined delivery manner includes a specific laugh out of the plurality of laugh types." As illustrated in FIG. 24, the system may use different modules (from plurality of modules 2404) to determine the response. In this case, artificial entity may determine that individual 116B is repeating the same joke, and decide to use a polite laugh in response 2408, as source individual 100 used in a similar situation. The term "determining" refers to the process of deciding or establishing something, often based on analysis or predefined criteria. This could involve algorithmic decision-making, rule-based systems, or AI-driven inferences. For example, determining a response might involve selecting appropriate verbal content and a non-verbal cue, such as a laugh, based on the context of the interaction. In addition, the term "response" refers to an action or output generated as a result of the interaction, which could include spoken words, gestures, or other forms of communication. The response is designed to be relevant and appropriate for the context, such as offering a joke or empathetic remark in a conversational AI system. Moreover, the term "delivery manner" refers to the style or method by which the response is conveyed. This can include tone, timing, body language, or other expressive elements. In this case, it includes a specific laugh, which means selecting one of the identified laugh types that best fits the response's context or intention.

Some embodiments of the disclosure include "causing the artificial entity to generate the response with the specific laugh." The term "causing" refers to instigating or making something happen, often through command, influence, or control mechanisms. In a technological context, this might involve executing a software command or triggering a system function. For instance, causing the artificial entity to act could involve sending instructions to a speech synthesis module to output a particular laugh sound. In addition, the term "generate the response" refers to the process by which the artificial entity produces the chosen action or output, in this case, combining both content and a specific delivery manner. This generation might involve combining synthesized speech with programmed behaviors, such as facial expressions or gestures. Moreover, the term "with the specific laugh" indicates that the response includes a particular type of laugh, as previously determined. This laugh is chosen to match the context of the interaction, enhancing the naturalness or appropriateness of the artificial entity's behavior. For example, the laugh could be a warm, genuine laugh intended to comfort or a polite chuckle to acknowledge a lighthearted remark.

Some embodiments of the disclosure include "wherein the plurality of laugh types includes audible synthetizations of a giggle, a chuckling, a chortle, a belly laugh, a snicker, a cackle, a snort, a guffaw, a titter, or burst out laughing." In some examples, these various types of laughter are synthesized using digital audio techniques that replicate the unique sound characteristics of each laugh type. The term "audible synthetizations" refers to the process of artificially creating sounds that mimic human voice, e.g., laughter. For example, synthesizing a giggle might involve generating a light, repeated sound pattern, whereas a guffaw would be a deep, hearty laugh. Each type of laugh may be used to convey different emotions or social signals in interactions.

Some embodiments of the disclosure include "wherein the operations further include selecting a first laugh to convey contentment from the interaction, selecting a second laugh to convey nervousness from the interaction, selecting a third laugh to convey unrestrained joy from the interaction, and selecting a fourth laugh to convey a sense of solidarity with the at least one target individual." According to one implementation, the system can choose the appropriate type of laughter based on the emotional context of the interaction. The term "contentment" refers to a state of satisfaction and ease, often signaled by a soft, gentle laugh. "Nervousness" can be conveyed by a hesitant or awkward laugh, "unrestrained joy" by an exuberant, full-bodied laugh, and "solidarity" by a supportive or encouraging chuckle. Some embodiments of the disclosure include "wherein the operations further include analyzing the received data reflecting the interaction to make a determination of a situational context associated with the interaction, and determining the delivery manner based on the situational context." In some cases, the situational context is assessed using natural language processing and sentiment analysis to understand the mood and dynamics of the interaction. The term "situational context" refers to the circumstances surrounding an event, including the emotional tone, setting, and participants involved. For example, a formal setting may require more restrained laughter, while a casual context might allow for more expressive forms of laughter.

Some embodiments of the disclosure include "wherein the at least one target individual includes a plurality of individuals, and the determination of the situational context involves determining identities of the plurality of individuals and their association with the source individual." In some examples, the system uses facial recognition or social media data to identify individuals and understand their relationship to the source individual. The term "identities" refers to the distinguishing characteristics of individuals, such as their names, faces, or other personal attributes. The "association" can include friendships, family ties, or professional relationships, which influence the appropriate response from the artificial entity. Some embodiments of the disclosure include "wherein the situational context associated with the interaction indicating that the at least one target individual is laughing." For example, laughter detection algorithms can analyze audio input to detect laughter, which may influence the artificial entity's response. The term "indicating" refers to pointing out or showing evidence of something. In this context, detecting laughter can signal a lighthearted or humorous moment, suggesting that a similarly light response may be appropriate.

Some embodiments of the disclosure include "wherein the determination of the situational context includes accessing a data structure storing information indicative of a relationship that the source individual has with the at least one target individual." In some cases, this data structure may contain detailed profiles, including past interactions, shared history, and emotional bonds. The term "data structure" refers to a specialized format for organizing, processing, and storing data. It can include databases or other storage systems that hold structured information about individuals and their relationships. Some embodiments of the disclosure include "wherein the determination of the situational context is based on a level of intimacy that the source individual has with a target individual." According to one implementation, the system assesses intimacy by analyzing interaction frequency, duration, and shared experiences. The term "level of intimacy" refers to the closeness or familiarity between individuals, which can range from casual acquaintances to close friends or family. This assessment helps the system choose an appropriate response, such as a more personal or casual laugh for closer relationships.

Some embodiments of the disclosure include "wherein when the at least one target individual is a friend of the source individual, the determined delivery manner includes a first laugh; and when the individual is unknown to the source individual, the determined delivery manner includes a second laugh differing from the first laugh." In some examples, the system uses predefined laugh types to match the formality or informality required by the relationship. Some embodiments of the disclosure include "wherein the operations further include analyzing the received information to determine a sense of humor of the source individual." For example, the system might analyze past interactions, preferences, and reactions to different types of jokes to build a humor profile. The term "sense of humor" refers to an individual's capacity to perceive, enjoy, or express what is funny. This includes preferences for certain styles of humor, such as slapstick, satire, or irony. Understanding the source individual's sense of humor helps the system tailor responses to be more engaging and appropriate.

Some embodiments of the disclosure include "wherein the delivery manner of the response for the interaction includes a volume for an audible synthetization of the specific laugh determined based on the sense of humor of the source individual." In some cases, the system adjusts the volume of the laugh to match the perceived intensity or subtlety of the humor. The term "volume" refers to the loudness or amplitude of sound. For example, a louder laugh might be used for overtly funny situations, while a quieter laugh could be more suitable for subtle humor or private jokes. Some embodiments of the disclosure include "wherein the delivery manner of the response for the interaction includes a length for an audible synthetization of the specific laugh determined based on the sense of humor of the source individual." In some implementations, the system varies the duration of laughter to align with the source individual's typical reactions. The term "length" refers to the temporal extent or duration of an event. For example, a brief laugh might signal acknowledgment, while a prolonged laugh could indicate deeper amusement or a shared joke. Some embodiments of the disclosure include "wherein the content of the response for the interaction includes a remark for making the at least one target individual laugh determined based on the sense of humor of the source individual." According to one implementation, the system generates contextually relevant jokes or comments that resonate with both the source and target individuals. The term "remark" refers to a spoken or written comment. For example, the system might use puns, anecdotes, or observational humor to elicit laughter, depending on the source individual's preferences and the situation.

Some embodiments of the disclosure include "wherein the operations further include determining that the interaction involves a funny statement that the at least one target individual said based on the determined sense of humor of the source individual." In some examples, the system uses natural language processing to identify humor in the target individual's statements. The term "funny statement" refers to a comment or remark intended to amuse or entertain. Recognizing humor allows the system to respond appropriately, such as with laughter or a witty reply, enhancing the interaction's naturalness and engagement. Some embodiments of the disclosure include "wherein the operations include detecting a follow-up response of the at least one target individual to the response of the artificial entity to the interaction; and analyzing the follow-up response to determine whether the response to the interaction was appropriate to the interaction." For example, the system may assess whether the target individual laughed, appeared confused, or showed discomfort. The term "follow-up response" refers to the subsequent reaction or feedback following an initial interaction. Analyzing these responses helps the system refine future interactions and improve its ability to engage effectively.

Some embodiments of the disclosure include "wherein when the delivery manner was determined to be inappropriate, the operations include updating a data structure to prevent the artificial entity from laughing in similar interactions." In some cases, the system learns from these assessments to avoid repeating mistakes, enhancing its contextual understanding. The term "inappropriate" refers to something unsuitable or not fitting the context. For instance, laughing at a serious or sensitive comment might be deemed inappropriate, prompting the system to adjust its responses in future similar situations. Some embodiments of the disclosure include "wherein when the delivery manner was determined to be rude, the operations include causing the artificial entity to apologize for laughing." According to one implementation, the system can automatically generate an apology to mitigate any discomfort caused by the inappropriate laugh. The term "rude" refers to behavior that is considered impolite or disrespectful. For example, laughing at someone's misfortune could be seen as rude, and an apology can help maintain social harmony and repair the interaction.

Some embodiments of the disclosure include "wherein the operations further include storing records of the follow-up response of the at least one target individual in a database for future analysis and adjusting responses of the artificial entity." In some cases, these records are used to improve the artificial entity's response patterns over time. The term "database" refers to an organized collection of data that can be easily accessed, managed, and updated. Storing interaction data allows for longitudinal analysis, helping the system adapt to changing user preferences and contexts. Some embodiments of the disclosure include "wherein the plurality of laugh types of the source individual includes a plurality of laughing emojis, and the response with the specific laugh is a message with a specific laughing emoji." In some examples, the system uses these visual representations to convey laughter in text-based communications. The term "emoji" refers to a small digital image or icon used to express an idea, emotion, or action in electronic communication. Using laughing emojis can enhance the expressiveness of digital interactions, helping to convey tone and emotion. Other embodiments of the disclosure include "wherein the plurality of laugh types of the source individual includes a plurality of laughing gifs, and the response with the specific laugh is a message with a specific laughing gif." In some cases, animated gifs depicting laughter are used to add a dynamic element to the interaction. The term "gif" refers to a format for image files that supports both static and animated images. Gifs can capture subtle nuances in facial expressions and body language, making them an effective tool for conveying emotions in digital communication.

Figure 25:
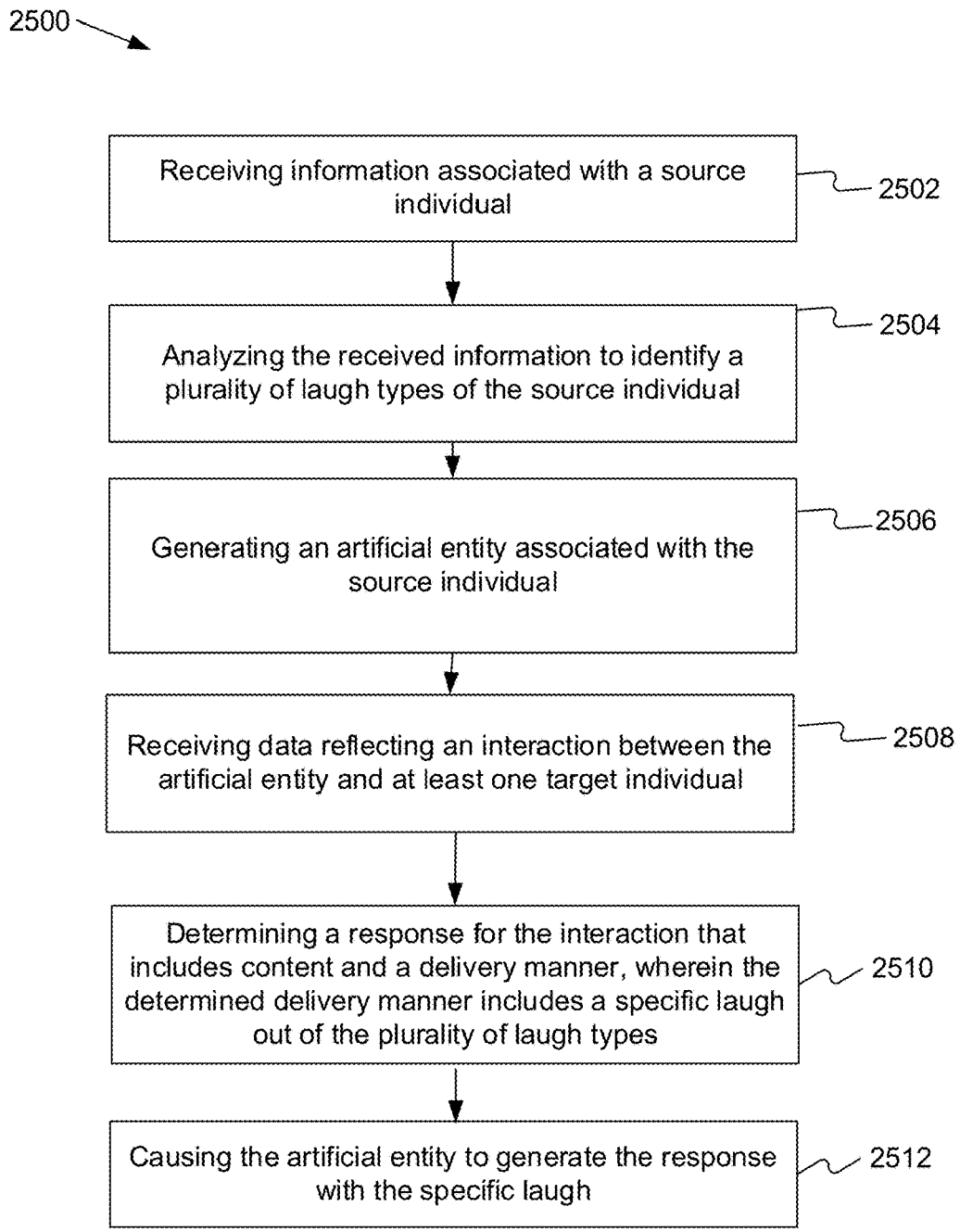

FIG. 25 illustrates a flowchart of an exemplary process 2500 for operating artificial entities, consistent with embodiments of the present disclosure. In some disclosed embodiments, process 2500 may be performed by at least one processor (e.g., processing device 210) to perform operations or functions described herein. In some disclosed embodiments, some aspects of process 2500 may be implemented as software (e.g., program codes or instructions) that are stored in a memory (e.g., memory device 220) or a non-transitory computer-readable medium. In some disclosed embodiments, some aspects of process 2500 may be implemented as hardware (e.g., a specific-purpose circuit). In some disclosed embodiments, process 2500 may be implemented as a combination of software and hardware.

Referring to FIG. 25, the flow chart of process 2500 begins with step 2502, which involves receiving information associated with a source individual. This information may include various data points such as the individual's voice recordings, historical interactions, emotional expressions, or preferences, as described elsewhere in the disclosure. In some cases, the system may gather this information passively through everyday interactions or actively through surveys or questionnaires. In step 2504, the received information is analyzed to identify a plurality of laugh types specific to the source individual. This analysis may involve using machine learning algorithms to recognize patterns in the laughter types, such as distinguishing between giggles, chuckles, or belly laughs. For example, the system might use spectral analysis to categorize the laughs based on their frequency, duration, and intensity. Understanding these laugh types is crucial for the subsequent personalization of the artificial entity's responses. Step 2506 involves generating the artificial entity, which is described in more detail elsewhere in the disclosure. This artificial entity may be a digital avatar, a virtual assistant, or a robotic interface designed to interact with users in a natural and engaging manner. In this context, generating the artificial entity includes programming it with the identified laugh types and other behavioral cues, enabling it to mimic the source individual's laughter style and responses accurately. Step 2508 involves receiving data reflecting an interaction between the artificial entity and at least one target individual. This data can include audio recordings, video footage, or textual transcripts of conversations and interactions. For example, the system might analyze the tone, pace, and content of the conversation to assess the mood and context of the interaction, which is critical for determining an appropriate response. Step 2510 involves determining a response for the interaction that includes both content and a delivery manner, where the determined delivery manner includes a specific laugh chosen from the plurality of laugh types. In this case, the system selects the most suitable laugh type based on the interaction's context, such as choosing a chuckle for a light-hearted comment or a belly laugh for a genuinely funny moment. The content of the response may include spoken words, gestures, or other forms of communication that complement the laugh. Step 2512 involves causing the artificial entity to generate the response with the specific laugh. This step entails the actual execution of the response by the artificial entity, ensuring that it delivers the chosen laugh type in a natural and contextually appropriate manner. In this context, it means triggering the artificial entity to perform the response, which may involve synchronized movements, facial expressions, and the synthesized laughter sound. The goal is to create a seamless and engaging interaction that resonates with the target individual, enhancing the overall experience.

In one aspect of the disclosure, methods, systems, and software are provided for operating artificial entities on social network platforms. Embodiments of this aspect of the disclosure include collecting information indicative of reactions of a source individual to first events on at least one social network platform during a first time period, analyzing the collected information to determine at least one activity pattern of the source individual on the social network platform, generating an artificial entity associated with the source individual, accessing the social network platform during a second time period subsequent to the first time period and obtaining data reflective of a plurality of second events on the social network platform, and causing the artificial entity to take a social network action on behalf of the source individual in response to at least one of the plurality of second events. The social network action that the artificial entity takes on behalf of the source individual includes sharing content, reacting to content that other people shared, associating an individual with shared content, accepting or rejecting connection offers from individuals, reacting to profile updates, and informing users of the social network platform that the source individual did not take the social network action.

The embodiments further include determining the social network action responding to content shared on the feed of the social network platform based on the activity pattern of the source individual and context. The context is determined based on an identity of the individual that shared the content on the feed of the at least one social network platform, a topic of the content being shared on the feed of the at least one social network platform, how many friends of the source individual reacted to the content being shared on the feed of the at least one social network platform, or a manner in which friends of the source individual reacted to the content being shared on the feed of the at least one social network platform. The embodiments also include generating a report for the source individual indicative of the another one of the plurality of second events and verifying credibility of the news update before causing the artificial entity to react to the news update on behalf of the source individual. The embodiments also include providing details to the source individual on the determined at least one activity pattern that affects a manner by which the artificial entity will react to the second events, and updating the at least one activity pattern based on the input received from the source individual.

Figure 26:
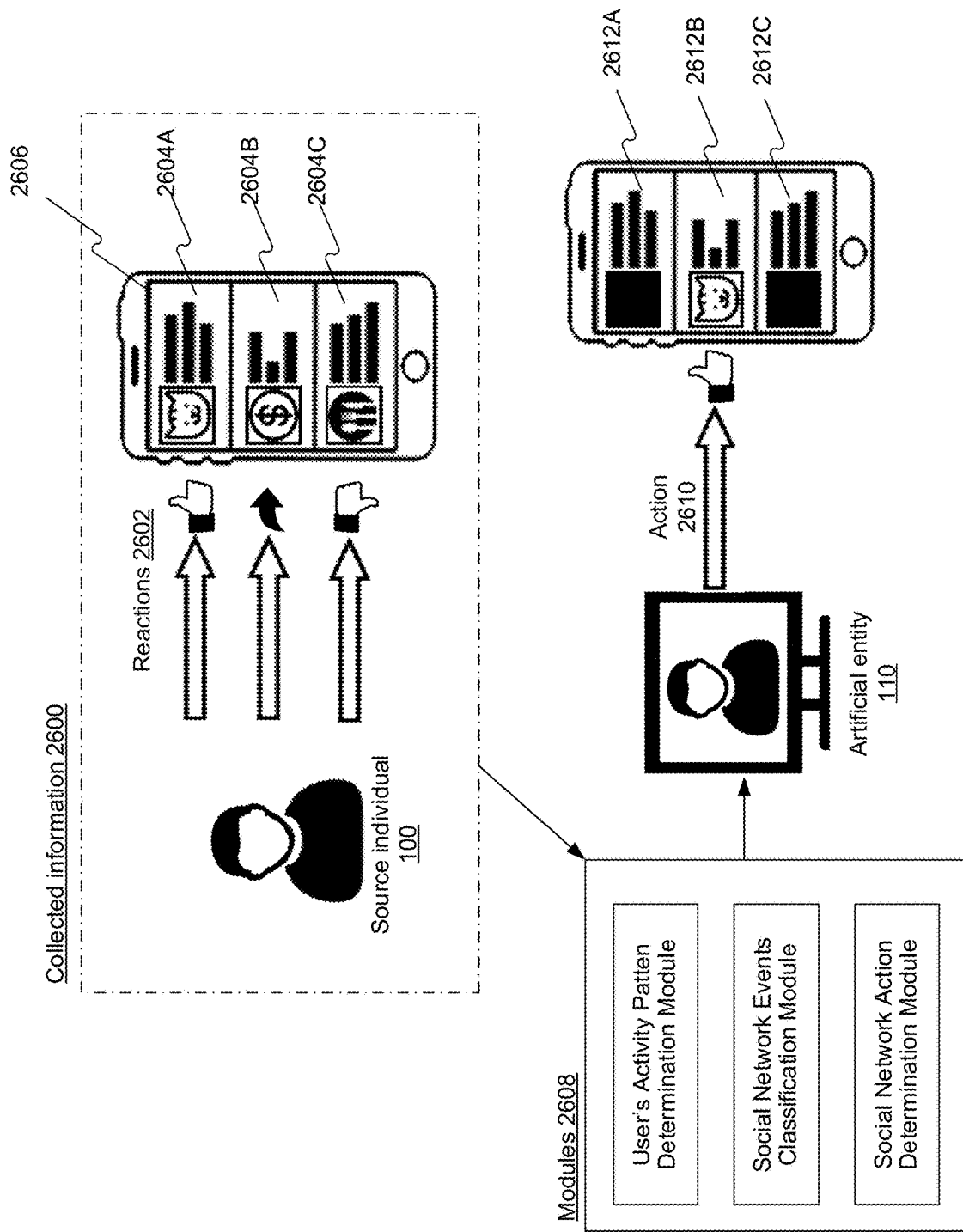

Some embodiments of the disclosure include "during a first time period collecting information indicative of reactions of a source individual to first events on at least one social network platform." For example, as shown in FIG. 26, the system may receive/collect information 2600 the collected information may be indicative of reactions 2602 (e.g., liking, sharing, unliking) of source individual 100 to first event 2604A (e.g., a post about a cat), first event 2604B (e.g., a post about finance), and first event 2604C (e.g., a post about food) of one social network platform 2606. The term "collecting" refers to the process of gathering, accumulating, or amassing data from various sources. This can involve using automated tools, software agents, or manual efforts to compile data. In the context of the invention, collecting might include using algorithms to extract data from user interactions such as likes, comments, shares, or views on a social network platform. In addition, the term "information indicative of reactions" refers to data that reflects or signals the responses or engagements of individuals. This can include textual data (like comments or posts), behavioral data (such as click patterns or scrolling behavior), or even biometric data (such as facial expressions or voice tone if applicable). For example, information indicative of reactions might include the frequency and sentiment of comments made by a user on various posts. Moreover, the term "first events on at least one social network platform" refers to the initial occurrences or activities on a social network that are being monitored or analyzed. This could include a wide range of activities such as the posting of status updates, sharing of multimedia content, participation in discussions, or any other actions taken by users. For example, the first events may involve a user attending a virtual event, participating in a poll, or reacting to posts on a social media site.

Some embodiments of the disclosure include "analyzing the collected information to determine at least one activity pattern of the source individual on the at least one social network platform." As illustrated in FIG. 26, the system may use user's activity pattern determination module (from plurality of modules 2608) to determine at least one activity pattern of source individual 100. The term "analyzing" refers to the process of examining, scrutinizing, or interpreting data to extract meaningful insights or patterns. This process may involve statistical analysis, machine learning algorithms, or data mining techniques. For instance, in the context of the invention, analyzing might include using natural language processing to assess sentiment in posts or using clustering algorithms to identify common themes in a user's interactions. The term "activity pattern" refers to a consistent or recurring sequence of actions or behaviors exhibited by an individual. This can encompass a range of behaviors such as the times of day when a user is most active, the types of content they interact with, or their engagement levels. For example, an activity pattern might reveal that a user frequently engages with news articles in the morning and entertainment content in the evening. Moreover, the term "of the source individual on the at least one social network platform" refers to the specific behaviors and interactions of the person being analyzed within the context of one or more social networks. This includes all digital footprints left by the individual on these platforms, such as posts, likes, shares, and comments. For example, this could include tracking the source individual's interaction with specific types of content like news, sports, or political discussions.

Some embodiments of the disclosure include "generating an artificial entity associated with the source individual." The term "generating" refers to the act of creating, producing, or synthesizing something new from existing materials or data. In the context of this invention, generating may involve using algorithms or software systems to create digital representations or models based on the analyzed data. For example, this could include creating a digital avatar, a chatbot, or a profile that mimics the behavior and preferences of the source individual. The term "artificial entity" refers to a digital or virtual construct designed to replicate or simulate certain characteristics or behaviors of a real individual. This can include avatars, bots, virtual assistants, or any other digital representation that can interact with users or systems. For instance, an artificial entity might be a social media bot that posts updates or interacts with other users based on the activity patterns of the source individual. Moreover, the term "associated with the source individual" refers to the linkage or connection between the artificial entity and the real person it represents. This association can be based on data points, behavior patterns, or specific instructions provided by or about the source individual. For example, the artificial entity could be programmed to reflect the source individual's interests, communication style, or preferences in online interactions.

Some embodiments of the disclosure include "during a second time period, subsequent the first time period, accessing to the social network platform and obtaining data reflective of a plurality of second events on the at least one social network platform." The term "accessing" refers to the process of retrieving or obtaining entry to a system, network, or data repository. This can involve using login credentials, API calls, or other methods to gain entry to a digital environment. In the context of this invention, accessing might include logging into a social media platform to gather real-time data or using a data feed to monitor ongoing activities. The term "data reflective of a plurality of second events" refers to information that represents or is indicative of multiple subsequent activities or occurrences on the social network platform. This can include any new posts, interactions, or other activities that occur after the initial data collection phase. For example, this data might include new user posts, comments, or reactions that occur in response to trending topics or events. The term "on the at least one social network platform" was defined above.

Some embodiments of the disclosure include "in response to at least one of the plurality of second events, causing the artificial entity to take a social network action on behalf of the source individual." As illustrated in FIG. 26, the system may use social network events, classification module (from plurality of modules 2608) to classify the second events. E.g., based on the topic of post, or the type of the event, or the identity of the person involved with the event. Thereafter, the system may use social network action determination module to determine if and how artificial entity 110 should react to the second events. The term "causing" refers to the act of making something happen or bringing about a particular outcome. In this context, causing involves triggering or initiating an action by the artificial entity based on certain conditions or inputs. For example, the system might be programmed to prompt the artificial entity to respond to specific types of content or interactions, such as liking a post or sharing an update. The term "social network action" refers to any behavior or activity that can be performed on a social network platform. This can include posting comments, liking or sharing content, sending messages, or any other form of engagement typical on such platforms. For instance, a social network action might involve an artificial entity responding to a comment on a post or participating in a discussion thread. Moreover, the term "on behalf of the source individual" refers to actions taken by the artificial entity that are intended to represent or substitute for the actions the real individual might take. This can include mimicking the communication style, preferences, or typical behaviors of the source individual. For example, the artificial entity might be configured to respond to content in a manner consistent with the source individual's past behavior, such as expressing agreement or sharing similar interests.

Some embodiments of the disclosure include "wherein the first events and second events include accessing new content available on a feed of the at least one social network platform, and the operations further include determining the at least one activity pattern based on reactions of the source individual that includes at least one of sharing the new content, liking the new content, commenting on the new content, or tagging someone with the new content." The term "accessing new content" refers to the act of retrieving or viewing recently posted information on a social network platform. This can involve engaging with various forms of media such as text posts, images, videos, or links to external websites. For example, users may access news articles, personal updates, promotional content, or multimedia posts that appear on their social media feeds. Additionally, determining the activity pattern involves analyzing how the source individual interacts with these new posts, which can include actions like sharing content to their own profile, liking or favoring posts, commenting to express opinions or engage in discussions, or tagging friends in relevant content. These interactions help in understanding the individual's preferences and typical behaviors, which are crucial for tailoring the responses of the artificial entity.

Some embodiments of the disclosure include "wherein the first events and second events include receiving friend requests to the source individual, receiving follower offers, or receiving invitations to groups, and the operations further include determining the at least one activity pattern based on reactions of the source individual that includes accepting or rejecting connection offers." The term "receiving friend requests" refers to the process of a user being notified about another user's desire to connect on a social network. This may also extend to follower offers, where individuals choose to follow the public updates of another user, and invitations to join groups, which are communities within the platform focused on specific interests or topics. The activity pattern is determined by how the source individual responds to these social connection requests-whether they accept or reject them. For example, an individual may have a pattern of accepting requests from people they know personally or share common interests with, while rejecting those from unknown users. This behavior helps to build a profile of the individual's social preferences and boundaries, informing the actions taken by the artificial entity.

Some embodiments of the disclosure include "wherein the first events and second events include private messages to the source individual, and the operations further include determining the at least one activity pattern based on answers of the source individual to the private messages." The term "private messages" refers to direct communications between users that are not visible to the public or other users on the platform. This form of communication can include text messages, multimedia attachments, or voice notes sent through the platform's messaging system. The activity pattern involves analyzing the nature and frequency of responses from the source individual to these messages. For example, the individual might respond promptly to messages from close friends or important contacts but may ignore or delay responses to unsolicited messages or those from unknown senders. This response behavior provides insights into the individual's communication preferences and priorities, which are essential for programming the artificial entity to interact in a manner consistent with the source individual's style.

Some embodiments of the disclosure include "wherein the first events and second events include profile updates of individuals connected with the source individual, and the operations further include determining the at least one activity pattern based on reactions of the source individual to the profile updates." The term "profile updates" refers to changes or additions made by users to their personal information or status on a social network platform. This can include updates to personal details, status messages, profile pictures, and other forms of self-representation. The activity pattern is assessed by observing how the source individual engages with these updates, such as by liking, commenting on, or sharing the updates. For instance, a user might frequently comment on life events such as birthdays or job changes shared by their connections, indicating a preference for engaging with significant updates in others' lives. This behavior helps to tailor the responses of the artificial entity to ensure it acts in a socially appropriate and personalized manner.

Some embodiments of the disclosure include "wherein the at least one social network platform includes a plurality of social network platforms and the first events associated with a first social network platform and the second events associated with a second social network platform." The term "plurality of social network platforms" refers to the existence of multiple online platforms where users can interact, share content, and connect with others. These platforms can vary widely in terms of user base, features, and primary content type. For example, the first platform might be a general social media site where users share a wide range of personal updates, while the second platform could be a professional networking site focusing on career-related content. The ability to analyze and integrate data across multiple platforms is crucial for understanding the full spectrum of a user's online behavior and ensuring that the artificial entity can operate seamlessly in diverse digital environments.

Some embodiments of the disclosure include "determining the social network action responding to content shared on the feed of the at least one social network platform based on the activity pattern of the source individual and context." The term "social network action" refers to any interaction or engagement activity that can be performed on a social network platform, such as liking, sharing, commenting, or tagging. The process of determining the appropriate action involves analyzing the activity pattern of the source individual—such as their typical engagement style and frequency—and considering the context in which the content is shared. For example, the artificial entity might share a piece of content if it aligns with topics the source individual commonly engages with or might refrain from commenting on sensitive or controversial posts if the source individual's pattern indicates a tendency to avoid such discussions. This nuanced approach ensures that the actions taken by the artificial entity are in line with the preferences and social norms of the source individual.

Some embodiments of the disclosure include "determining the context based on an identity of the individual that shared the content on the feed of the at least one social network platform." The term "identity" refers to the attributes and information that define an individual on a social network platform, including their username, profile information, and social connections. Determining the context involves analyzing how the relationship between the source individual and the content sharer might influence the appropriate social network action. For instance, the source individual may have a pattern of engaging more actively with posts from close friends or family members compared to acquaintances or distant connections. The artificial entity can use this information to prioritize interactions with content shared by key individuals in the source individual's network, thereby maintaining a sense of personalized and meaningful engagement.

Some embodiments of the disclosure include "wherein the collected information includes records of conversations that the source individual had with a plurality of individuals, and determining an activity pattern for each plurality of individuals." The term "records of conversations" refers to stored data capturing the content and context of communications between the source individual and others on the social network platform. This can include text messages, comments, and other forms of interaction. Determining an activity pattern involves analyzing these records to identify recurring themes, tones, or subjects that characterize the source individual's communications with different people. For example, the source individual may consistently discuss specific topics with certain friends, such as sports or politics, while engaging in different subjects with others, like personal life or work-related matters. This granular analysis helps in fine-tuning the responses and actions of the artificial entity, ensuring that it interacts in a way that is consistent with the established patterns of communication for each group or individual.

Some embodiments of the disclosure include "wherein the operations include determining the context based on a topic of the content being shared on the feed of the at least one social network platform." The term "topic" refers to the main subject or theme of a piece of content shared on a social network platform. This can encompass a wide range of subjects such as news events, personal updates, hobbies, or professional content. Determining the context based on the topic involves analyzing how the nature of the content aligns with the source individual's interests and typical engagement patterns. For example, if the source individual frequently interacts with content related to technology, the artificial entity might prioritize responding to posts on this subject. This approach ensures that the artificial entity engages with content in a manner that is relevant and personalized, enhancing the authenticity and appropriateness of its interactions.

Some embodiments of the disclosure include "wherein the collected information includes records of interactions that the source individual had about a plurality of topics, and determining an activity pattern for each of the plurality of topics." The term "interactions" refers to the various ways in which a user engages with content on a social network platform, such as liking, commenting, sharing, or reacting to posts. The collected information spans multiple topics, providing a comprehensive view of the source individual's interests and engagement patterns. Determining an activity pattern for each topic involves analyzing these interactions to understand the user's preferences, intensity of engagement, and typical response styles. For example, the source individual may engage deeply with topics related to their profession but show more casual interest in entertainment or lifestyle content. This detailed understanding allows the artificial entity to emulate the source individual's behavior across different subjects, ensuring that its actions are contextually appropriate and aligned with the individual's established patterns.

Some embodiments of the disclosure include "wherein the operations include determining the context based on how many friends of the source individual reacted to the content being shared on the feed of the at least one social network platform." The term "how many friends" refers to the number of social connections or contacts the source individual has who engage with a particular piece of content. This metric helps determine the social significance or relevance of the content to the source individual. For instance, if a significant number of the source individual's friends react to a particular post, it may indicate that the content is of interest to their social circle or is trending within their network. The artificial entity can use this information to prioritize interacting with such content, mimicking the source individual's likely behavior of engaging with popular or widely discussed topics within their social sphere. This consideration ensures that the artificial entity remains socially aware and responsive to the dynamics of the source individual's network.

Some embodiments of the disclosure include "wherein the operations include determining the context based on the manner in which friends of the source individual reacted to the content being shared on the feed of the at least one social network platform." The term "manner" refers to the way in which reactions are expressed, which can include liking, commenting, sharing, or using specific reaction emojis (such as "love," "ha-ha," "angry," etc.). Analyzing this aspect involves understanding not just the quantity but the quality and sentiment of reactions from the source individual's friends. For example, a post that receives many "likes" and positive comments may be viewed favorably, while one that elicits mixed or negative reactions may be treated cautiously. The artificial entity can adjust its response strategy based on these social cues, ensuring that its interactions are not only contextually appropriate but also sensitive to the nuances of the source individual's social environment.

Some embodiments of the disclosure include "wherein the social network action that the artificial entity takes on behalf of the source individual includes at least one of sharing content, reacting to content that other people shared, associating an individual with shared content, accepting or rejecting connection offers from individuals, or reacting to the profile updates." The term "reacting to content" includes a range of possible actions such as liking, commenting, sharing, or using reaction emojis. This broad spectrum of responses allows the artificial entity to engage with content in various ways that reflect the source individual's typical online behavior. For example, sharing content could involve reposting articles or images, while associating an individual with shared content might involve tagging friends in posts that are relevant to them. Accepting or rejecting connection offers pertains to managing the source individual's social network by deciding which new connections to acknowledge or ignore. Reacting to profile updates involves engaging with changes made by other users, such as new photos or status changes. These actions are tailored to mirror the source individual's typical social media behavior, enhancing the authenticity of the artificial entity's interactions.

Some embodiments of the disclosure include "wherein the social network action that the artificial entity takes on behalf of the source individual includes informing users of the at least one social network platform that the social network action was not taken by the source individual." The term "informing users" refers to the process of notifying other individuals on the social network platform that the action was carried out by an artificial entity rather than the real person. This transparency is crucial for maintaining trust and clarity in online interactions. For example, the artificial entity might include a note or disclaimer in a comment or message indicating that it is an automated response based on the source individual's preferences. This disclosure helps to manage expectations and provides clarity to other users, ensuring that they understand the nature of the interaction and can respond appropriately. It also helps to distinguish between human and automated actions, preserving the integrity of the source individual's online presence.

Some embodiments of the disclosure include "determining that the source individual is likely to be interested in another one of the plurality of second events, and includes generating a report for the source individual indicative of another one of the plurality of second events." The term "determining interest" refers to the process of assessing whether a particular event or content is likely to be of relevance or appeal to the source individual. This determination can be based on previous engagement patterns, stated preferences, or inferred interests from past behaviors. Generating a report involves compiling and presenting information about these relevant events in a format that is easy for the source individual to review. For instance, the artificial entity might generate a summary of trending topics, new updates from key contacts, or recommended content based on the source individual's interests. This report serves as a curated guide, helping the source individual stay informed and engaged with content that matters to them, while also enhancing the user experience by providing personalized insights.

Some embodiments of the disclosure include "wherein at least one of the plurality of second events includes a news update shared on the feed of the at least one social network platform, and the operations further include verifying the credibility of the news update before causing the artificial entity to react to the news update on behalf of the source individual." The term "verifying credibility" refers to the process of checking the authenticity, accuracy, and reliability of information, especially news content, before taking action based on it. This process might involve cross-referencing the news with reputable sources, checking the author's credentials, or using fact-checking tools. For example, if a news update claims a significant event, the artificial entity might verify this information against known credible news outlets before sharing or reacting to it. This step is crucial to avoid spreading misinformation and to ensure that the artificial entity's actions align with the source individual's values and the integrity of the online environment. It also helps to protect the source individual's reputation by associating them only with verified and trustworthy information.

Some embodiments of the disclosure include "generating a report for the source individual indicative of social network actions that the artificial entity took on behalf of the source individual with respect to at least one of the plurality of second events." The term "generating a report" refers to creating a detailed record or summary of activities performed by the artificial entity on behalf of the source individual. This report can include information such as posts shared, comments made, connections accepted or rejected, and other interactions conducted on the social network. For example, the report might highlight how the artificial entity responded to popular content or managed connection requests during a specific period. This transparency allows the source individual to review and approve the actions taken, ensuring that the artificial entity's activities are consistent with their preferences and social media strategy. It also provides a mechanism for the source individual to understand and potentially refine the artificial entity's future behavior.

Some embodiments of the disclosure include "receiving input from the source individual on the actions that the artificial entity took on behalf of the source individual, and updating the at least one activity pattern based on the input." The term "receiving input" refers to the process by which the source individual provides feedback or instructions regarding the actions taken by the artificial entity. This input can include approvals, corrections, or new preferences that guide the future behavior of the artificial entity. For example, the source individual might indicate a preference for more frequent updates on certain topics or less engagement with particular types of content. Updating the activity pattern involves adjusting the algorithms and parameters that govern the artificial entity's actions, ensuring that it better aligns with the source individual's evolving preferences. This iterative feedback loop enhances the personalization and accuracy of the artificial entity's interactions, making it more effective and user-aligned over time.

Figure 27:
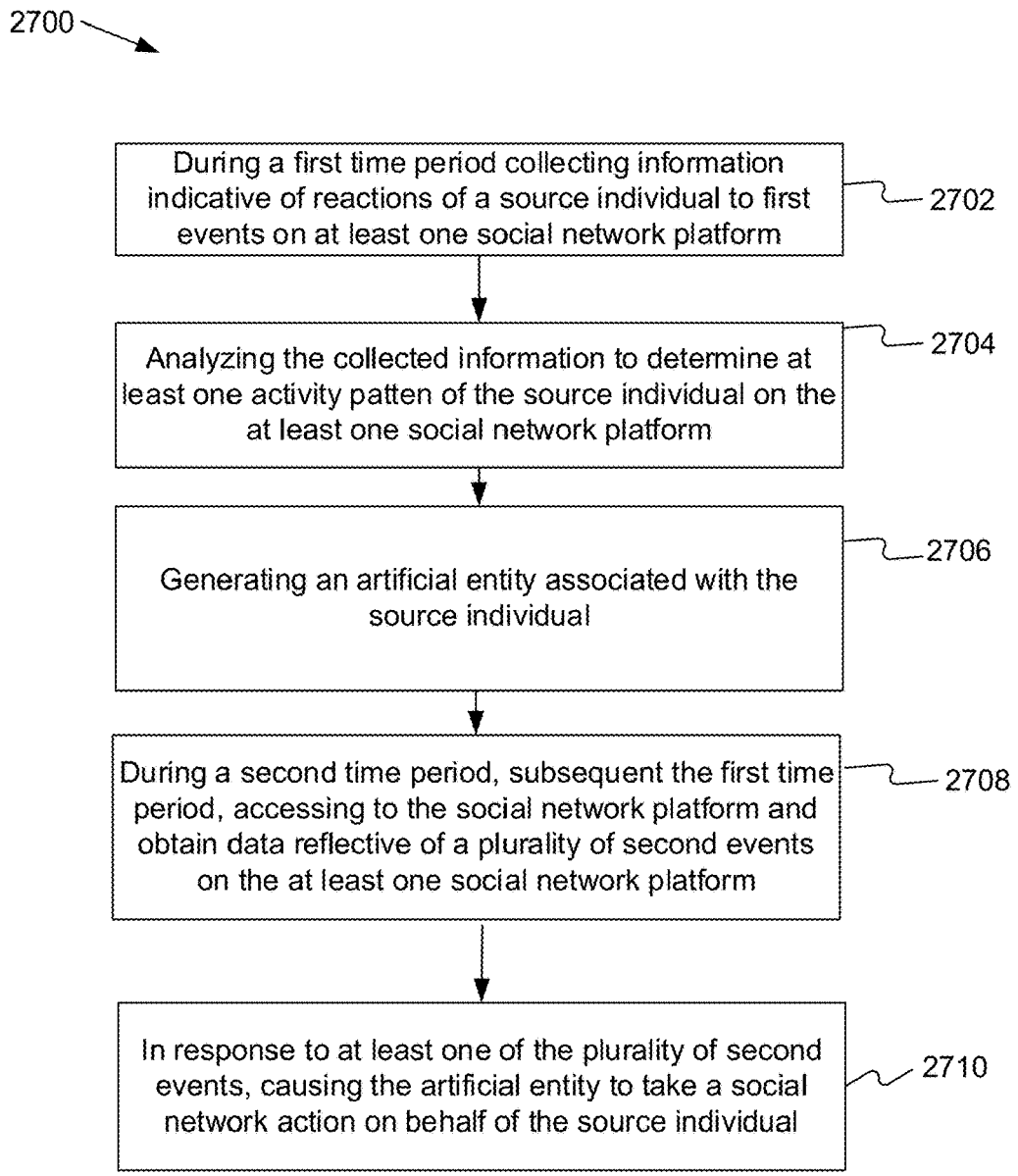

FIG. 27 illustrates a flowchart of an exemplary process 2700 for operating artificial entities, consistent with embodiments of the present disclosure. In some disclosed embodiments, process 2700 may be performed by at least one processor (e.g., processing device 210) to perform operations or functions described herein. In some disclosed embodiments, some aspects of process 2700 may be implemented as software (e.g., program codes or instructions) that are stored in a memory (e.g., memory device 220) or a non-transitory computer-readable medium. In some disclosed embodiments, some aspects of process 2700 may be implemented as hardware (e.g., a specific-purpose circuit). In some disclosed embodiments, process 2700 may be implemented as a combination of software and hardware.

Referring to FIG. 27, the flow chart of process 2700 begins with step 2702, which involves collecting information indicative of reactions of a source individual to first events on at least one social network platform during a first time period. This information may include various data points such as the individual's responses to posts, comments, likes, shares, or other forms of engagement. The collection process can be passive, gathering data from everyday interactions on the platform, or active, involving direct input from the individual through surveys or questionnaires. In step 2704, the collected information is analyzed to determine at least one activity pattern of the source individual on the social network platform. This analysis might involve using machine learning algorithms to identify patterns in the individual's online behavior, such as preferences for specific types of content, frequency of interactions, and typical responses to different stimuli. Understanding these patterns is used for tailoring the artificial entity's actions to match the source individual's style and preferences. Step 2706 involves generating an artificial entity associated with the source individual. This artificial entity may be a digital avatar, a virtual assistant, or another form of digital representation designed to interact with users in a natural and engaging manner. Generating the artificial entity includes programming it with the identified activity patterns and other behavioral cues, enabling it to simulate the source individual's online interactions accurately. In step 2708, during a second time period subsequent to the first time period, the system accesses the social network platform and obtains data reflective of a plurality of second events on the platform. These second events could include new posts, updates, messages, friend requests, or any other activity that occurs on the platform and is relevant to the source individual. Step 2710 involves causing the artificial entity to take a social network action on behalf of the source individual in response to at least one of the plurality of second events. This action could include liking a post, commenting, sharing content, accepting friend requests, or other interactions typical of the source individual's behavior. The artificial entity is designed to perform these actions in a manner consistent with the activity patterns previously identified, ensuring that its responses are contextually appropriate and aligned with the source individual's preferences.

What is claimed is:

1. A non-transitory computer readable medium containing instructions that when executed by at least one processor cause the at least one processor to perform operations for operating artificial entities, the operations comprising:
   receiving information related to a source individual, wherein the received information is indicative of a plurality of relationships between the source individual and a plurality of individuals;
   analyzing the received information to determine behavior patterns of the source individual with respect to each of the plurality of individuals, wherein the behavior patterns is indicative of a level of intimacy;
   generating an artificial entity associated with the source individual based on the received information;
   receiving data reflecting a specific interaction of the artificial entity with at least one individual of the plurality of individuals; and
   determining a manner for the artificial entity to respond to the specific interaction based on the level of intimacy that the source individual has with the at least one individual.

2. The non-transitory computer readable medium of claim 1, wherein the operations further include determining that the source individual had a first level of intimacy with a first individual and a second level of intimacy with a second individual, the first level is greater than the second level; wherein the determined manner for the artificial entity to respond includes using specific emojis associated with the first level of intimacy while communicating with the first individual and avoiding from using the specific emojis while communicating with the second individual.

3. The non-transitory computer readable medium of claim 1, wherein the artificial entity communicates with a first individual using a nickname and communicates with a second individual using a forename.

4. The non-transitory computer readable medium of claim 1, wherein the artificial entity communicates with a first individual using a first tone and communicates with a second individual using a second tone, the first tone is softer than the second tone.

5. The non-transitory computer readable medium of claim 1, wherein the artificial entity shares with a first individual private details and avoids from sharing the private details with a second individual.

6. The non-transitory computer readable medium of claim 1, wherein the artificial entity uses specific emojis while communicating with a first individual and avoids from using the specific emojis while communicating with a second individual.

7. The non-transitory computer readable medium of claim 1, wherein the operations further include determining that the at least one individual is a parent of the source individual, and the determined manner for the artificial entity to respond is calling the parent of the source individual as at least one of mom or dad.

8. The non-transitory computer readable medium of claim 1, wherein the received information includes significant dates to the plurality of individuals, and the operations further include determining whether the artificial entity should mention a specific significant date while interacting with a specific individual based on the level of intimacy that the source individual has with the specific individual.

9. The non-transitory computer readable medium of claim 1, wherein the operations further include receiving second data indicative of a change in the level of intimacy that the source individual has with a specific individual; and changing a manner that the artificial entity interacts with the specific individual based on the received second data.

10. The non-transitory computer readable medium of claim 9, wherein the received second data reflects additional interactions between the specific individual and at least one of the source individual or the artificial entity.

11. A non-transitory computer readable medium containing instructions that when executed by at least one processor cause the at least one processor to perform operations for operating artificial entities, the operations comprising:
    receiving information related to a source individual;
    analyzing the received information to identify a plurality of events involving the source individual, and to determine associated behavior data reflective of a state of the source individual during the plurality of events;
    generating a chronological record of the source individual indicative of a timeline of the plurality of events;
    generating an artificial entity associated with the source individual based on the received information;
    receiving a question for the artificial entity from a reference individual; and
    determining an answer for the question based on the chronological record of the source individual and the determined associated behavior data.

12. The non-transitory computer readable medium of claim 11, wherein the operations further include:
    processing the chronological record of the source individual to identify one or more periods with insufficient information about the source individual; and
    generating different questionnaires to a plurality of persons, based on known relationship between the source individual and the plurality of persons.

13. The non-transitory computer readable medium of claim 12, wherein at least one of the questionnaires is aimed for the source individual and includes at least one question about a period with insufficient information about the source individual.

14. The non-transitory computer readable medium of claim 12, wherein at least one of the questionnaires is aimed to a person that knows the source individual and includes at least one question about a period with insufficient information about the source individual.

15. The non-transitory computer readable medium of claim 11, wherein the received information includes at least one of image captured by the source individual and at least one image that depicts the source individual.

16. The non-transitory computer readable medium of claim 11, wherein the received information includes scanned documents, and the operations further include analyzing the scanned documents to identify at least one of the plurality of events.

17. The non-transitory computer readable medium of claim 11, wherein the determined answer for the question includes a textual description of at least one event.

18. The non-transitory computer readable medium of claim 17, wherein the textual description of the at least one event is written in a first-person narration.

19. The non-transitory computer readable medium of claim 17, wherein the operations further include determining a profile of the source individual from the received information, and the textual description of the at least one event is generated based on the profile of the source individual.

20. The non-transitory computer readable medium of claim 11, wherein the determined associated behavior data reflects at least one of whether the source individual was active or passive in each of the plurality of events, or whether the source individual had a positive experience or a negative experience in each of the plurality of events.

21. A non-transitory computer readable medium containing instructions that when executed by at least one processor cause the at least one processor to perform operations for operating artificial entities, the operations comprising:
receiving information related to a source individual;
analyzing the received information to determine a record of the source individual, wherein the record reflects interactions the source individual has had with a plurality of individuals;
generating an artificial entity associated with the source individual based on the received information;
receiving data reflecting a first question for the artificial entity from a first individual;
accessing the record to determine a first answer to the first question based on past interactions the source individual has had with the first individual;
causing the artificial entity to output the first answer to the first individual;
receiving data reflecting a second question for the artificial entity from a second individual;
accessing the record to determine a second answer to the second question based on past interactions the source individual has had with the second individual, the second answer differs from the first answer; and
causing the artificial entity to output the second answer to the second individual.

22. The non-transitory computer readable medium of claim 21, wherein the operations further include determining that the source individual has had more than one past interaction with the first individual and that the source individual has had no past interactions with the second individual.

23. The non-transitory computer readable medium of claim 21, wherein the operations further include determining context from the past interactions the source individual has had with at the first individual; and determining the first answer based on the determined context.

24. The non-transitory computer readable medium of claim 23, wherein the determined context includes at least one of: an interest that both the source individual and the first individual share, a hobby that both the source individual and the first individual share, an experience that both the source individual and the first individual had, a trait that both the source individual and the first individual share, an object that both the source individual and the first individual interacted with, an event that both the source individual and the first individual participated in, or a celebrity that both the source individual and the first individual follow.

25. The non-transitory computer readable medium of claim 21, wherein the operations further include determining that some of the past interactions the source individual has had with the first individual were private and other of the part interactions the source individual has had with the first individual were nonprivate, and the first answer provided to the first individual includes details on the nonprivate interactions and excludes details on the private interactions.

26. The non-transitory computer readable medium of claim 21, wherein the operations further include determining that the first individual is sensitive to a specific topic, and determining the first answer in a manner that accounts for the determined sensitivity of the first individual to the specific topic.

27. The non-transitory computer readable medium of claim 21, wherein the operations further include determining an emotional state of the first individual when asking the first question, and determining the first answer in a manner that accounts for the determined emotional state of the first individual.

28. The non-transitory computer readable medium of claim 21, wherein the operations further include determining an estimated knowledge of the first individual on a topic of the first question, and determining the first answer in a manner that accounts for the estimated knowledge of the first individual on the topic.

29. The non-transitory computer readable medium of claim 21, wherein the operations further include determining an age of the first individual, and determining the first answer in a manner that accounts for the age of the first individual.

30. The non-transitory computer readable medium of claim 21, wherein when the artificial entity engages in a conversation with both the first individual and the second individual, the operations further include determining the first answer in a manner that accounts for a presence of the second individual in the conversation.

31. A non-transitory computer readable medium containing instructions that when executed by at least one processor cause the at least one processor to perform operations for operating artificial entities, the operations comprising:
receiving information related to a source individual;
analyzing the received information to determine a record of the source individual, wherein the record includes private details on the source individual;
generating an artificial entity associated with the source individual based on the received information;
receiving data reflecting a question for the artificial entity from a reference individual, wherein a response to the question would reveal at least one private detail on the source individual;
accessing a data structure storing a privacy policy associated with the source individual;
based on the privacy policy, making a determination whether the reference individual can be exposed to the at least one private detail;
when the determination indicates that the reference individual can be exposed to the at least one private detail, generating a first answer to the question that reveals the at least one private detail;
when the determination indicates that the reference individual cannot be exposed to the at least one private detail, generating a second answer to the question that avoids from revealing the at least one private detail; and
causing the artificial entity to output at least one of the first answer or the second answer to the reference individual.

32. The non-transitory computer readable medium of claim 31, wherein the private details include romantic details of the source individual and the at least one private detail includes at least one romantic detail.

33. The non-transitory computer readable medium of claim 31, wherein the private details include financial details of the source individual and the at least one private detail includes at least one financial detail.

34. The non-transitory computer readable medium of claim 31, wherein the operations further include processing the record of the source individual to classify portions of the received information as the private details on the source individual.

35. The non-transitory computer readable medium of claim 34, wherein the operations further include assigning a privacy level to each of the classified portions of the received information.

36. The non-transitory computer readable medium of claim 35, wherein the operations further include determining a reference privacy level for the reference individual, and enabling the reference individual to be exposed to private details associated with assigned privacy levels lesser than the reference privacy level of a target individual.

37. The non-transitory computer readable medium of claim 31, wherein the operations further include determining the privacy policy based on previous input from the source individual.

38. The non-transitory computer readable medium of claim 31, wherein the operations further include using artificial intelligence to determine the privacy policy associated with the source individual based on past interactions of the source individual had.

39. The non-transitory computer readable medium of claim 31, wherein the determination of whether the reference individual can be exposed to the at least one private detail is based on past interactions that the reference individual has had with the artificial entity.

40. The non-transitory computer readable medium of claim 31, wherein the determination of whether the reference individual can be exposed to the at least one private detail is based on past interactions the source individual has had with the reference individual.

41. A non-transitory computer readable medium containing instructions that when executed by at least one processor cause the at least one processor to perform operations for operating artificial entities, the operations comprising:
receiving information related to a source individual;
analyzing the received information to determine a plurality of records reflective of a plurality of relationships of the source individual with various individuals;
processing the plurality of records to determine a behavior baseline of the source individual and to identify at least one conversational event that triggers the source individual to deviate from the behavior baseline;
generating an artificial entity associated with the source individual based on the received information;
receiving data reflecting an interaction that the artificial entity has with a reference individual;
when the interaction does not correspond with the at least one conversational event, causing the artificial entity to output a first response to the interaction in a manner that follows the behavior baseline of the source individual; and
when the interaction corresponds with the at least one conversational event, causing the artificial entity to output a second response to the interaction in a manner that deviates from the behavior baseline of the source individual.

42. The non-transitory computer readable medium of claim 41, wherein the at least one conversational event includes at least one of: a statement on a specific topic, an emotional reaction, or a joke.

43. The non-transitory computer readable medium of claim 41, wherein the at least one conversational event includes at least one of an identification of conflict, a usage of foul language, or being exposed to personal information.

44. The non-transitory computer readable medium of claim 41, wherein the operations further include receiving an input from the source individual with regards to a conversation with a specific individual, and revising the behavior baseline with respect to the specific individual based on the input.

45. The non-transitory computer readable medium of claim 41, wherein the operations further include receiving an input from the source individual indicative of a preferred manner to respond to the at least one conversational event, and wherein the manner in which the second response of the artificial entity deviates from the behavior baseline corresponds with the preferred manner indicated by the source individual.

46. The non-transitory computer readable medium of claim 41, wherein the operations further include displaying representation of the second response, receiving a feedback indicative of a preferred manner to respond to the at least one conversational event, and modifying a manner in which the artificial entity will respond to future interactions corresponding to the at least one conversational event.

47. The non-transitory computer readable medium of claim 41, wherein the operations further include identifying a behavior baseline of the source individual for each of the various Individuals, and selecting which behavior baseline to follow based on a type of relationship the source individual has with the reference individual.

48. The non-transitory computer readable medium of claim 41, wherein causing the artificial entity to output the second response in the manner that deviates from the behavior baseline of the source individual involves changing one or more voice characteristics of the artificial entity.

49. The non-transitory computer readable medium of claim 41, wherein causing the artificial entity to output the second response in the manner that deviates from the behavior baseline of the source individual involves changing language register of the artificial entity.

50. The non-transitory computer readable medium of claim 41, wherein causing the artificial entity to output the second response in the manner that deviates from the behavior baseline of the source individual involves usage of specific emojis different from emojis associated with the behavior baseline.

51. A non-transitory computer readable medium containing instructions that when executed by at least one processor cause the at least one processor to perform operations for operating artificial entities, the operations comprising:
receiving information related to a source individual;
analyzing the received information to identify a plurality of laugh types of the source individual;
generating an artificial entity associated with the source individual based on the received information;
receiving data reflecting an interaction with the artificial entity;
determining a response for the interaction that includes content and a delivery manner for the artificial entity to respond to the interaction, wherein the determined delivery manner includes a specific laugh out of the plurality of laugh types; and
causing the artificial entity to generate the response with the specific laugh.

52. The non-transitory computer readable medium of claim 51, wherein the operations further include selecting a first laugh type to convey contentment from the interaction, selecting a second laugh type to convey nervousness from the interaction, selecting a third laugh type to convey unrestrained joy from the interaction; and selecting a fourth laugh type to convey a sense of solidarity.

53. The non-transitory computer readable medium of claim 51, wherein the operations further include analyzing the received data reflecting the interaction to make a determination of a situational context associated with the interaction, and determining the delivery manner based on the situational context.

54. The non-transitory computer readable medium of claim 53, wherein the interaction involves a plurality of individuals, and the determination of the situational context includes determining identities of the plurality of individuals and their association with the source individual.

55. The non-transitory computer readable medium of claim 53, wherein the determination of the situational context includes detecting that a reference individual interacting with the artificial entity is laughing.

56. The non-transitory computer readable medium of claim 53, wherein the determination of the situational context is based on a level of intimacy that the source individual has with a reference individual interacting with the artificial entity.

57. The non-transitory computer readable medium of claim 51, wherein the plurality of laugh types of the source individual includes a plurality of audible synthesization of differing laughs, and the determined delivery manner includes an audible synthesization of the specific laugh.

58. The non-transitory computer readable medium of claim 51, wherein the plurality of laugh types of the source individual includes a plurality of laughing emojis, and the determined delivery manner includes a message with a specific laughing emoji.

59. The non-transitory computer readable medium of claim 51, wherein the plurality of laugh types of the source individual includes a plurality of laughing gifs, and the determined delivery manner includes a message with a specific laughing gif.

60. The non-transitory computer readable medium of claim 51, wherein the operations further include detecting a reaction of a reference individual interacting with the artificial entity to the response with the specific laugh; and analyzing the reaction to determine whether using the specific laugh was appropriate in responding to the interaction.

61. A non-transitory computer readable medium containing instructions that when executed by at least one processor cause the at least one processor to perform operations for operating artificial entities, the operations comprising:
receiving information related to a source individual, wherein the received information was collected during a first time period and indicative of reactions of the source individual to first events on at least one social network platform;
analyzing the received information to determine at least one activity pattern of the source individual on the at least one social network platform;
generating an artificial entity associated with the source individual based on the received information;
determining a manner for the artificial entity to respond to events on the at least one social network platform based on the determined at least one activity pattern;
during a second time period, subsequent the first time period, accessing the social network platform and obtaining data reflective of a plurality of second events on the at least one social network platform; and
in response to at least one of the plurality of second events, causing the artificial entity to take an action in the determined manner on behalf of the source individual.

62. The non-transitory computer readable medium of claim 61, wherein the first events include accessing new content available on a feed of the at least one social network platform, and the at least one activity pattern is determined based on reactions of the source individual that includes at least one of sharing the new content, liking the new content, commenting on the new content, or tagging someone with the new content.

63. The non-transitory computer readable medium of claim 61, wherein the first events include at least one of receiving friend requests to the source individual, receiving follower offers, or receiving invitations to groups, and wherein the at least one activity pattern is determined based on reactions of the source individual that includes at least one of accepting or rejecting connection offers.

64. The non-transitory computer readable medium of claim 61, wherein the first events include private messages to the source individual, and the at least one activity pattern is determined based on answers of the source individual to the private messages.

65. The non-transitory computer readable medium of claim 61, wherein the first events include profile updates of a specific individual connected with the source individual, and the at least one activity pattern is determined based on reactions of the source individual to the profile updates.

66. The non-transitory computer readable medium of claim 61, wherein the operations further include determining a specific action for responding to a new content shared on the at least one social network platform based on the activity pattern of the source individual and an identity of a specific individual that shared the new content.

67. The non-transitory computer readable medium of claim 61, wherein the operations further include determining a specific action for responding to new content shared on the at least one social network platform based on the activity pattern of the source individual and a topic of the new content.

68. The non-transitory computer readable medium of claim 61, wherein the operations further include generating a report associated with some of the plurality of second events that the source individual is likely to be interested in.

69. The non-transitory computer readable medium of claim 61, wherein the operations further include generating a report indicative of social network actions that the artificial entity took on behalf of the source individual.

70. The non-transitory computer readable medium of claim 61, wherein the operations further include receiving input from the source individual, and updating the at least one activity pattern based on the input.

71. A non-transitory computer readable medium containing instructions that when executed by at least one processor cause the at least one processor to perform operations for operating artificial entities, the operations comprising:
receiving information related to a source individual;
generating an artificial entity associated with the source individual based on the received information;
receiving from the source individual a request for the artificial entity to act as a surrogate to the source individual;

receiving data reflecting a query from a reference individual, the query is addressed to the artificial entity that presents itself as the surrogate of the source individual;

determining a manner for the artificial entity to respond to the query; and causing the artificial entity to output a response to the query using the determining manner, wherein the determined manner anticipates how the source individual would answer the query.

72. The non-transitory computer readable medium of claim 71, wherein the artificial entity is configured to act as a surrogate to a deceased source individual.

73. The non-transitory computer readable medium of claim 72, wherein the received information includes details on a passing of the source individual, and the response to the query includes at least one detail on the passing of the source individual.

74. The non-transitory computer readable medium of claim 72, wherein the received information includes a legacy letter that the source individual created, and the artificial entity is generated based on the legacy letter.

75. The non-transitory computer readable medium of claim 72, wherein operations further include receiving feedback from relatives of the deceased source individual; and updating the artificial entity based on the feedback.

76. The non-transitory computer readable medium of claim 71, wherein the artificial entity acts as a surrogate to an alive source individual, and the operations further include reporting to the source individual about interactions that the artificial entity had with one or more reference individuals.

77. The non-transitory computer readable medium of claim 71, wherein the operations further include receiving feedback from the source individual on interactions that the artificial entity had with one or more reference individuals and updating settings of the artificial entity based on the feedback.

78. The non-transitory computer readable medium of claim 71, wherein the operations further include making a determination whether answering the query would reveal a private detail of the source individual and anticipating a manner in which the source individual would answer the query based on the determination of whether answering the query would reveal the private detail.

79. The non-transitory computer readable medium of claim 71, wherein the operations further include making a determination on a level of understanding that the source individual have on a topic of the query, and anticipating a manner in which the source individual would answer the received query based on the determined level of understanding.

80. The non-transitory computer readable medium of claim 71, wherein generating the artificial entity includes determining a voice of the source individual, and causing the artificial entity to output the response includes using a synthesized voice associated with the voice of the source individual.

81. A non-transitory computer readable medium containing instructions that when executed by at least one processor cause the at least one processor to perform operations for operating artificial entities, the operations comprising:

receiving information related to a source individual;

generating an artificial entity associated with the source individual based on the received information;

receiving a request from the source individual to deploy the artificial entity in a digital activity that involve one or more human participants;

receiving data reflecting an utterance articulated during the digital activity;

determining a manner for the artificial entity to respond to the utterance; and causing the artificial entity to participate in the digital activity on behalf of the source individual and to respond to the utterance using the determined manner.

82. The non-transitory computer readable medium of claim 81, wherein the digital activity is an online meeting, and the operations further include providing to the source individual a summary of the online meeting and what the artificial entity said during the online meeting.

83. The non-transitory computer readable medium of claim 81, wherein the digital activity is an online class, and the operations further include providing to the source individual a summary of content presented in the online class based on a level of understanding of the source individual.

84. The non-transitory computer readable medium of claim 81, wherein the digital activity is a call with customer service, and the operations further include determining the manner for the artificial entity to respond to the utterance based on preferences of the source individual.

85. The non-transitory computer readable medium of claim 81, wherein the request to deploy the artificial entity in the digital activity identifies a task for the artificial entity to complete in the digital activity, and wherein determining the manner for the artificial entity to respond to the utterance is based on the identified task.

86. The non-transitory computer readable medium of claim 85, wherein the task includes at least one of: retrieving information on a specific topic, scheduling an appointment for the source individual, or making a travel reservation for the source individual.

87. The non-transitory computer readable medium of claim 81, wherein the request from the source individual is associated with multiple assignments corresponding to a plurality of digital activities, and the operations further include providing to the source individual a report that summarizes outcome of the multiple assignments.

88. The non-transitory computer readable medium of claim 81, wherein the operations further include receiving an invitation for the digital activity, analyzing the invitation to identify a link for the digital activity, and enabling the artificial entity to participate in the digital activity using the link.

89. The non-transitory computer readable medium of claim 81, wherein the operations further include providing a notice to the one or more human participants of the digital activity that the artificial entity represents the source individual during the digital activity.

90. The non-transitory computer readable medium of claim 81, wherein the operations further include identifying that the utterance was articulated by another artificial entity, and wherein the manner to respond to the utterance is determined based on the identification that the utterance was articulated by the another artificial entity.

91. A non-transitory computer readable medium containing instructions that when executed by at least one processor cause the at least one processor to perform operations for operating artificial entities, the operations comprising:

receiving information related to a source individual;

determining a record of the source individual from the received information;

receiving from the source individual a selection of a personality trait for an artificial assistant;

generating an artificial entity associated with the source individual based on the received information;

receiving from the source individual an assignment of a task for the artificial entity, wherein completing the task requires the artificial entity to independently interact with a reference individual; and determining a manner for the artificial entity for completing the task according to the selected personality trait and the determined record of the source individual.

92. The non-transitory computer readable medium of claim 91, wherein the operations further include receiving feedback on a specific manner that the artificial entity used when completing the task, and updating settings of the artificial entity based on the feedback such that the artificial entity will complete future tasks in a more formal manner than the specific manner.

93. The non-transitory computer readable medium of claim 91, wherein the operations further include receiving feedback on a specific manner that the artificial entity used when completing the task, and updating settings of the artificial entity based on the feedback such that the artificial entity will complete future tasks in a more casual manner than the specific manner.

94. The non-transitory computer readable medium of claim 91, wherein generating the artificial entity includes determining a profile for the artificial entity based on the record of the source individual and the selected personality trait.

95. The non-transitory computer readable medium of claim 91, wherein determining the manner for completing the task is based on a relationship between the source individual and the reference individual.

96. The non-transitory computer readable medium of claim 91, wherein the assignment is for a recurring task and the operations further include accounting for interactions occurred in past tasks when determining a specific manner for completing an outstanding task.

97. The non-transitory computer readable medium of claim 91, wherein the operations further include: upon receiving the assignment of the task, determining that additional instructions regarding an upcoming interaction with the reference individual are needed in order to successfully compete the task, and asking for more details for completing the task.

98. The non-transitory computer readable medium of claim 91, wherein the operations further include: in response to a trigger, generating a report for the source individual that includes at least one of: a recording of a specific interaction with the reference individual, a summary of the specific interaction, or a description of an outcome of the task.

99. The non-transitory computer readable medium of claim 98, wherein the trigger includes at least one of a determination that the task was completed, an identification of an event that happened during completion of the task, or a receipt of a request from the source individual.

100. The non-transitory computer readable medium of claim 91, wherein the operations further include receiving an assignment of a plurality of tasks for the artificial entity, causing the artificial entity to prioritize completions of the plurality of tasks based on the record of the source individual.

101. A non-transitory computer readable medium containing instructions that when executed by at least one processor cause the at least one processor to perform operations for operating artificial entities, the operations comprising:

receiving information related to a source individual, wherein the received information is reflective of a first manner by which the source individual plays an online game during a first time period in which at least one player character controllable by the source individual interacts with at least one non-player character controlled by a game logic;

generating an artificial entity associated with the source individual based on the received information;

receiving data reflecting an interaction of the at least one player character controllable by the artificial entity with the at least one non-player character controlled by the game logic;

determining a second manner for the artificial entity to play the online game based on the first manner by which the source individual played the online game; and causing the artificial entity to control the at least one player character during a second time period subsequent to the first time period using the second manner.

102. The non-transitory computer readable medium of claim 101, wherein the artificial entity that controls the at least one player character during the second time period is separated from the game logic that controls the at least one non-player character.

103. The non-transitory computer readable medium of claim 101, wherein the determined second manner includes moves of the at least one player character preferable by the source individual.

104. The non-transitory computer readable medium of claim 101, wherein the determined second manner is reflective of a level of skill of the source individual in the online game determined based on interactions of the at least one player character with the at least one non-player character during the first time period.

105. The non-transitory computer readable medium of claim 101, wherein the operations further include: after the first time period and prior to the second time period, receiving instructions from the source individual; and causing the artificial entity to control the at least one player character during the second time period according to the received instructions.

106. The non-transitory computer readable medium of claim 101, wherein the online game involves multiple players associated with a plurality of player characters and the operations further include notifying at least some of the multiple players when one of the plurality of player characters is played by a corresponding artificial entity.

107. The non-transitory computer readable medium of claim 101, wherein the online game involves multiple players associated with a plurality of player characters and the operations further include determining a profile for the source individual, and determining the second manner based on the profile, wherein the profile is indicative of at least one relationship between a source individual and at least one of the multiple players.

108. The non-transitory computer readable medium of claim 107, wherein the at least one relationship is one of a rivalry, enmity, teammates, guild membership, mentorship, friendship, or trading partnership.

109. The non-transitory computer readable medium of claim 101, wherein the operations further include reporting how the artificial entity played the online game during the second time period.

110. The non-transitory computer readable medium of claim 101, wherein the operations further include enabling the source individual to play the online game during a third time period subsequent to the second time period, wherein game achievements accomplished by the artificial entity during the second time period are available to the source individual during the third time period.

* * * * *